United States Patent
Choi et al.

(10) Patent No.: US 12,477,937 B2
(45) Date of Patent: Nov. 18, 2025

(54) WINDOW MEMBER AND DISPLAY DEVICE INCLUDING THE SAME

(71) Applicant: Samsung Display Co., LTD., Yongin-si (KR)

(72) Inventors: Min Hoon Choi, Seoul (KR); Kyung Man Kim, Anyang-si (KR); Da Woon Kim, Yongin-si (KR); Seung Ho Kim, Asan-si (KR); Seong Jin Hwang, Suwon-si (KR); Sang Hoon Kim, Hwaseong-si (KR); Sung Hoon Kim, Asan-si (KR); Yu Ri Kim, Guri-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 459 days.

(21) Appl. No.: 17/896,630

(22) Filed: Aug. 26, 2022

(65) Prior Publication Data
US 2023/0225153 A1     Jul. 13, 2023

(30) Foreign Application Priority Data

Jan. 13, 2022 (KR) .................. 10-2022-0005011

(51) Int. Cl.
G06F 1/16 (2006.01)
H10K 50/80 (2023.01)
(Continued)

(52) U.S. Cl.
CPC ......... H10K 50/865 (2023.02); G06F 1/1616 (2013.01); G06F 1/1656 (2013.01);
(Continued)

(58) Field of Classification Search
CPC ............ H10K 2102/311; H10K 50/84; H10K 77/111; H04M 1/0214; H04M 1/0216;
(Continued)

(56) References Cited

U.S. PATENT DOCUMENTS 9,354,476 B2    5/2016   Han et al.
10,168,844 B2   1/2019   Kwon et al.
(Continued)

FOREIGN PATENT DOCUMENTS

KR   10-2015-0017819    2/2015
KR   10-2017-0032958    3/2017
(Continued)

*Primary Examiner* — Z. Jim Yang
(74) *Attorney, Agent, or Firm* — Sughrue Mion, PLLC

(57) ABSTRACT

A window member includes a window including a first flat part, a first pattern part disposed on a side of the first flat part and having a groove pattern, and a second flat part disposed on an opposite side of the first flat part, the first pattern part being disposed between the first flat part and the second flat part; and a first light-blocking member disposed on a surface of the first flat part and not overlapping the first pattern part or the second flat part in a plan view. The first light-blocking member includes a 1-1-th light-blocking member, a 1-2-th light-blocking member, and a 1-3-th light-blocking member facing the 1-1-th light-blocking member. The 1-1-th light-blocking member, the 1-2-th light-blocking member, and the 1-3-th light-blocking member define a first accommodation space. The 1-3-th light-blocking member is spaced apart from the 1-1-th light-blocking member to define a first open area.

16 Claims, 44 Drawing Sheets

100: 110, 130, 150
150: 150a, 150b
200: 210, 230
210: 210a, 210b, 210c
230: 230a, 230b, 230c
300: 310, 330, 350
350: 350a, 350b

(51) Int. Cl.
  *H10K 50/84*   (2023.01)
  *H10K 50/86*   (2023.01)
  *H10K 71/00*   (2023.01)
  *H10K 102/00*  (2023.01)

(52) U.S. Cl.
  CPC ........... *H10K 50/84* (2023.02); *H10K 50/868* (2023.02); *H10K 71/00* (2023.02); *H10K 2102/311* (2023.02); *Y10T 428/24537* (2015.01); *Y10T 428/24612* (2015.01)

(58) Field of Classification Search
  CPC ............. H04M 1/0222; H04M 1/0266; H04M 1/0268; H04M 1/0269; G06F 1/1603; G06F 1/1626; G06F 1/1637–1654; G06F 1/1656; G06F 1/1658; G09F 9/301; G02F 1/133302; G02F 1/133305; G02F 1/133308; G02F 1/133311; G02F 1/133331; Y10T 428/24479; Y10T 428/24521; Y10T 428/24537; Y10T 428/2457; Y10T 428/24587; Y10T 428/24612
  See application file for complete search history.

(56) References Cited

U.S. PATENT DOCUMENTS

| | | |
|---|---|---|
| 10,347,700 B2 | 7/2019 | Yang et al. |
| 11,061,439 B2 | 7/2021 | Kwon et al. |
| 11,409,325 B2 | 8/2022 | Yee et al. |
| 11,594,702 B2 | 2/2023 | Kim et al. |
| 11,650,629 B2 | 5/2023 | Kwon et al. |
| 2015/0090969 A1* | 4/2015 | Han .................... H10K 50/841 257/40 |
| 2016/0118616 A1* | 4/2016 | Hiroki .................. H10K 59/12 257/40 |
| 2017/0023979 A1* | 1/2017 | Yamazaki ............... G06F 1/181 |
| 2017/0347469 A1* | 11/2017 | Heo ...................... H05K 7/1427 |
| 2018/0217639 A1* | 8/2018 | Jones .................... H05K 1/028 |
| 2019/0258107 A1* | 8/2019 | Fujii .................. G02F 1/133308 |
| 2020/0171781 A1* | 6/2020 | Zhang ....................... B32B 7/04 |
| 2020/0310494 A1* | 10/2020 | Ahn ........................ G06F 3/041 |
| 2020/0313111 A1* | 10/2020 | Kim ...................... H10K 59/87 |
| 2021/0007229 A1* | 1/2021 | Gu ......................... G06F 1/1652 |
| 2021/0118337 A1* | 4/2021 | Park ...................... G09F 9/301 |
| 2021/0126219 A1* | 4/2021 | Lee ....................... H10K 77/111 |
| 2021/0135146 A1* | 5/2021 | Kim ...................... H10K 59/871 |
| 2021/0273672 A1* | 9/2021 | Altaras ................. H04M 1/185 |
| 2021/0315116 A1* | 10/2021 | Sunwoo ................... B32B 27/38 |
| 2021/0408454 A1* | 12/2021 | He ........................ H10K 59/88 |
| 2022/0100234 A1* | 3/2022 | Kishimoto ........... G06F 1/1616 |
| 2022/0225523 A1* | 7/2022 | Nguyen ............... H10K 77/111 |
| 2022/0334293 A1* | 10/2022 | Baek ...................... G02B 5/003 |
| 2022/0377949 A1* | 11/2022 | Kim ...................... G06F 1/1637 |
| 2022/0390985 A1* | 12/2022 | Lee ......................... B32B 3/02 |
| 2023/0060493 A1* | 3/2023 | Wu ........................ H10K 59/40 |
| 2023/0256711 A1* | 8/2023 | Connolly ................. B32B 7/12 428/212 |

FOREIGN PATENT DOCUMENTS

| | | |
|---|---|---|
| KR | 10-2017-0079397 | 7/2017 |
| KR | 10-2167404 | 10/2020 |
| KR | 10-2021-0027699 | 3/2021 |
| KR | 10-2021-0054650 | 5/2021 |
| KR | 10-2021-0109091 | 9/2021 |

\* cited by examiner

100: 110, 130, 150
150: 150a, 150b
200: 210, 230
210: 210a, 210b, 210c
230: 230a, 230b, 230c
300: 310, 330, 350
350: 350a, 350b

104: 110, 130, 154
154: 154a
154a: 154a_b, 154a_t
203: 210, 230, 253, 273
355: 354a, 354b, 354c, 355d

WINDOW MEMBER AND DISPLAY DEVICE INCLUDING THE SAME

CROSS-REFERENCE TO RELATED APPLICATION

This application claims priority from Korean Patent Application No. 10-2022-0005011 filed on Jan. 13, 2022, in the Korean Intellectual Property Office, the disclosure of which is incorporated herein by reference in its entirety.

BACKGROUND

1. Technical Field

The disclosure relates to a window member with improved mechanical reliability and a display device having the same.

2. Description of the Related Art

Display devices have grown in popularity because of the developments of multimedia technology. Also, a variety of display devices such as organic light-emitting display devices and liquid-crystal display devices have been increasing and becoming more popular.

Recently, as the display technology evolves, research and development on a display device having a flexible display are ongoing. The display screen of a flexible display may be extended or reduced by folding, bending or sliding the display screen. Thus, the volume of the display device may be reduced, and the display device may have various designs.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a window member with improved mechanical reliability.

Embodiments also provide a display device with improved mechanical reliability.

It should be noted that objects of the disclosure are not limited to the above-mentioned object; and other objects of the disclosure will be apparent to those skilled in the art from the following descriptions.

According to an embodiment of the disclosure, the mechanical reliability of a window member may be improved.

According to another embodiment of the disclosure, the mechanical reliability of a display device may be improved.

According to an embodiment of the disclosure, a window member comprises, a window comprising a first flat part, a first pattern part disposed on a side of the first flat part and having a groove pattern, and a second flat part disposed on an opposite side of the first flat part, the first pattern part being disposed between the first flat part and the second flat part; and a first light-blocking member disposed on a surface of the first flat part and not overlapping the first pattern part or the second flat part in a plan view. The first light-blocking member may include a 1-1-th light-blocking member, a 1-2-th light-blocking member intersecting the 1-1-th light-blocking member, and a 1-3-th light-blocking member intersecting the 1-2-th light-blocking member and facing the 1-1-th light-blocking member. The 1-1-th light-blocking member, the 1-2-th light-blocking member, and the 1-3-th light-blocking member may define a first accommodation space. The 1-3-th light-blocking member may be spaced apart from the 1-1-th light-blocking member to define a first open area. The first accommodation space may be exposed toward the first pattern part by the first open area.

In an embodiment, the window member may further comprise a second light-blocking member disposed on a surface of the second flat part and not overlapping the first pattern part in a plan view. The second light-blocking member may include a 2-1-th light-blocking member, a 2-2-th light-blocking member intersecting the 2-1-th light-blocking member, and a 2-3-th light-blocking member intersecting the 2-2-th light-blocking member and facing the 2-1-th light-blocking member. The 2-1-th light-blocking member, the 2-2-th light-blocking member and the 2-3-th light-blocking member may define a second accommodation space. The 2-3-th light-blocking member may be spaced apart from the 2-1-th light-blocking member to define a second open area. The second accommodation space may be exposed toward the first pattern part by the second open area.

In an embodiment, the 1-1-th light-blocking member of the first light-blocking member and the 2-1-th light-blocking member of the second light-blocking member may face each other and be spaced apart from each other to define a third open area. The 1-3-th light-blocking member of the first light-blocking member and the 2-3-th light-blocking member of the second light-blocking member may face each other and be spaced apart from each other to define a fourth open area.

In an embodiment, the first pattern part may include a bridge connecting the first flat part with the second flat part; and a plurality of protrusions protruding from a surface of the bridge in a first direction that is a thickness direction of the window and spaced apart from one another. Each of the groove pattern may be defined as a space between every two of the plurality of protrusions.

In an embodiment, each of the plurality of protrusions may extend in a second direction intersecting the first direction. A width of each of the plurality of protrusions in the second direction may be greater than each of a width of the first accommodation space in the second direction and a width of the second accommodation space in the second direction.

In an embodiment, the window member may further comprise a cured resin layer. The first accommodation space, the second accommodation space, and the groove pattern may be filled with the cured resin layer.

In an embodiment, the cured resin layer may include a first portion disposed in the first accommodation space; a second portion disposed in the second accommodation space; and a third portion disposed between the first portion and the second portion to cover the groove pattern. The first portion, the second portion, and the third portion of the cured resin layer may be integral with one another. A width of the third portion in the second direction may be greater than each of a width of the first portion in the second direction and a width of the second portion in the second direction.

In an embodiment, the groove pattern may be completely filled with the third portion.

In an embodiment, the window member may further comprise a third light-blocking member disposed on the plurality of protrusions.

In an embodiment, the window member may further comprise a fourth light-blocking member disposed on a surface of the bridge exposed from the plurality of protrusions. A thickness of each of the plurality of protrusions may be greater than a thickness of the fourth light-blocking member.

In an embodiment, a thickness of the first light-blocking member may be in a range of about 30 μm to about 50 μm.

In an embodiment, a width of the first light-blocking member may be in a range of about 50 μm to about 500 μm.

In an embodiment, the window may further comprise a second pattern part disposed on a side of the second flat part and having a groove pattern formed therein; and a third flat part disposed on an opposite side of the second flat part with the second pattern part therebetween. The window member may further comprise a second light-blocking member disposed on a surface of the second flat part; and a third light-blocking member disposed on a surface of the third flat part. The second flat part may be disposed between the first flat part and the third flat part. The second light-blocking member may be disposed in a number eleven shape open toward the first pattern part and the second pattern part to define a second accommodation space. The third light-blocking member may include a 3-1-th light-blocking member, a 3-2-th light-blocking member intersecting the 3-1-th light-blocking member, and a 3-3-th light-blocking member intersecting the 3-2-th light-blocking member and facing the 3-1-th light-blocking member. The 3-1-th light-blocking member, the 3-2-th light-blocking member, and the 3-3-th light-blocking member may define a third accommodation space. The third accommodation space may be exposed toward the second pattern part.

According to an embodiment of the disclosure, a display device comprise, a window comprising a first flat part, a pattern part located on a side of the first flat part in a first direction and having a groove pattern (or groove patterns) formed therein, and a second flat part located on an opposite side of the first flat part with the pattern part therebetween; a first light-blocking member disposed on a surface of the first flat part, not overlapping the pattern part or the second flat part in a plan view, and extended along an edge of the surface of the first flat part to define a first accommodation space; a cured resin layer disposed on the window and used to fill the first accommodation space and the groove pattern; and a display panel disposed under the window to display images. The first light-blocking member may include a 1-1-th light-blocking member extended in the first direction, a 1-2-th light-blocking member extended in a second direction intersecting the first direction and in contact with the first light-blocking member, and a 1-3-th light-blocking member extended in the first direction, in contact with the 1-2-th light-blocking member and facing the 1-1-th light-blocking member in the second direction. The first accommodation space may be defined with the 1-1-th light-blocking member, the 1-2-th light-blocking member, and the 1-3-th light-blocking member as a border. The 1-3-th light-blocking member may be spaced apart from the 1-1-th light-blocking member to define a first open area. The first accommodation space may be exposed toward the pattern part by the first open area.

In an embodiment, the display panel may include a first non-folding area overlapping the first flat part, a second non-folding area overlapping the second flat part, and a first folding area overlapping the pattern part in a plan view. The first light-blocking member may overlap the first non-folding area and not overlap the first folding area in a plan view.

In an embodiment, the display panel may include an active area comprising a plurality of pixels and a non-active area adjacent to the active area. The first light-blocking member may overlap the non-active area and not overlap the active area in a plan view.

In an embodiment, a display device may further comprise a protective film disposed on the window. A second light-blocking member may be disposed on a part of the protective film that overlaps the pattern part of the window and the non-active area of the display panel in a plan view.

In an embodiment, a display device may further comprise a polarizing member disposed between the window and the display panel. A second light-blocking member may be disposed on a part of the polarizing member that overlaps the pattern part of the window and the non-active area of the display panel in a plan view.

According to an embodiment of the disclosure a method of fabricating a window member, the method comprise preparing a window comprising a first flat part and a pattern part disposed on a side of the first flat part in a first direction and having a groove pattern; disposing a first light-blocking member on the flat part; applying a cured resin to a first accommodation space defined by the first light-blocking member on the flat part; and filling the groove pattern with the cured resin applied to the first accommodation space using a roller. The first light-blocking member may not overlap the pattern part in a plan view and be bent concavely toward an opposite side of the flat part in the first direction along edges of the flat part to define a first accommodation space.

In an embodiment, a method of fabricating a window member may further comprise cutting leakages of the cured resin from the pattern part of the window after the filling of the groove pattern with the cured resin.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
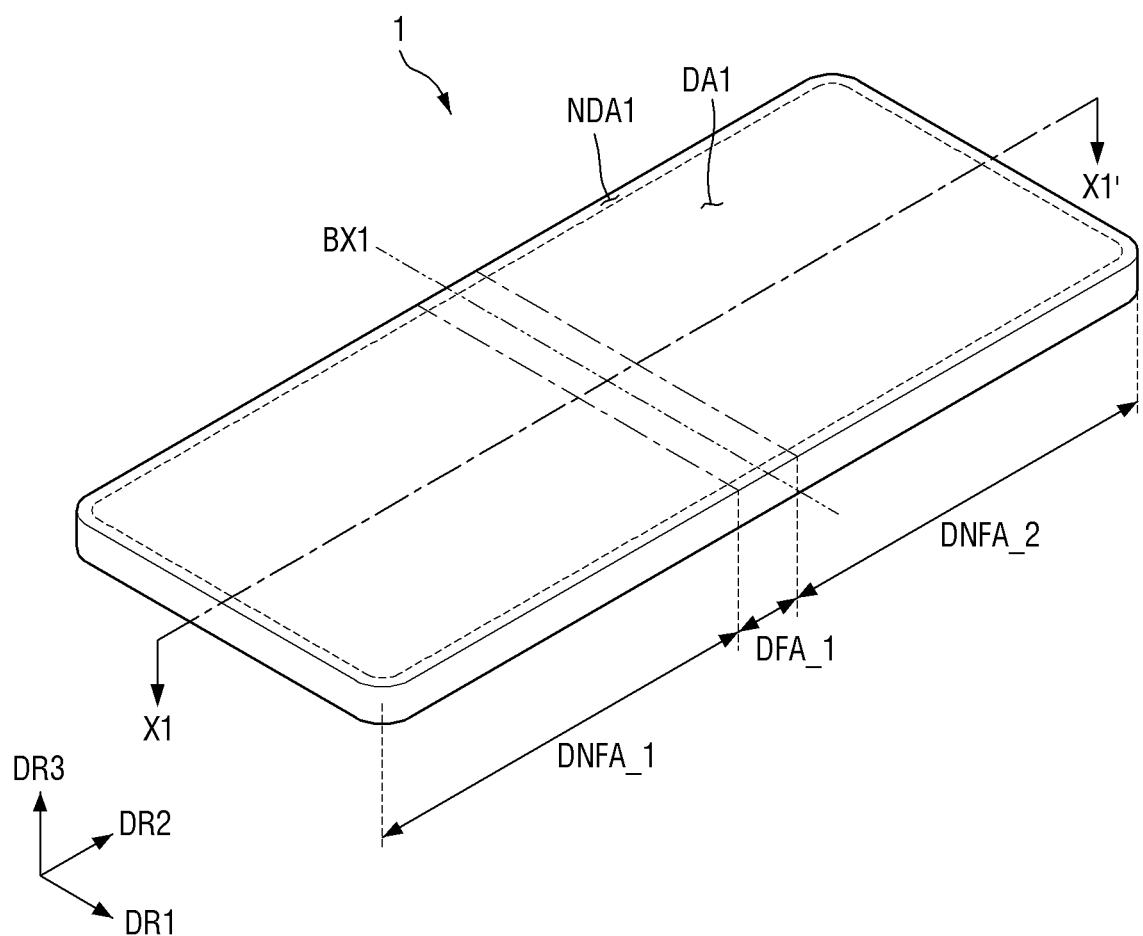
FIG. 1 is a schematic perspective view of a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure. Similarly, the second element could also be termed the first element.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Further-more, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Figure 2:
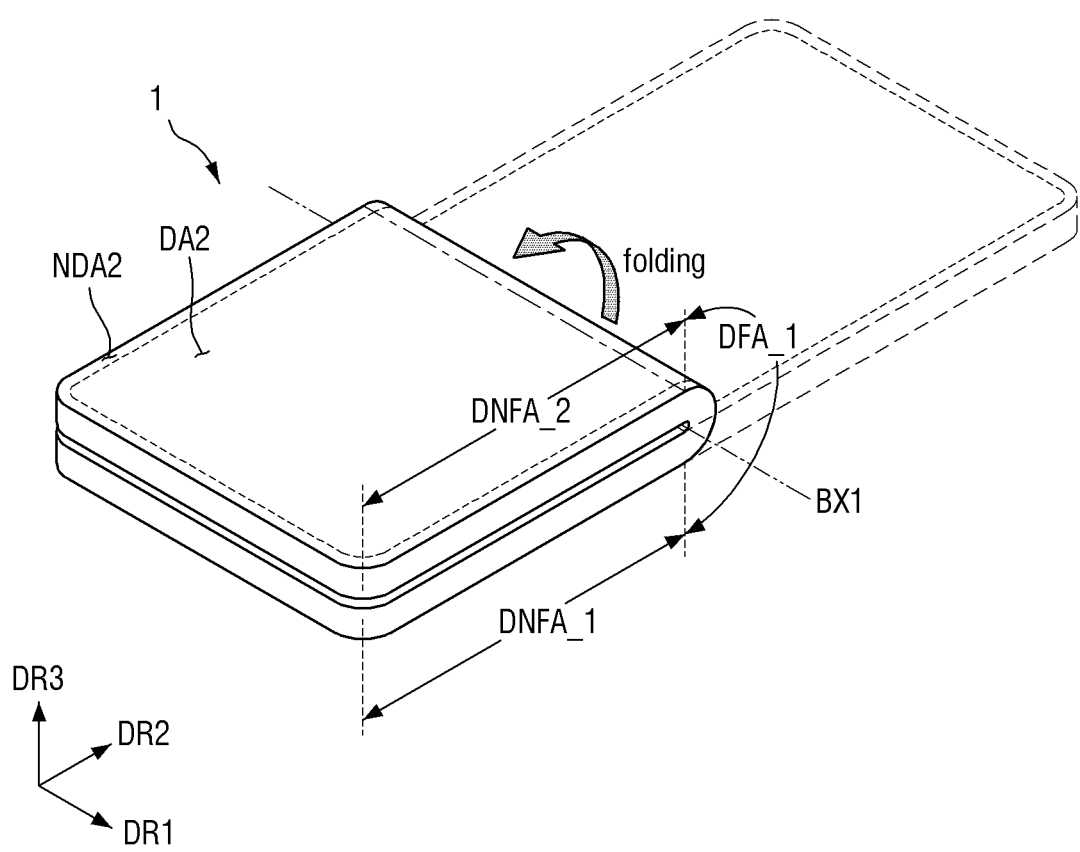
FIG. 2 is a schematic perspective view showing the display device according to the embodiment of FIG. 1, which is folded.

FIG. 1 is a schematic perspective view of a display device according to an embodiment of the disclosure. FIG. 2 is a schematic perspective view showing the display device according to the embodiment of FIG. 1, which is folded.

Referring to FIGS. 1 and 2, a display device 1 according to an embodiment may display moving images or still images. The display device 1 may be used as a display screen of portable electronic devices such as a mobile phone, a smart phone, a tablet PC, a smart watch, a watch phone, a mobile communications terminal, an electronic notebook, an electronic book, a portable multimedia player (PMP), a navigation device, an ultra mobile PC (UMPC), or the like. For example, the display device 1 may be used as a display screen of various products such as a television, a laptop computer, a monitor, a billboard and the Internet of Things. However, the disclosure is not limited thereto.

As shown in FIGS. 1 and 2, the display device 1 according to the embodiment may be a single foldable display device in which a part of the display device 1 may be folded (or bent) along a bending line, but is not limited thereto. For example, the display device 1 according to the embodiment may be a multi-foldable display device in which several parts of the display device 1 may be folded along multiple bending lines.

FIG. 1 shows the display device 1 in a first state, in which a first folding area DFA_1 is not bent. FIG. 2 shows the display device 1 in a second state, in which the first folding area DFA_1 is bent.

The display device 1 may have a three-dimensional shape. In the drawings, a direction parallel to a first side (e.g., horizontal side) of the display device 1 may be referred to as a first direction DR1, a direction parallel to a second side (e.g., vertical side) of the display device 1 may be referred to as a second direction DR2, and a thickness direction of the display device 1 may be referred to as a third direction DR3. However, the order of the first, second, and third directions DR1, DR2, and DR3 may be changed in the claims. For example, the first direction DR1 of the specification may refer to a second direction or a third direction of the claims, the second direction DR2 of the specification may refer to a first direction or a third direction of the claims, and the third direction DR3 of the specification may refer to a first direction or a second direction of the claims. As used herein, directions may refer to two directions toward a side and an opposite side (or opposite direction) unless stated otherwise. If it is necessary to discern between two opposite directions, a side in one of the two directions may be referred to as "a side in the direction," while the opposite side in the other may be referred to as "the opposite side in the direction." In FIG. 1, the side indicated by the arrow of a direction may be referred to as a side in the direction, while an opposite side is referred to as the opposite side (or opposite direction) in the direction. The first direction DR1 to the third direction DR3 may be perpendicular to one another. It should be understood, however, that the disclosure is not limited thereto.

In some embodiments, the display device 1 may have a quadrangular shape such as a rectangle in which the horizontal sides are shorter than the vertical sides, and each of corners of the display device 1 may form a right angle or may be rounded in a plan view as shown in FIG. 1. However, the disclosure is not limited thereto. For example, the display device 1 may have a rectangular shape such as a rectangle in which the vertical sides are shorter than the horizontal sides in a plan view.

The display device 1 may include a first non-folding area DNFA_1, a second non-folding area DNFA_2, and a first folding area DFA_1.

The first non-folding area DNFA_1 and the second non-folding area DNFA_2 may be flat (e.g., always flat) and may not be bendable. The first non-folding area DNFA_1 may be disposed on the opposite side of the display device 1 in the second direction DR2 as a part of the display device 1 in the drawings. The second non-folding area DNFA_2 may be disposed on a side of the display device 1 in the second direction DR2 as a part of the display device 1 in the drawings.

The first foldable area DFA_1 may be foldable. The first folding area DFA_1 may be disposed between the first non-folding area DNFA_1 and the second non-folding area DNFA_2. For example, the second non-folding part DNFA_2 may be disposed on a side of the first folding area DFA_1 in the second direction DR2, and the first non-folding area DNFA_1 may be disposed on an opposite side of the first folding area DFA_1 in the second direction DR2.

The first folding area DFA_1 may be folded along on a first folding axis BX1.

In some embodiments, the first folding axis BX1 may be defined as an imaginary axis parallel to the first direction DR1 on the first folding area DFA_1, but is not limited thereto.

The first folding area DFA_1 may overlap the first folding axis BX1 in the third direction DR3. In some embodiments, the first folding axis BX1 may be located at a center of the first folding area DFA_1 in the second direction DR2, but the disclosure is not limited thereto. The first folding area DFA_1 may be folded with a radius (e.g., predetermined or selectable radius of curvature) along the first folding axis BX1 as shown in FIG. 2.

In case that the first folding area DFA_1 is not folded, the display device 1 may maintain unfolded (hereinafter referred to as a first state) as shown in FIG. 1. In case that the first folding area DFA_1 is folded, the display device 1 may maintain folded (hereinafter referred to as a second state) as shown in FIG. 2. The display device 1 may be switched from the first state to the second state as the first folding area DFA_1 is folded. Accordingly, a length of the display device 10 in the second direction DR2 may be reduced, and the display device 1 may be readily transported.

The display device 1 may include a display area DA and a non-display area NDA.

In the display area DA, pixels may be disposed to display images. The display area DA may include a first display area DA1 and a second display area DA2. In the non-display area NDA, no image is displayed. The non-display area NDA may include a first non-display area NDA1 and a second non-display area NDA2. Referring to FIG. 1, in the first state of the display device 1, a surface (e.g., side surface) of the display device 1 in the third direction DR3 may be an upper surface on which the first display area DA1 and the first non-display area NDA1 are located, and an opposite surface of the display device 1 in the third direction DR3 may be a lower surface on which the second display area DA2 and the second non-display area NDA2 are located.

The first display area DA1 may be located on the upper surface of the display device 1 as shown in FIG. 1 in the first state. For example, each of the first non-folding area DNFA_1, the second non-folding area DNFA_2, and the first folding area DFA_1 may include at least a part of the first display area DA1. A shape of the first display area DA1 may follow the shape of the display device 1 in a plan view in the first state. For example, when the shape of the display device 1 in the first state is a rectangle in a plan view, the shape of the first display area DA1 may also be a rectangle.

The first non-display area NDA1 may be disposed adjacent to (e.g., around or surround) the first display area DA1. For example, each of the first non-folding area DNFA_1, the second non-folding area DNFA_2, and the first folding area DFA_1 may include at least a part of the first non-display area NDA1. In some embodiments, the first non-display area NDA1 may be adjacent to (e.g., surround) the first display area DA1, but the disclosure is not limited thereto. For example, the first display area DA1 may be partially surrounded by the first non-display area NDA1.

The second display area DA2 may be disposed on the lower surface of the display device 1 in the first state of the display device 1. The second display area DA2 may work as (e.g., display) a screen where images are displayed for a user when the display device 1 is in the second state. In some embodiments, the second display area DA2 may be located on the lower surface of the second non-folding area DNFA_2, but the disclosure is not limited thereto. For example, the second display area DA2 may also be disposed in the first non-folding area DNFA_1, the second non-folding area DNFA_2, and the first folding area DFA_1.

The second non-display area NDA2 may be disposed adjacent to (e.g., around or surround) the second display area DA2 when the display device 1 is in the first state. For example, each of the first non-folding area DNFA_1, the second non-folding area DNFA_2, and the first folding area DFA_1 may include at least a part of the second non-display area NDA2. The second non-display area NDA2 may be adjacent to (e.g., surround) the second display area DA2, but the disclosure is not limited thereto. For example, the second display area DA2 may be partially surrounded by the second non-display area NDA2.

In some embodiments, when the display device 1 is in the second state, the display device 1 may be folded inward such that the upper surface of the first non-folding area DNFA_1 and the upper surface of the second non-folding area DNFA_2 may face each other as shown in FIG. 2. However, the disclosure is not limited thereto. In some embodiments, when the display device 1 is in the second state, the display device 1 may be folded outward such that the lower surface of the first non-folding area DNFA_1 and the lower surface of the second non-folding area DNFA_2 may face each other.

Hereinafter, description of the structure of the display device 1 is provided in detail.

Figure 3:
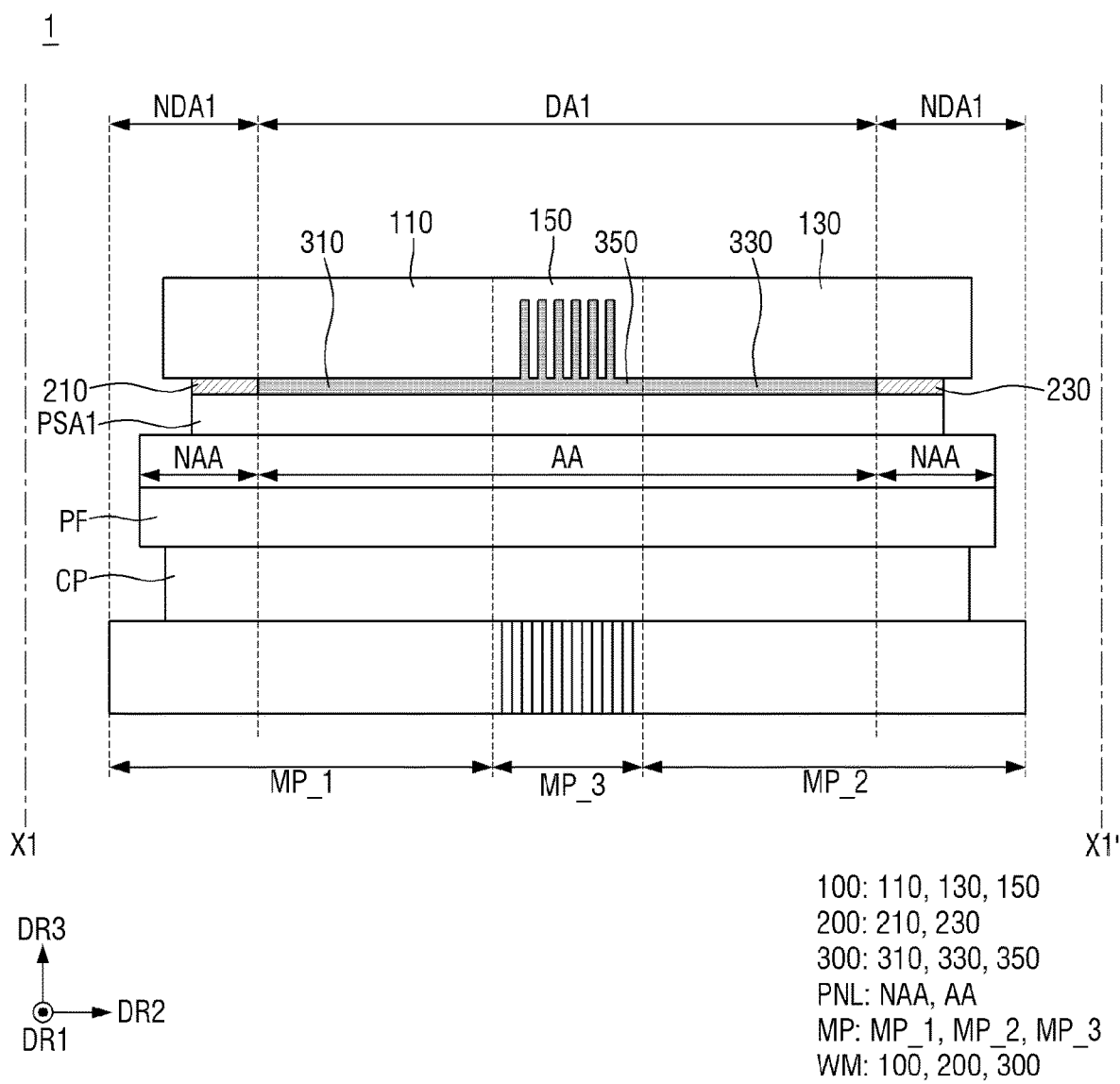
FIG. 3 is a cross-sectional view schematically showing a cross section taken along line X1-X1' of FIG. 1.
Figure 4:
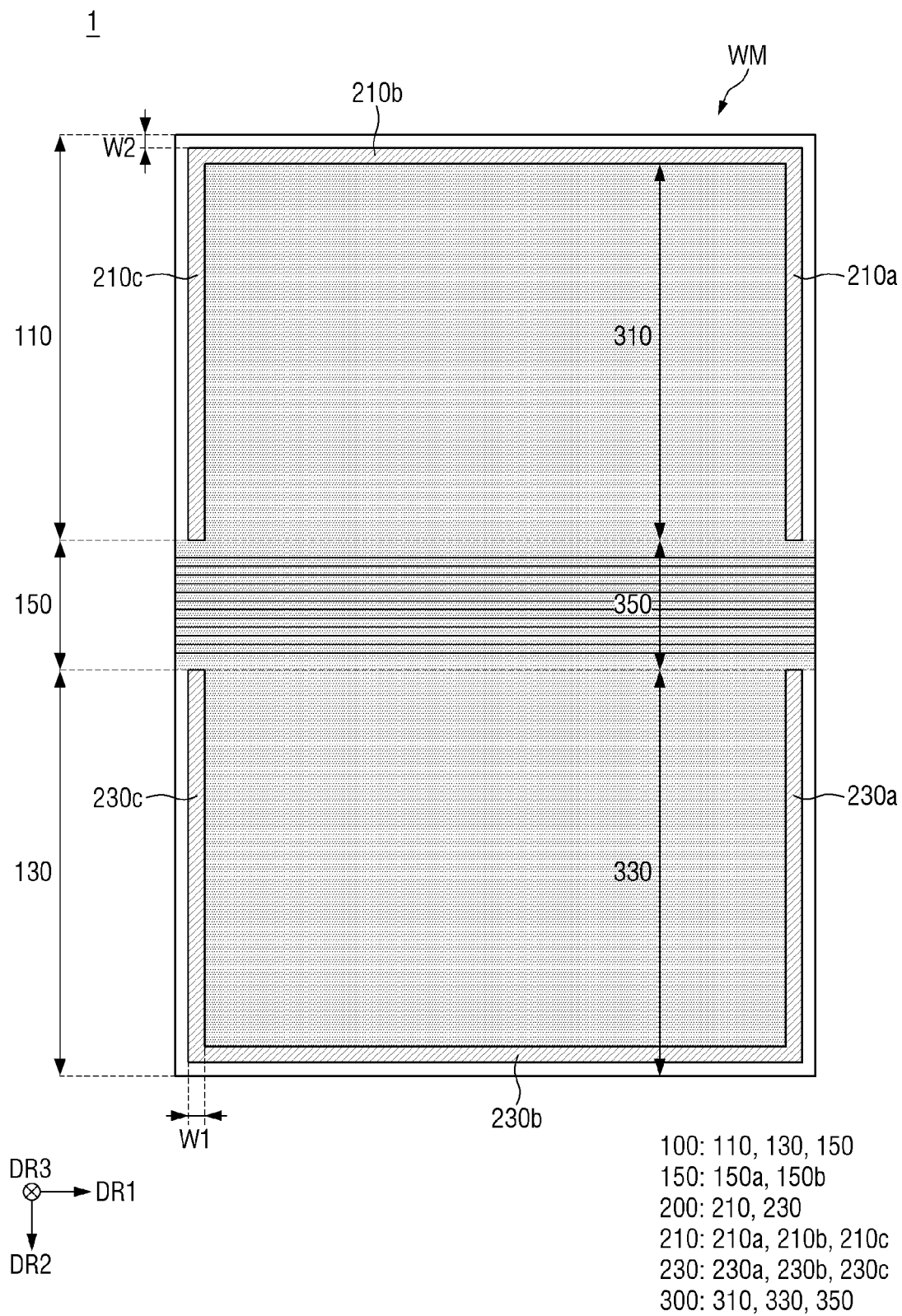
FIG. 4 is a plan view schematically showing the lower surface of the window member of the display device of FIG. 1.
Figure 5:
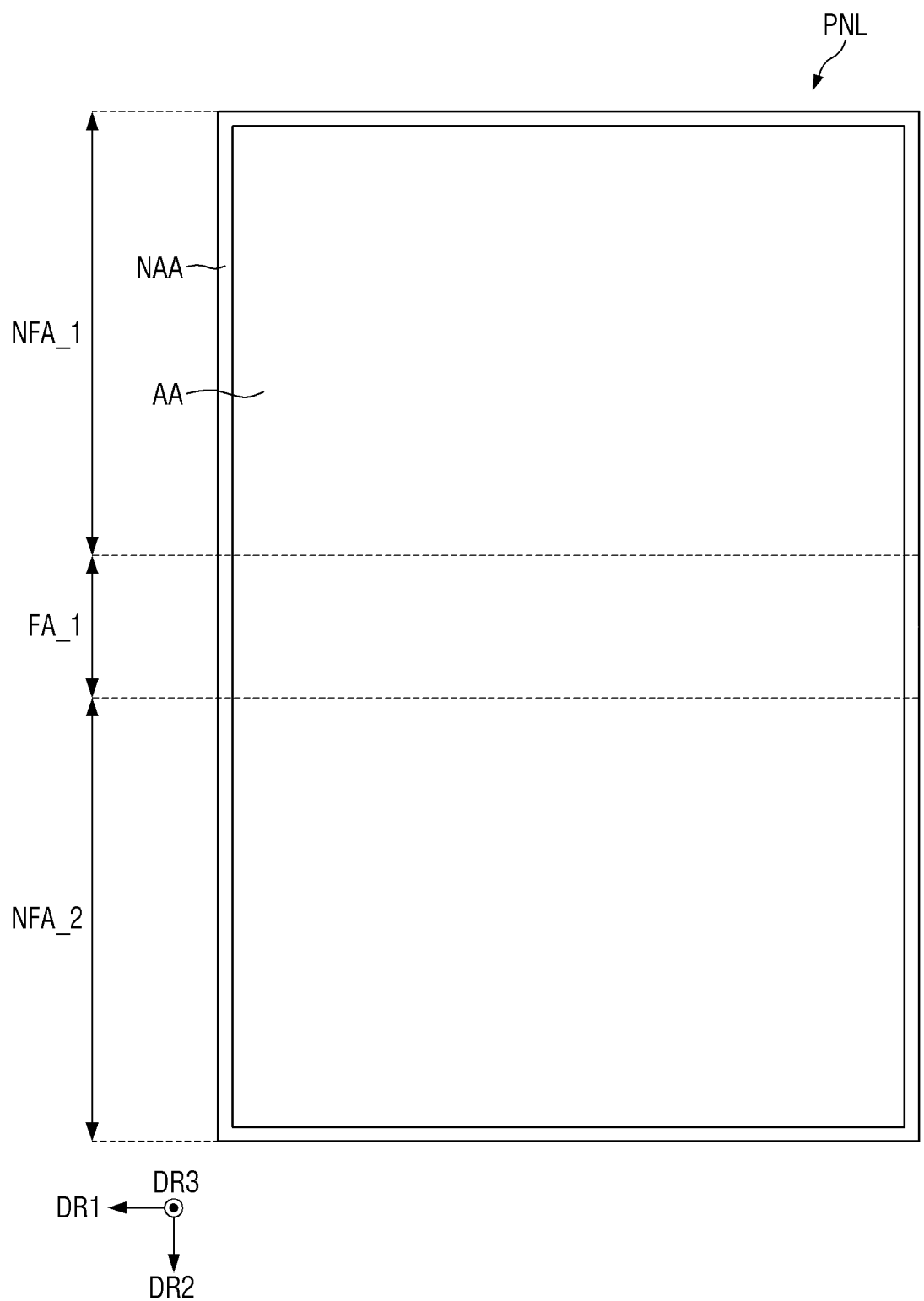
FIG. 5 is a plan view schematically showing the upper surface of the display panel of the display device of FIG. 1.
Figure 6A:
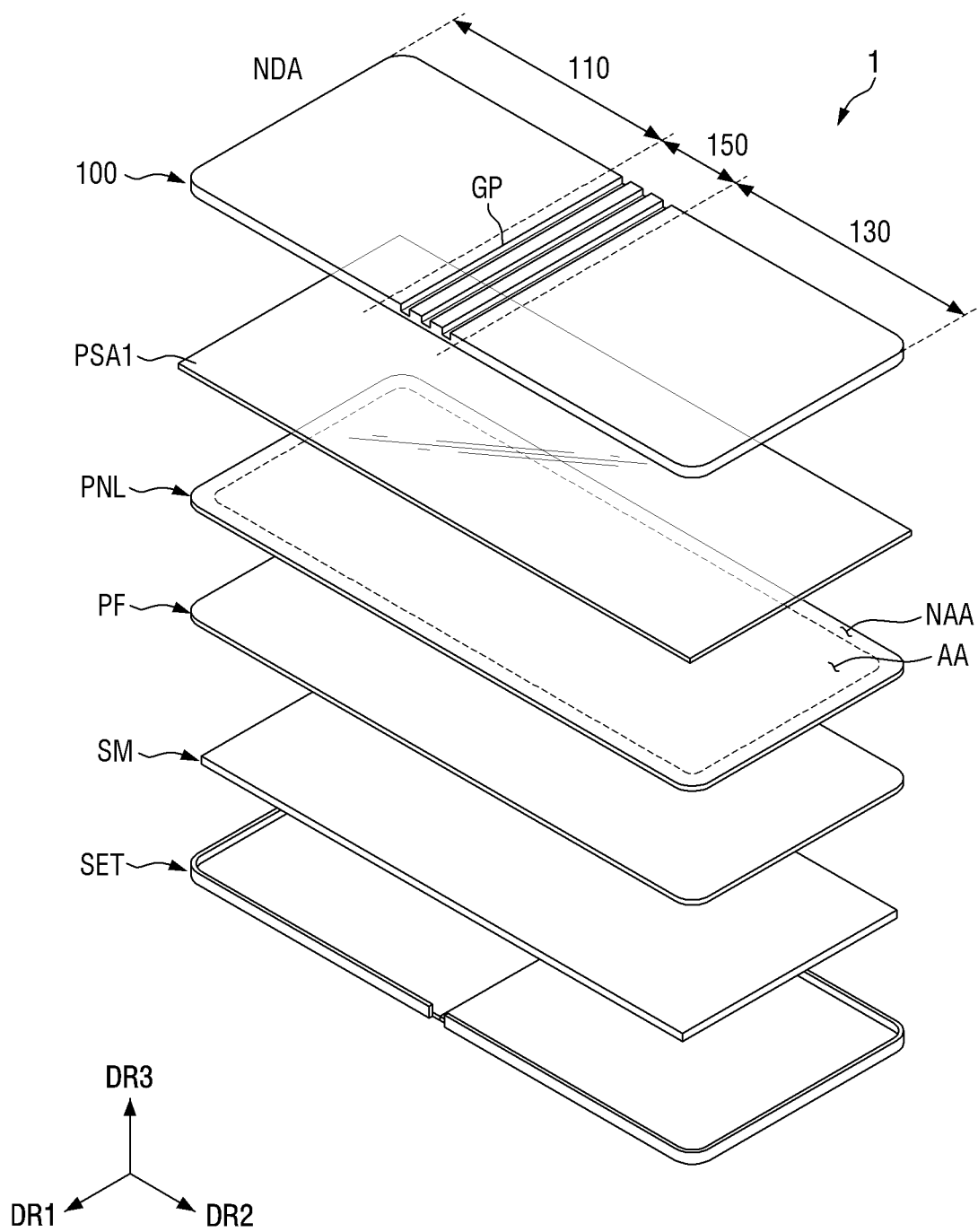
FIG. 6A is a schematic exploded perspective view of the display device shown in FIG. 1.
Figure 6B:
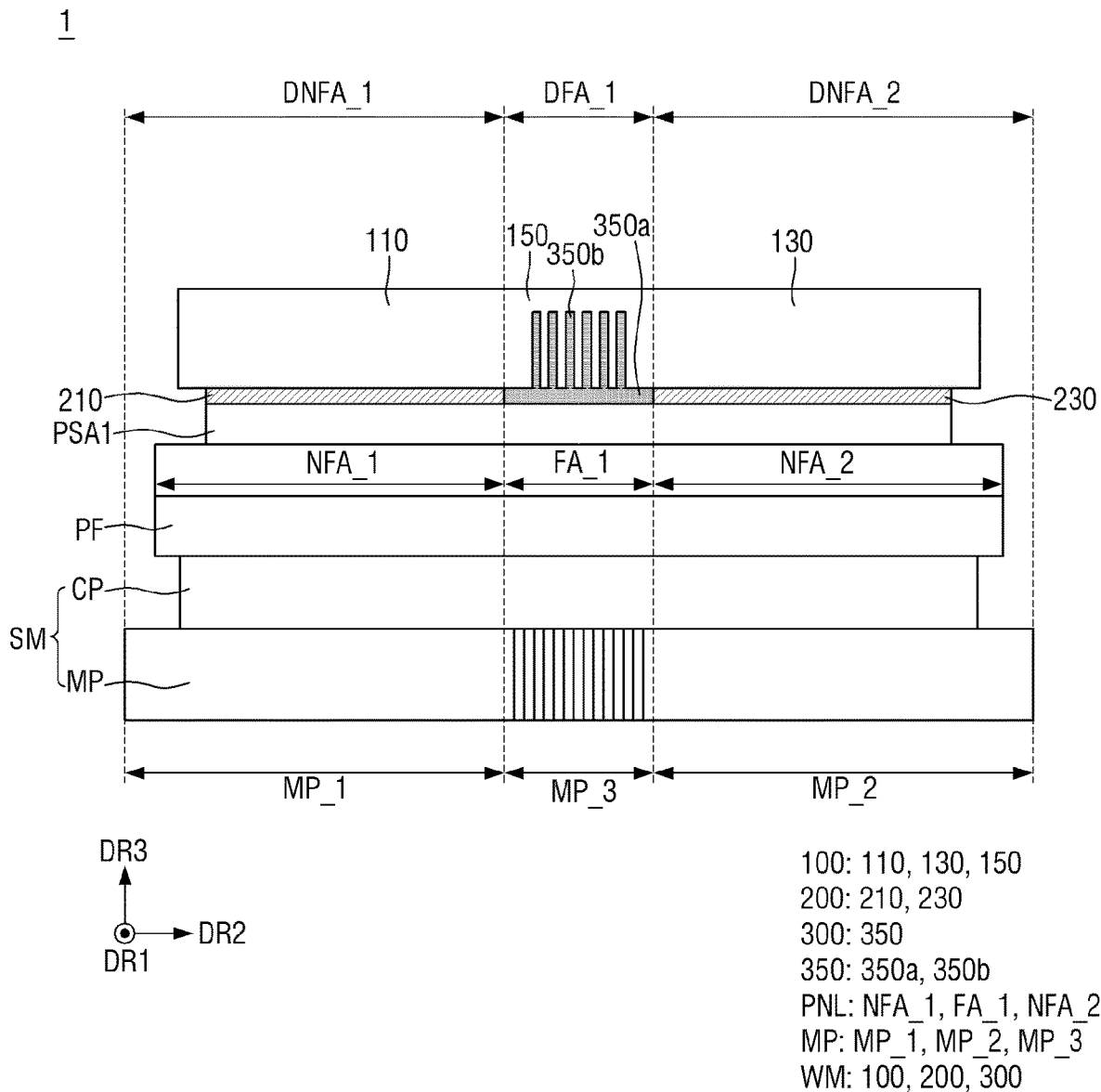
FIG. 6B is a view schematically showing a structure of the display device of FIG. 1 as viewed from the first direction.

FIG. 3 is a cross-sectional view schematically showing a cross section taken along line X1-X1' of FIG. 1. FIG. 4 is a plan view schematically showing the lower surface of the window member of the display device of FIG. 1. FIG. 5 is a plan view schematically showing the upper surface of the display panel of the display device of FIG. 1. FIG. 6A is a schematic exploded perspective view of the display device shown in FIG. 1. FIG. 6B is a view schematically showing a structure of the display device of FIG. 1 as viewed from the first direction.

Referring to FIGS. 3 to 6B, the display device 1 according to the embodiment may include a window member WM, a first adhesive layer PSA1, a display panel PNL, a support film PF, and a sub-module SM, and may further include a set member SET for accommodating them (e.g., the window member WM, the first adhesive layer PSA1, the display panel PNL, the support film PF, the sub-module SM, or the like). The sub-module SM may include a cover plate CP and a metal support MP. In the claims, a side of an element (e.g., the window member WM, the first adhesive layer PSA1, the display panel PNL, the support film PF, the sub-module SM, the set member SET, or the like) in the third direction DR3 may be defined as an upper side, and an opposite side of the element in the third direction DR3 may be defined as a lower side.

The set member SET may accommodate the elements of the display device 1 as shown in FIG. 6A. For example, the set member SET may accommodate the window member WM, the first adhesive layer PSA1, the display panel PNL, the support film PF, and the sub-module SM. Although not shown in the drawings, the set member SET may further include a hinge mechanism for facilitating folding or bending.

The window member WM may protect the display panel PNL from the outside. The window member WM may be disposed on a side of the first adhesive layer PSA1 in the third direction DR3. The window member WM may include a window 100, a cured resin layer 300, and a light-blocking member 200.

The window 100 may work as (e.g., configure) a base of the window member WM. The window 100 may be made of a transparent material, for example, glass or plastic. For example, the window 100 may be an ultra-thin glass having a width in the third direction DR3 (hereinafter referred to as thickness) of about 0.3 mm or less. In an embodiment, the window 100 may include a transparent polyimide film. The window 100 may include a first flat part 110 disposed on the first non-folding area DNFA_1, a second flat part 130 disposed on the second non-folding area DNFA_2, and a first pattern part 150 disposed on the first folding area DFA_1.

A surface of the window 100 in the third direction DR3 may be the upper surface having a flat plate shape. An opposite surface of the window 100 in the third direction DR3 may be the lower surface where a groove pattern GP is formed in the first pattern part 150, and a first light-blocking member 210 and a second light-blocking member 230 may be disposed on the opposite surface of the window 100. In some embodiments, the upper surface of the window member WM of the display device 1 may face the side of the display device 1 in the third direction DR3, and the lower surface thereof may face the opposite side of the display device 1 in the third direction DR3. However, the disclosure is not limited thereto. For example, the lower surface of the window member WM may face the side of the display device 1 in the third direction DR3, and the upper surface of the window member WM may face the opposite side of the display device 1 in the third direction DR3. In the following description, the upper surface of the window member WM faces the side of the display device 1 in the third direction DR3 and the lower surface of the window member WM faces the opposite side of the display device 1 in the third direction DR3 for convenience of illustration.

The first flat part 110 of the window 100 may protect the first non-folding area DNFA_1 which is flat (e.g., always flat). The first flat part 110 may be a part of the window 100 and may be disposed on an opposite side of the window 100 in the second direction DR2 in FIG. 3.

The second flat part 130 of the window 100 may protect the second non-folding area DNFA_2 which is flat (e.g., always flat). The second flat part 130 may be a part of the window 100 and may be disposed on a side of the window 100 in the second direction DR2 in FIG. 3.

The first pattern part 150 of the window 100 may protect the first folding area DFA_1 which is foldable. The first pattern part 150 may be located between the first flat part 110 and the second flat part 130, and the groove pattern GP that is recessed toward the side of the window 100 in the third direction DR3 may be formed in the first pattern part 150 in the thickness direction (e.g., the third direction DR3 in FIG. 3) of the window 100. Thus, the first pattern part 150 may be bent, and the window 100 may be bent more smoothly in case that the display device 1 is folded. Description of the groove pattern GP formed in the first pattern part 150 is provided below.

The light-blocking member 200 disposed on the lower surface of the window 100 may consist of a first light-blocking member 210 and a second light-blocking member 230.

Figure 8:
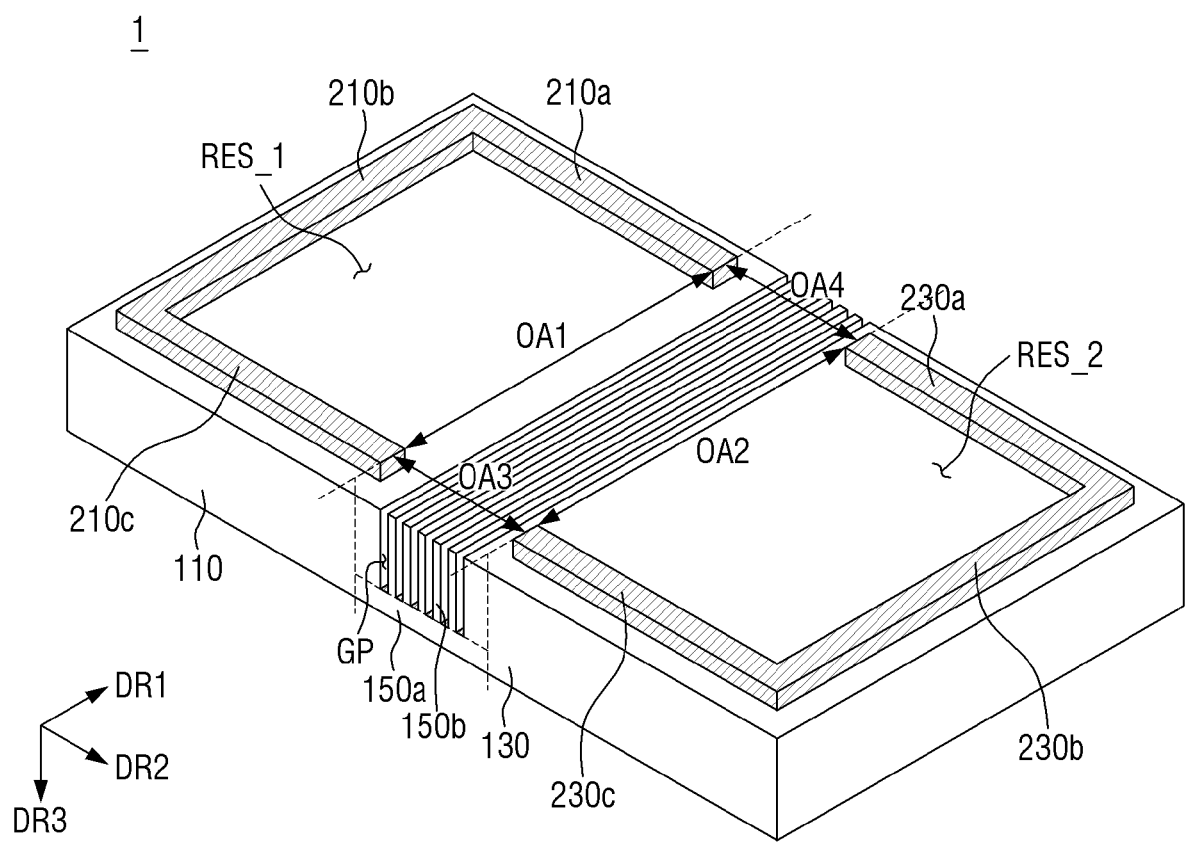
FIG. 8 is a perspective view schematically showing the structure of the window and the light-blocking member of FIG. 7.

The first light-blocking member 210 may form (or be disposed in) the non-display area NDA of the display device 1 and may facilitate the groove pattern GP to be filled with the cured resin layer 300. For example, the first light-blocking member 210 may be disposed in the non-display area NDA of the display device 1, and the cured resin layer 300 may be readily filled in the groove pattern GP by the first light-blocking member 210. The first light-blocking member 210 may be disposed on the lower surface of the first flat part 110 of the window 100 in FIG. 3, and the first light-blocking member 210 may not overlap the first pattern part 150 or the second flat part 130 in a plan view. As shown in FIG. 4, the first light-blocking member 210 may be bent in a C-shape open toward the first pattern part 150 on the lower surface of the first flat part 110. For example, the first light-blocking member 210 may have a C-shape that is extended along the edges of the lower surface of the first flat part 110 to be adjacent to (e.g., surround) the inside of the first flat part 110 and is open toward the first folding area DFA_1. For example, the first light-blocking member 210 may be extended concavely toward the opposite side of the display device 1 in the second direction DR2 along the edges of the lower surface of the first flat part 110 with reference to FIG. 4. In FIG. 4, the first light-blocking member 210 may include a 1-1-th light-blocking member 210a extended along an edge of the lower surface of the first flat part 110 on a side in the first direction DR1 (e.g., an edge in the first direction DR1), a 1-2-th light-blocking member 210b extended along another edge of the lower surface of the first flat part 110 on the opposite side in the second direction DR2 (e.g., another edge in the opposite direction to the second direction DR2), and a 1-3-th light-blocking member 210c extended along another edge of the first flat part 110 on the opposite side in the first direction DR1 (e.g., another edge in the opposite direction to the first direction DR1). Accordingly, as shown in FIG. 8, the first light-blocking member 210 may form a first accommodation space RES_1 having the first light-blocking member 210 as a border. Description of the first accommodation space RES_1 is provided below in more detail. The first light-blocking member 210 may include a black pigment.

The second light-blocking member 230 may form the non-display area NDA of the display device 1 and may facilitate the groove pattern GP to be filled with the cured resin layer 300. For example, the second light-blocking member 230 may be disposed in the non-display area NDA of the display device 1, and the cured resin layer 300 may be readily filled in the groove pattern GP by the second light-blocking member 230. The second light-blocking member 230 may be disposed on the lower surface of the second flat part 130 of the window 100 in FIG. 3, and the second light-blocking member 230 may not overlap the first pattern part 150 or the first flat part 110 in a plan view. As shown in FIG. 4, the second light-blocking member 230 may be bent in a C-shape open toward the first pattern part 150 on the lower surface of the second flat part 130. For example, the second light-blocking member 230 may have a C-shape that is extended along edges of the lower surface of the second flat part 130 to be adjacent to (e.g., surround) the inside of the second flat part 130 and is open toward the first folding area DFA_1. For example, the second light-blocking member 230 may be extended concavely toward the side of the display device 1 in the second direction DR2 along the edges of the lower surface of the second flat part 130 with reference to FIG. 4. In FIG. 4, the second light-blocking member 230 may include a 2-1-th light-blocking member 230a extended along the edge of the lower surface of the second flat part 130 on the side in the first direction DR1 (e.g., the edge in the first direction DR1), a 2-2-th light-blocking member 230b extended along the edge of the lower surface of the second flat part 130 on the opposite side in the second direction DR2 (e.g., the edge in the second direction DR2), and a 2-3-th light-blocking member 230c extended along the edge of the lower surface of the second flat part 130 on the opposite side in the first direction DR1 (e.g., the edge in the opposite direction to the first direction DR1). Accordingly, as shown in FIG. 8, the second light-blocking member 230 may form a second accommodation space RES_2 having the second light-blocking member 230 as a border. Description of the second accommodation space RES_2 is provided below in more detail. The second light-blocking member 230 may include a black pigment.

The first light-blocking member 210 and the second light-blocking member 230 may be spaced apart from each other with the first pattern part 150 therebetween on the lower surface of the window 100. Accordingly, no separate light-blocking member may be disposed on the lower surface of the first pattern part 150 of the window 100, and the window 100 may be bent more smoothly.

Each of the first light-blocking member 210 and the second light-blocking member 230 may have a constant first width W1 and may be bent in the above-described shape. The first light-blocking member 210 and the second light-blocking member 230 may have a width (e.g., a predetermined or selectable width) to work as (e.g., configure) dams for filling the groove pattern GP with the cured resin layer 300 in a method of fabricating the window member WM. The method of fabricating the window member WM is provided below. Accordingly, the first width W1 may be in a range of about 50 μm to about 500 μm. In case that the first width W1 is less than about 50 μm, the first light-blocking member 210 and the second light-blocking member 230 may fail to work as (e.g., configure) a dam, and the first light-blocking member 210 and the second light-blocking member 230 may not be filled with the cured resin layer 300. If the first width W1 is greater than about 500 μm, the first light-blocking member 210 and the second light-blocking member 230 may overlap an active area AA of the display panel PNL in a plan view, and thus the image quality may be deteriorated. Description of the active area AA of the display panel PNL is provided below.

During the process, each of the first light-blocking member 210 and the second light-blocking member 230 may be spaced apart from the edges of the lower surface of the window 100 by a distance (e.g., a predetermined or selectable distance).

The first light-blocking member 210 may be spaced apart from the edges of the lower surface of the first flat part 110 by a distance. The 1-1-th light-blocking member 210a and the edge of the lower surface of the first flat part 110 on the side in the first direction DR1 (e.g., the edge in the first direction DR1) may be spaced apart from each other by a second width W2. The 1-2-th light-blocking member 210b and the edge of the lower surface of the first flat part 110 on the opposite side in the second direction DR2 (e.g., the edge in the opposite direction to the second direction DR2) may be spaced apart from each other by the second width W2. The 1-3-th light-blocking member 210c and the edge of the lower surface of the first flat part 110 on the opposite side in the first direction DR1 (e.g., the edge in the opposite direction to the first direction DR1) may be spaced apart from each other by the second width W2. In some embodiments, the second width W2 may be in a range of about 50 μm to about 150 μm, but is not limited thereto.

The 1-1-th light-blocking member 210a, the 1-2-th light-blocking member 210b, and the 1-3-th light-blocking member 210c may be formed as a single piece (or may be integral with one another). In some embodiments, the 1-1-th light-blocking member 210a and the 1-2-th light-blocking member 210b may be in contact with each other to form a corner (e.g., rigid corner), and the 1-3-th light-blocking member 210c and the 1-2-th light-blocking member 210b may be in contact with each other to form a corner (e.g., rigid corner). However, the disclosure is not limited thereto. For example, the 1-1-th light-blocking member 210a and the 1-2-th light-blocking member 210b may be in contact with each other with a curvature, and the 1-3-th light-blocking member 210c and the 1-2-th light-blocking member 210b may be in contact with each other to form a curvature.

The second light-blocking member 230 may be spaced apart from the edges of the lower surface of the second flat part 130 by a distance. The 2-1-th light-blocking member 230a and the edge of the lower surface of the second flat part 130 on the side in the first direction DR1 (e.g., the edge in the first direction DR1) may be spaced apart from each other by a second width W2. The 2-2-th light-blocking member 230b and the edge of the lower surface of the second flat part 130 on the opposite side in the second direction DR2 (e.g., the edge in the second direction DR2) may be spaced apart from each other by the second width W2. The 2-3-th light-blocking member 230c and the edge of the lower surface of the second flat part 130 on the opposite side in the first direction DR1 (e.g., the edge in the opposite direction to the first direction DR1) may be spaced apart from each other by the second width W2. In some embodiments, the second width W2 may be in a range of about 50 μm to about 150 μm, but is not limited thereto.

The 2-1-th light-blocking member 230a, the 2-2-th light-blocking member 230b and the 2-3-th light-blocking member 230c may be formed as a single piece (or may be integral with one another). In some embodiments, the 2-1-th light-blocking member 230a and the 2-2-th light-blocking member 230b may be in contact with each other to form a corner (e.g., rigid corner), and the 2-3-th light-blocking member 230c and the 2-2-th light-blocking member 230b may be in contact with each other to form a corner (e.g., rigid corner). However, the disclosure is not limited thereto. For example, the 2-1-th light-blocking member 230a and the 2-2-th light-blocking member 230b may be in contact with each other with a curvature, and the 2-3-th light-blocking member 230c and the 2-2-th light-blocking member 230b may be in contact with each other to form a curvature.

The cured resin layer 300 may prevent the groove pattern GP of the first pattern part 150 from being recognized by a user, and may improve adhesion between the window member WM and other element layers of the display device 1. The cured resin layer 300 may be disposed on the lower surface of the window 100, and may be used to fill the first accommodation space RES_1 on the first flat part 110, the second accommodation space RES_2 on the second flat part 130, and the groove pattern GP of the first pattern part 150. Accordingly, the cured resin layer 300 may match (or have) different refractive indexes for different portions of the window 100. Thus, reflex index of the window 100 may be matched. In some embodiments, the cured resin layer 300 may be a UV curable resin, but is not limited thereto.

The cured resin layer 300 may include a first portion 310 used to fill the first accommodation space RES_1, a second portion 330 used to fill the second accommodation space RES_2, and a third portion 350 used to fill the groove pattern GP of the first pattern part 150. The first portion 310, the second portion 330, and the third portion 350 may be connected with one another. The first portion 310 may follow (or may have the same shape as) the shape of the first accommodation space RES_1. The second portion 330 may follow (or may have the same shape as) the shape of the second accommodation space RES_2. The third portion 350 may follow (or may have the same shape as) the shape of the groove pattern GP.

The cured resin layer 300 may have a shape protruding from sides (e.g., both sides) of the first pattern part 150 in the first direction DR1. In FIG. 4, the width of the third portion 350 in the first direction DR1 may be greater than the width of the first portion 310 in the first direction DR1 and the width of the second portion 330 in the first direction DR1. The widths of the first portion 310, the second portion 330, and the third portion 350 in the first direction DR1 may be formed by a process for fabricating the window member WM. Description of the process for fabricating the window member WM is provided below. Accordingly, the groove pattern GP of the window 100 may be filled (e.g., completely filled) with the third portion 350 of the cured resin layer 300. Description of the pattern of the grooves GP is provided below in more detail.

The display panel PNL may be disposed under the window member WM and may be attached to the window member WM, and the first adhesive layer PSA1 may be interposed between the window member WM and the display panel PNL. A surface of the display panel PNL in the third direction DR3 may be an upper surface on which the first adhesive layer PSA1 is disposed, and an opposite surface of the display panel PNL in the third direction DR3 may be a lower surface on which a support film PF is disposed. Description of the support film PF is provided below. In some embodiments, the cured resin layer 300 disposed on the lower surface of the window 100 and the upper surface of the display panel PNL may face each other, but the disclosure is not limited thereto. For example, the upper surface of the window 100 and the upper surface of the display panel PNL may face each other.

The display panel PNL may display images thereon. Various kinds of display panels may be employed as the display panel PNL according to the embodiment. For example, display panels such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, and an inorganic light-emitting display panel using inorganic light-emitting elements including an inorganic semiconductor may be employed as the display panel PNL. Referring to FIG. 1, the display panel PNL may display images on a the side of the display device 1 in the third direction DR3.

The display panel PNL may include a first non-folding area NFA_1 located in the first non-folding area DNFA_1 of the display device 1, a second non-folding area NFA_2 located in the second non-folding area DNFA_2 of the display device 1, and a first folding area FA_1 located in the first folding area DFA_1 of the display device 1. Accordingly, with reference to FIG. 5, the first non-folding area NFA_1 may be located on an opposite side of the display panel PNL in the second direction DR2 as a part of the display panel PNL. The second non-folding area NFA_2 may be located on a side of the display panel PNL in the second direction DR2 as a part of the display panel PNL. The first folding area FA_1 may be located between the first non-folding area NFA_1 and the second non-folding area NFA_2 as a part of the display panel PNL.

The first non-folding area NFA_1 of the display panel PNL may overlap the first light-blocking member 210 in the third direction DR3. The second non-folding area NFA_2 may overlap the second light-blocking member 230 in the third direction DR3. The first folding area FA_1 may overlap a space between the first light-blocking member 210 and the second light-blocking member 230 in the third direction DR3.

The display panel PNL may include an active area AA defining the display area DA of the display device 1, and a non-active area NAA adjacent to (e.g., surrounding) the active area AA. Each of the first non-folding area NFA_1, the second non-folding area NFA_2, and the first folding area FA_1 may include at least a part of the active area AA and at least a part of the non-active area NAA. Although not shown in the drawings, the active area AA of the display panel PNL may include pixels emitting light, and the non-active area NAA may include no pixels.

The active area AA of the display panel PNL may not overlap the first light-blocking member 210 and the second light-blocking member 230 in the third direction DR3. The non-active area NAA of the display panel PNL may overlap the first light-blocking member 210 and the second light-blocking member 230 in the third direction DR3.

The support film PF may support the display panel PNL and protect the lower surface of the display panel PNL. The support film PF may be disposed on an opposite surface (hereinafter referred to as a lower surface) of the display panel PNL in the third direction DR3. The support film PF may be a plastic such as polyethylene terephthalate, polyimide, or the like. For example, the support film PF may include a combination thereof. Although the support film PF is also disposed in the first folding part DFA_1 of the display device 1 in the example shown in FIGS. 3 and 6, embodiments of the disclosure are not limited thereto. For example, the support film PF may be removed from the first folding area DFA_1 of the display device 1, and the display device 1 may be folded smoothly.

The cover plate CP may be disposed on an opposite surface (hereinafter referred to as a lower surface) of the support film PF in the third direction DR3. The cover plate CP may include at least one of a light-blocking portion for absorbing light incident from the outside, a buffer portion for absorbing external shock (or impact), and a heat dissipating portion for efficiently discharging heat from the display panel PNL.

The light-blocking portion may block the transmission of light to prevent the elements disposed under the cover plate CP from being seen from a front surface of the display panel PNL. For example, an element such as a digitizer may not be viewed from the front surface of the display panel PNL by the light-blocking portion. Description of the digitizer is provided below. The light-blocking portion may include a light-absorbing material such as a black pigment, a black dye, or the like.

The buffer portion may absorb the external shock (or impact) to prevent the display panel PNL from being damaged. For example, the buffer portion may protect the display panel PNL from the external shock (or impact). The buffer portion may be made up of a single layer or multiple layers. For example, the buffer portion may be formed of a polymer resin including at least one of polyurethane, polycarbonate, polypropylene and polyethylene, or an elastic material such as a rubber, and a sponge formed by foaming a urethane-based material or an acrylic-based material.

The heat-dissipating member may include a first heat dissipation layer including graphite or carbon nanotubes and a second heat dissipation layer formed of a thin metal film such as copper, nickel, ferrite, silver, or the like. The second heat dissipation layer may block electromagnetic waves and have high thermal conductivity.

The metal support MP may support the lower surface of the display panel PNL. The metal support MP may be disposed on the opposite surface of the cover plate CP in the third direction DR3. The metal support MP may be a rigid member that does not readily change shape or volume due to external pressure. In some embodiments, the metal support MP may include a metal, but is not limited thereto. For example, the metal support MP may include carbon fiber reinforced plastics (CFRP) including a carbon fiber yarn and a resin surrounding (e.g., coating) the carbon fiber yarn.

The metal support MP may include a first flat plate MP_1 and a second flat plate MP_2. The first flat plate MP_1 may be disposed on the first non-folding area DNFA_1 of the display device 1, and the display device 1 may not be deformed by an external force in the first non-folding area DNFA_1. The second flat plate MP_2 may be disposed on the second non-folding area DNFA_2 of the display device 1, and the display device 1 may not be deformed by an external force in the second non-folding area DNFA_2. The first flat plate MP_1 may overlap the first light-blocking member 210 in the third direction DR3, and the second flat plate MP_2 may overlap the second light-blocking member 230 in the third direction DR3. The metal support MP may include a first grid pattern MP_3 disposed in the folding area DFA_1 of the display device 1, and the display device 1 may be readily folded in the first folding area DFA_1. The first grid pattern MP_3 may be disposed between the first flat plate MP_1 and the second flat plate MP_2. The first grid pattern MP_3 may overlap the space between the first light-blocking member 210 and the second light-blocking member 230 in the third direction DR3.

Although not shown in the drawings, the digitizer which senses a magnetic field of electromagnetic signal from an electronic pin, etc., to serve to (or be configured to) determine touch coordinates may be further disposed under the metal support MP.

With the above-described configuration, no separate light-blocking member 200 is disposed in the first folding area DFA_1 of the display device 1 according to the embodiment. Thus, the first folding area DFA_1 may be folded more smoothly, and the groove pattern GP of the window 100 may not be recognized by the user.

Description of the structure of the window member WM of the display device 1 according to the embodiment of the disclosure is provided below in detail.

Figure 7:
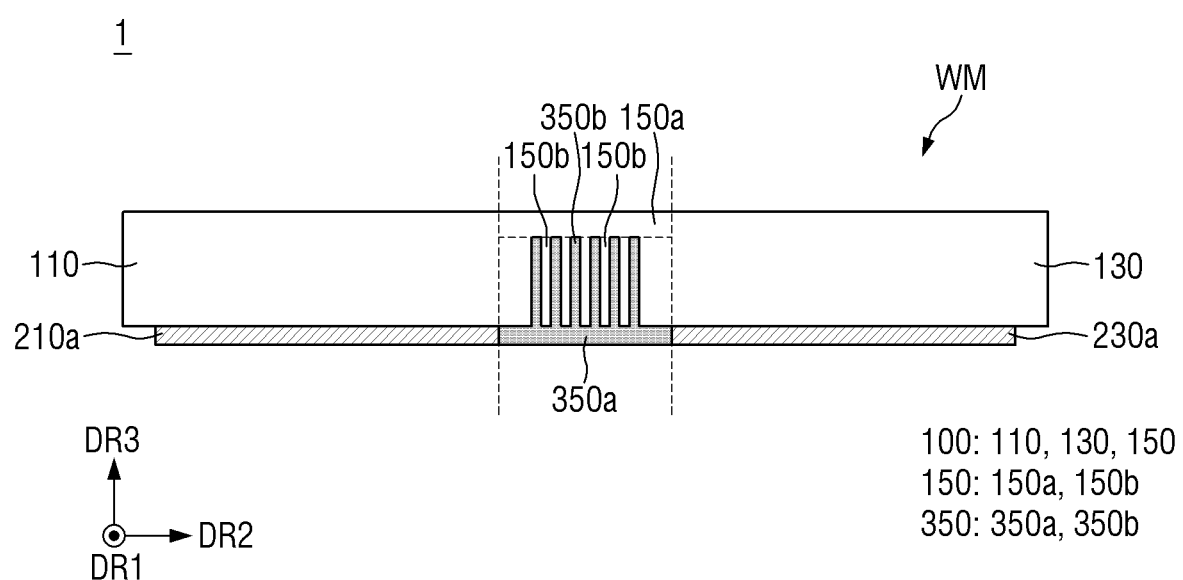
FIG. 7 is a schematic view showing a side surface of the window member of the display device of FIG. 1.
Figure 9:
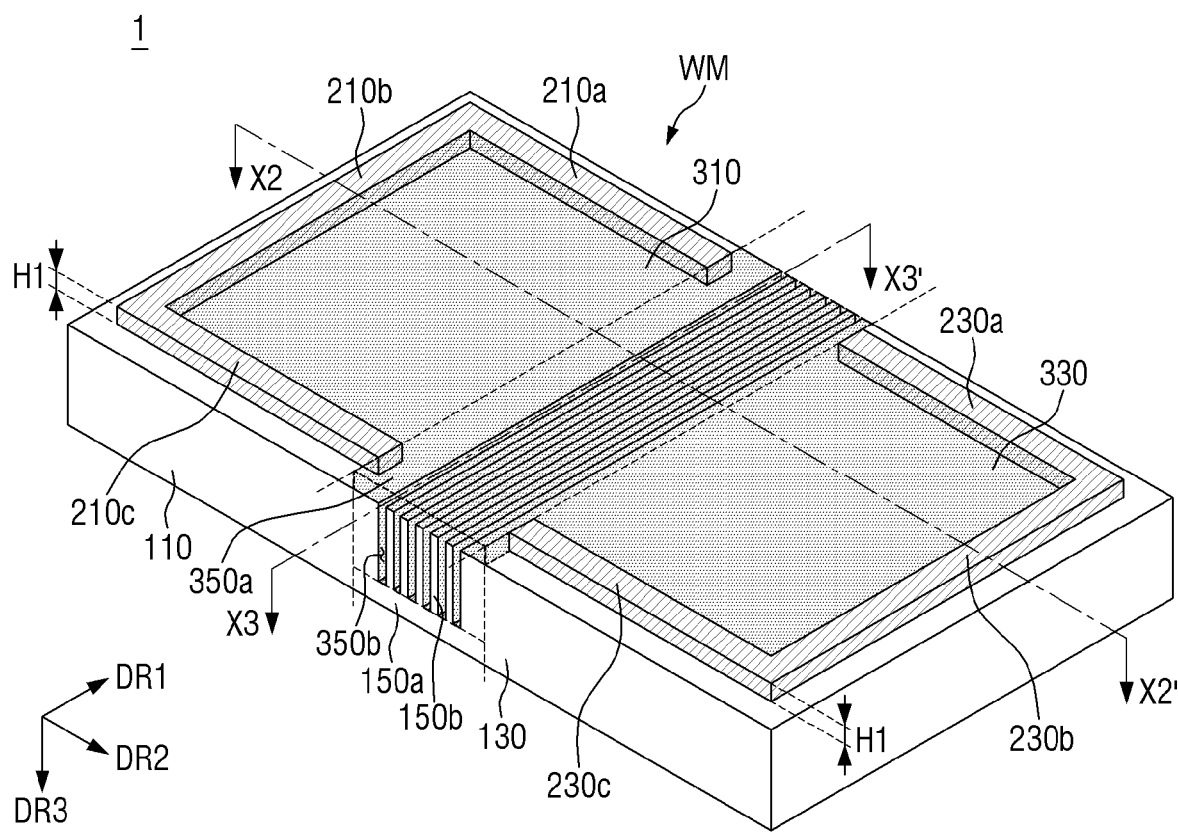
FIG. 9 is a perspective view schematically showing the structure of the window member of FIG. 7.
Figure 10:
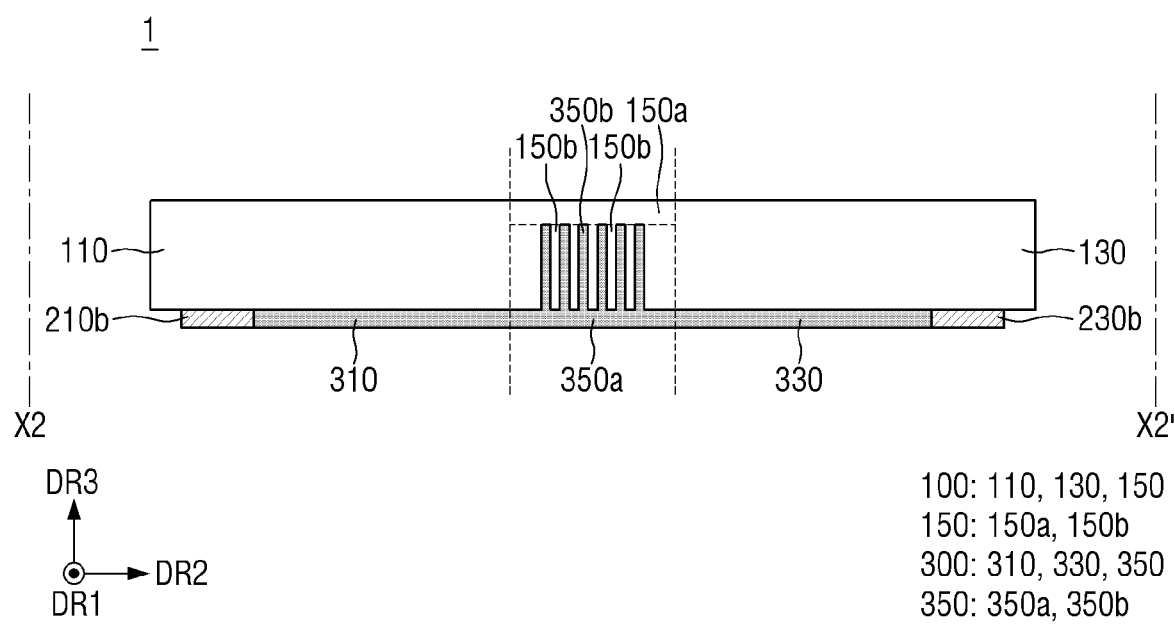
FIG. 10 is a schematic cross-sectional view taken along line X2-X2' of FIG. 9.
Figure 11:
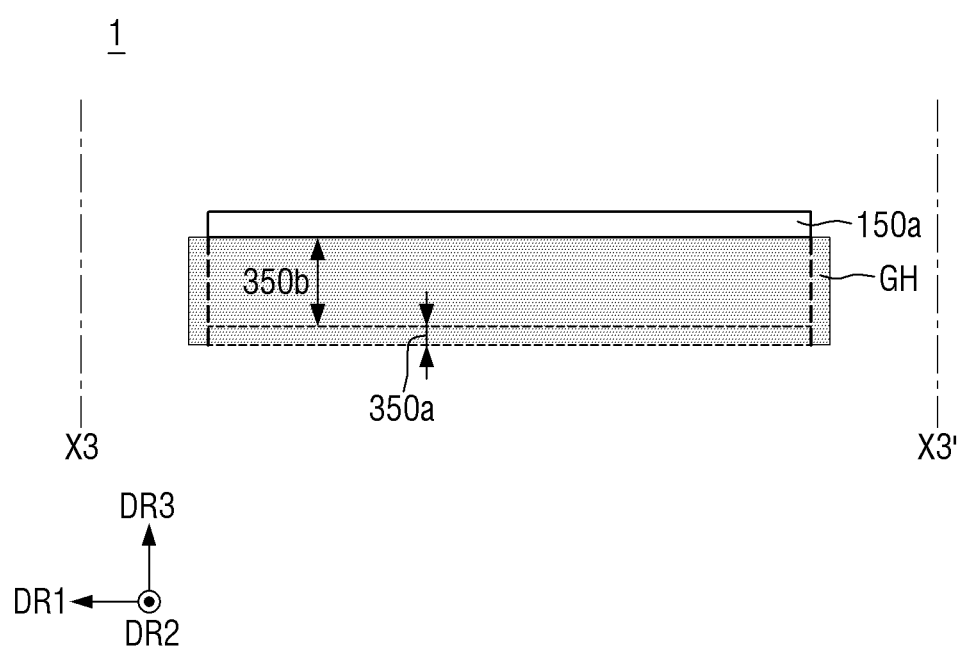
FIG. 11 is a schematic cross-sectional view taken along line X3-X3' of FIG. 9.

FIG. 7 is a schematic view showing a side surface of the window member of the display device of FIG. 1. FIG. 8 is a perspective view schematically showing the structure of the window and the light-blocking member of FIG. 7. FIG. 9 is a perspective view schematically showing the structure of the window member of FIG. 7. FIG. 10 is a schematic cross-sectional view taken along line X2-X2' of FIG. 9. FIG. 11 is a schematic cross-sectional view taken along line X3-X3' of FIG. 9.

Referring to FIGS. 7 to 11, in the first pattern part 150 of the window 100 of the window member WM according to the embodiment, a fine groove pattern GP may be concaved in the thickness direction (e.g., third direction DR3) of the window 100.

The first pattern part 150 of the window 100 may include a bridge 150a and multiple protrusions 150b.

The bridge 150a of the window 100 may connect the first flat part 110 with the second flat part 130. Referring to FIG. 7, a surface of the bridge 150a in the third direction DR3 may be an upper surface of the window 100, which is recognized by a user, and an opposite surface of the bridge 150a in the third direction DR3 may be a lower surface of the window 100 where the protrusions 150b are formed.

The upper surface of the bridge 150a, the upper surface of the first flat part 110, and the upper surface of the second flat part 130 may be on a same plane. For example, the upper surface of the bridge 150a, the upper surface of the first flat part 110, and the upper surface of the second flat part 130 may be connected in parallel with one another to form the plane defined in the first direction DR1 and the second direction DR2. The upper surface of the bridge 150a, the upper surface of the first flat part 110, and the upper surface of the second flat part 130 may be the upper surface of the window 100.

The protrusions 150b may facilitate the bending of the window 100. For example, the window 100 may be readily bent by the protrusions 150b. The protrusions 150b may protrude from the lower surface of the bridge 150a toward the opposite side of the display device 1 in the third direction DR3. The protrusions 150b may be extended in the first direction DR1 and spaced apart from each other in the second direction DR2. Spaces between every two of the protrusions 150b may be defined as the groove pattern GP. In other embodiments, the groove pattern GP may be the spaces extended in the first direction DR1 between the protrusions 150b (e.g., adjacent ones of the protrusions 150b), and may penetrate the side surfaces of the window 100, i.e., sides (e.g., both sides) of the window 100 in the first direction DR1.

As shown in FIG. 8, the first light-blocking member 210 may be concavely bent toward the opposite side of the display device 1 in the second direction DR2 (or the opposite direction to the second direction DR2) along the edges of the lower surface of the first flat part 110 to form the first accommodation space RES_1 on the lower surface of the first flat part 110. The first accommodation space RES_1 may be a space accommodating the first portion 310 of the cured resin layer 300 using the first light-blocking member 210 as a dam. The first light-blocking member 210 may include the 1-1-th light-blocking member 210a extended along the edge of the lower surface of the first flat part 110 on the side in the first direction DR1 (e.g., the edge in the first direction DR1), the 1-2-th light-blocking member 210b extended along the edge of the lower surface of the first flat part 110 on the opposite side in the second direction DR2 (e.g., the edge in the opposite direction to the second direction DR2), and the 1-3-th light-blocking member 210c extended along the edge of the first flat part 110 on the opposite side in the first direction DR1 (e.g., the edge in the opposite direction to the first direction DR1). The first accommodation space RES_1 may be a space surrounded by the 1-1-th light-blocking member 210a, the 1-2-th light-blocking member 210b, and the 1-3-th light-blocking member 210c. The 1-1-th light-blocking member 210a and the 1-3-th light-blocking member 210c may be spaced apart from each other in the first direction DR1, to form a first open area OA1 defined as a space between an end of the 1-1-th light-blocking member 210a in the second direction DR2 and an end of the 1-3-th light-blocking member 210c in the second direction DR2. The 1-2-th light-blocking member 210b may connect the 1-1-th light-blocking member 210a with the 1-3-th light-blocking member 210c. Accordingly, a side of the first accommodation space RES_1 in the second direction DR2 is not blocked by the first light-blocking member 210, and may be exposed toward the first pattern part 150.

The first light-blocking member 210 may have a width (e.g., a predetermined or selectable width) (or height) H1 in the third direction DR3 (hereinafter referred to as thickness) to work as (e.g., configure) the dam of the first accommodation space RES_1. For example, the volume of the cured resin layer 300 that may be accommodated in the first accommodation space RES_1 may depend on the height of the first light-blocking member 210. Thus, each of the 1-1-th light-blocking member 210a, the 1-2-th light-blocking member 210b, and the 1-3-th light-blocking member 210c may have a constant first thickness H1. When the first thickness H1 is less than about 30 μm, the first light-blocking member 210 may fail to work as (e.g., configure) the dam. When the first thickness H1 is about 50 μm or more, the thickness of the window member WM may be larger than necessary and the display quality of the display device 1 may be deteriorated. Accordingly, in some embodiments, the first thickness H1 may be in a range of about 30 μm to about 50 μm, but is not limited thereto.

As shown in FIG. 8, the second light-blocking member 230 may be concavely bent toward a side of the display device 1 in the second direction DR2 along the edges of the lower surface of the second flat part 130 to form the second accommodation space RES_2 on the lower surface of the second flat part 130. The second accommodation space RES_2 may be a space accommodating the second portion 330 of the cured resin layer 300 using the second light-blocking member 230 as a dam. The second light-blocking member 230 may include the 2-1-th light-blocking member 230a extended along the edge of the lower surface of the second flat part 110 on the side in the first direction DR1 (e.g., the edge in the first direction DR1), the 2-2-th light-blocking member 230b extended along the edge of the lower surface of the second flat part 130 on the side in the second direction DR2 (e.g., the edge in the second direction DR2), and the 2-3-th light-blocking member 230c extended along the edge of the second flat part 130 on the opposite side in the first direction DR1 (e.g., the edge in the opposite direction to the first direction DR1). The second accommodation space RES_2 may be a space surrounded by the 2-1-th light-blocking member 230a, the 2-2-th light-blocking member 230b and the 2-3-th light-blocking member 230c. The 2-1-th light-blocking member 230a and the 2-3-th light-blocking member 230c may be spaced apart from each other in the first direction DR1, to form a second open area OA2 defined as a space between an opposite end of the 2-1-th light-blocking member 230a in the second direction DR2 and an opposite end of the 2-3-th light-blocking member 230c in the second direction DR2. The 2-2-th light-blocking member 230b may connect the 2-1-th light-blocking member 230a with the 2-3-th light-blocking member 230c. Accordingly, an opposite side of the second accommodation space RES_2 in the second direction DR2 is not blocked by the second light-blocking member 230, and may be exposed toward the first pattern part 150.

Like the first light-blocking member 210, the second light-blocking member 230 may also have a thickness (e.g., a predetermined or selectable thickness) to work as (e.g., configure) a dam of the second accommodation space RES_2. The thickness of the first light-blocking member 210 may be substantially equal to the thickness of the second light-blocking member 230. Therefore, detailed description of the same constituent elements is omitted.

The 1-3-th light-blocking member 210c of the first light-blocking member 210 and the 2-3-th light-blocking member 230c of the second light-blocking member 230 may be spaced apart from each other in the second direction DR2 with the first pattern part 150 therebetween to form a third open area OA3. The 1-1-th light-blocking member 210a of the first light-blocking member 210 and the 2-1-th light-blocking member 230a of the second light-blocking member 230 may be spaced apart from each other in the second direction DR2 with the first pattern part 150 therebetween to form a fourth open area OA4.

The first light-blocking member 210 and the second light-blocking member 230 may be spaced apart from the groove pattern GP of the first pattern part 150 by a distance. The end of the 1-1-th light-blocking member 210a and the end of the 1-2-th light-blocking member 210b of the first light-blocking member 210 in the second direction DR2 may be spaced apart from the opposite end of the groove pattern GP in the second direction DR2. The opposite end of the 2-1-th light-blocking member 230a and the opposite end of the 2-2-th light-blocking member 230b of the second light-blocking member 230 in the second direction DR2 may be spaced apart from the end of the groove pattern GP in the second direction DR2. In some embodiments, the distance between the first light-blocking member 210 and the groove pattern GP and the distance between the second light-blocking member 230 and the groove pattern GP may be in a range of about 50 μm to about 150 μm, but is not limited thereto.

Referring to FIG. 9, as described above, the cured resin layer 300 may include the first portion 310 used to fill the first accommodation space RES_1, the second portion 330 used to fill the second accommodation space RES_2, and the third portion 350 used to fill an area on the first pattern part 150 as the space between the groove pattern GP and the first portion 310 and the space between the groove pattern GP and the second portion 330.

The first accommodation space RES_1 and the second accommodation space RES_2 may be filled (e.g., completely filled) with the cured resin layer 300. Referring to FIG. 10, the opposite end of the first portion 310 of the cured resin layer 300 in the second direction DR2 may be in contact with the 1-2-th light-blocking member 210b, and an end of the second portion 330 in the second direction DR2 may be in contact with the 2-2-th light-blocking member 230b. The shape of the first portion 310 may be substantially identical to that of the first accommodation space RES_1, and the shape of the second portion 330 may be substantially identical to that of the second accommodation space RES_2.

The third portion 350 of the cured resin layer 300 may include a 3-1-th portion 350a connecting the first portion 310 with the second portion 330, and 3-2-th portions 350b used to fill the groove pattern GP. The third portion 350 may have a shape in which the 3-2-th portions 350b protrudes from the 3-1-th portion 350a toward the side of the display device 1 in the third direction DR3 in FIG. 10. In some embodiments, the width of the 3-1-th portion 350a in the first direction DR1 may be substantially equal to the width of the 3-2-th portion 350b in the first direction DR1, but the disclosure is not limited thereto.

The groove pattern GP formed in the first pattern part 150 may be filled (e.g., completely filled) with the 3-2-th portion 350b of the cured resin layer 300. Referring to FIG. 11, the width of the 3-2-th portion 350b of the cured resin layer 300 in the first direction DR1 may be greater than the width of the bridge 150a in the first direction DR1. The third portion 350 may further include leakages GH. The width of the 3-2-th portion 350b of the cured resin layer 300 in the first direction DR1, which is used to fill the groove pattern GP, may be substantially equal to the width of the bridge 150a in the first direction DR1. The leakages GH may further be disposed on sides (e.g., both sides) of the 3-2-th portion 350b in the first direction DR1, and the width of the third portion 350 in the first direction DR1 may be greater than the width of the bridge 150a in the first direction DR1 by the width of the leakages GH in the first direction DR1. Accordingly, the width of the third portion 350 in the first direction DR1 may be greater than the width of the first portion 310 in the first direction DR1 and the width of the second portion 330 in the first direction DR1. For example, the end of the 1-1-th light-blocking member 210a in the second direction DR2 and the end of the 1-3-th light-blocking member 210c in the second direction DR2 may be in contact with the opposite end of the 3-1-th portion 350a in the second direction DR2. The opposite end of the 2-1-th light-blocking member 230a in the second direction DR2 and the opposite end of the 2-3-th light-blocking member 230c in the second direction DR2 may be in contact with the end (or side) of the 3-1-th portion 350a in the second direction DR2. The width of the 3-1-th portion 350a in the first direction DR1 may be substantially equal to or greater than the width of the first pattern part 150 of the window 100 in the first direction DR1. For example, the width of the third portion 350 in the first direction DR1 may be greater than the width of the first light-blocking member 210 in the first direction DR1 and the width of the second light-blocking member 230 in the first direction DR1.

With the above-described configuration, the groove pattern GP may be filled (e.g., completely filled) with the third portion 350 of the cured resin layer 300, and no air bubbles is formed in the groove pattern GP. The groove pattern GP without the air bubble may be formed by the fabricating process of the window member WM. Detailed description of the fabricating process of the window member WM is provided below.

Description of a process of fabricating the window 100 of the window member WM of the display device 1 according to the embodiment is provided below.

FIGS. 12A to 12D are schematic views for illustrating a process of forming the groove pattern in the window of the window member of FIG. 7. Grooves GV1 and GV2 described with reference to FIGS. 12A to 12D may refer to the groove pattern GP of the window 100 according to the embodiment of the disclosure. A mother substrate 100' described with reference to FIGS. 12A to 12D may refer to the window 10 before the groove pattern GP is formed in the mother substrate 100'.

Figure 12A:
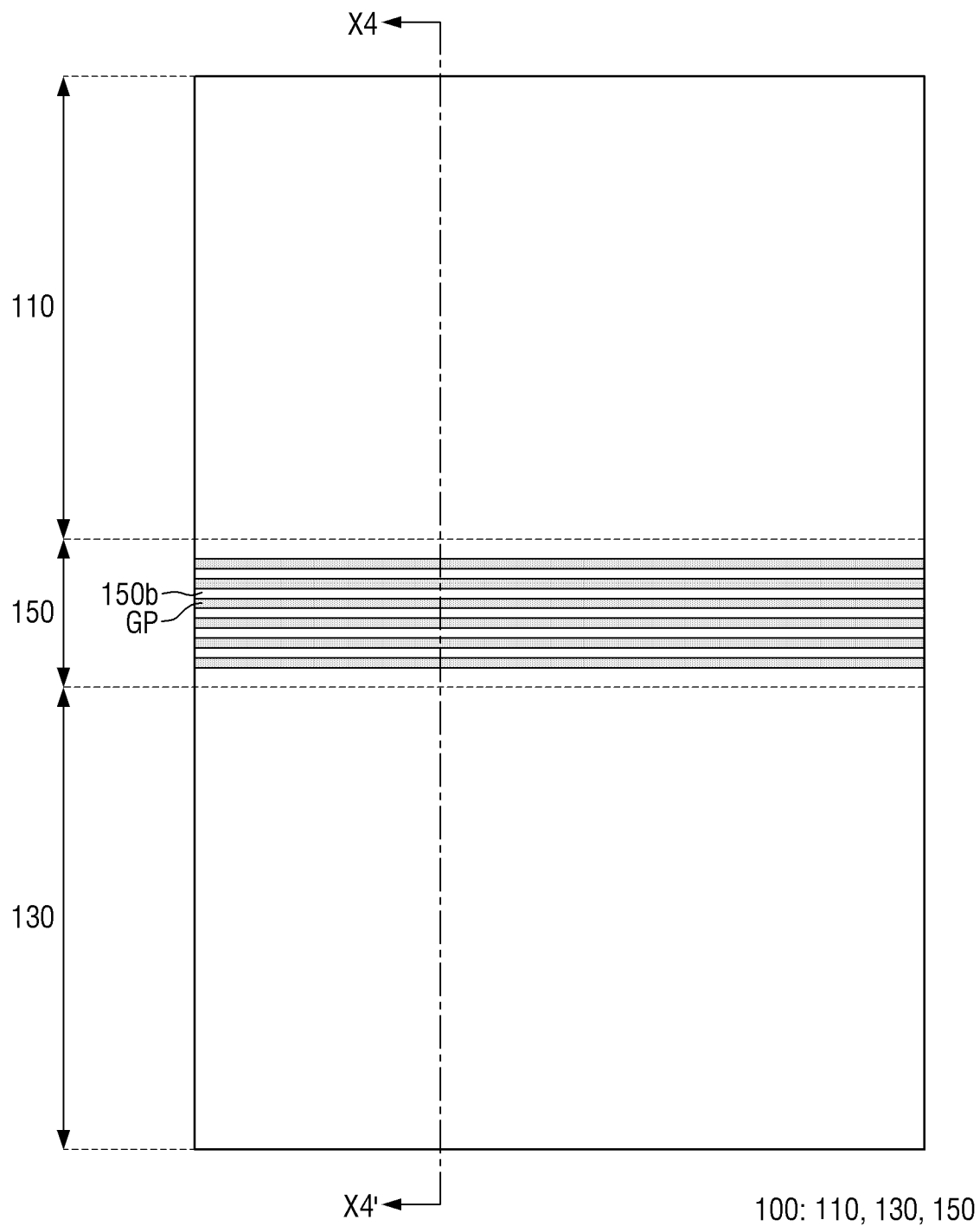
FIGS. 12A to 12D are schematic views for illustrating a process of forming the groove pattern in the window of the window member of FIG. 7.

Referring to FIG. 12A, a groove pattern GP may be formed in the lower surface of the window 100. Description of a process of forming the groove pattern GP in the lower surface of the window 100 is provided below in conjunction with FIGS. 12B to 12D.

Figure 12B:
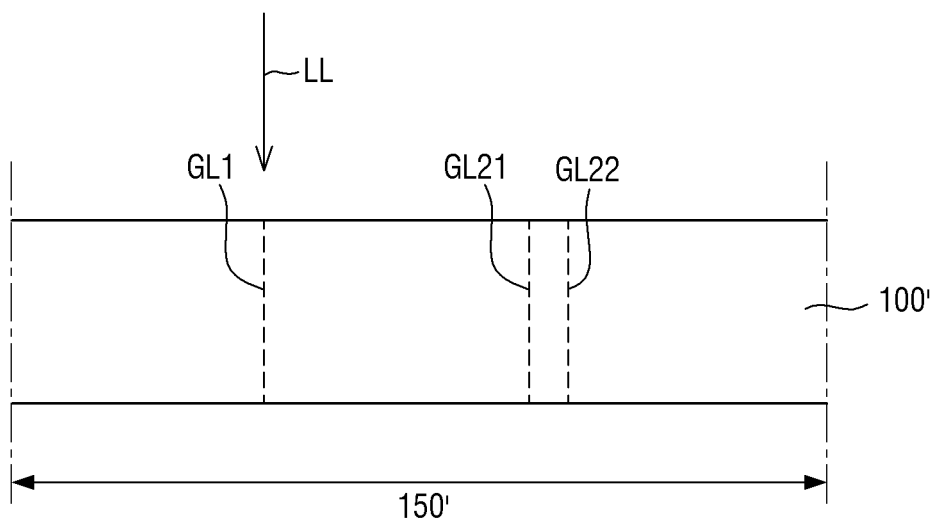
Figure 12C:
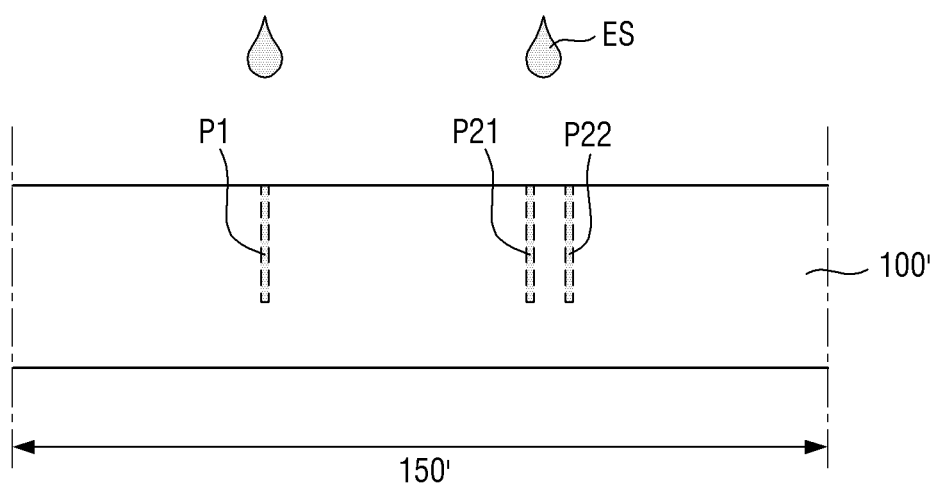
Figure 12D:
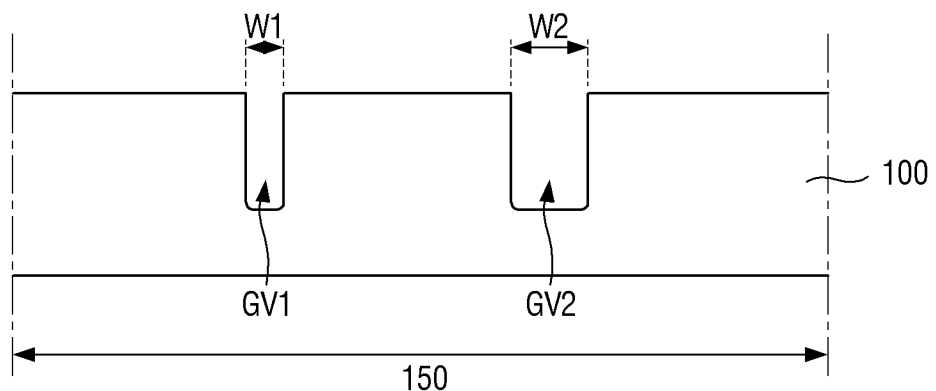

Referring to FIGS. 12B to 12D, imaginary lines for forming grooves (e.g., groove pattern GP) may be defined on a first pattern part 150' of the mother substrate 100'. The imaginary lines may correspond to the positions where the grooves are to be formed, and may be defined parallel to the direction (e.g., first direction DR1 of FIG. 4) in which the grooves are extended. In the example shown in FIG. 12B, the lines GL1, GL21 and GL22 may be defined to form the grooves and be associated with the grooves to be formed, respectively. In the following description, the lines are referred to as a first line GL1 and second lines GL21 and GL22.

Referring to FIG. 12B, a laser LL may be irradiated onto the mother substrate 100' in the thickness direction of the mother substrate 100'. The laser LL may be irradiated onto multiple points on the lines GL1, GL21, and GL22.

The points irradiated of the mother substrate 100' with the laser LL may be locally melted, and accordingly the phase of the irradiated points may be changed. As a result, the refractive index of the irradiated points may be changed. The refractive index of the points irradiated with the laser LL may be different from the refractive index of the mother substrate 100' before the laser LL is irradiated. The laser LL may have such an intensity that changes the refractive index of a portion of the mother substrate 100' without cutting the mother substrate 100' (e.g., the irradiated portion of the mother substrate 100').

The laser LL may have a pulse energy. The pulse duration of the laser LL may be in a range of several hundred picoseconds to several tens of femtoseconds. For example, the pulse duration of the laser LL may be about 200 picoseconds or less. The pulse duration of the laser LL may vary depending on the material or thickness of the mother substrate 100'. The wavelength of the laser LL may be in a range of about 250 nm to about 1,500 nm. For example, the wavelength of the laser LL may be in a range of about 340 nm to about 1,060 nm.

The laser LL may be a non-diffractive beam. For example, the laser LL may be a Bessel beam, but is not limited thereto. For example, the laser LL may be a Gaussian beam.

Referring to FIG. 12C, after irradiating the laser LL (e.g., refer to FIG. 12B) onto the mother substrate 100' to form the positions P1, P21, and P22 where the refractive index is changed, an etching solution is applied to the positions P1, P21, and P22. The positions P1, P21, and P22 irradiated with the laser LL are depicted as hatched regions (or dashed lines) in the example shown in FIG. 12C for convenience of illustration. However, the positions P1, P21, and P22 may be too small to identify with the naked eyes.

The refractive indices of the first positions P1 and the second positions P21 and P22 after the laser LL is irradiated may be different from the refractive index of the mother substrate 100' before the laser is irradiated.

Each of the first and second positions P1, P21, and P22 may be formed to have a diameter (e.g., a predetermined or selectable diameter) in a plan view. For example, the diameter of each of the first positions P1 and the second positions P21 and P22 may be about 3 μm or less. The laser LL may change the refractive index without forming any physical hole in the mother substrate 100', and the size of the portions where the refractive index is changed may be small. Therefore, the change in the appearance of the mother substrate 100' by the laser LL may not be readily recognized. It may be recognized using a microscope with high magnification.

Each of the first positions P1 and the second positions P21 and P22 may be spaced apart from one another by a space (e.g., a predetermined or selectable spacing). The spacing between the first positions P1 and the second positions P21 and P22 may be several micrometers (μm). The distance between the grooves GV1 and GV2 (e.g., refer to FIG. 12D) to be formed according to the distance between the first positions P1 and the second positions P21 and P22 may vary depending on the distance between the first positions P1 and the second positions P21 and P22.

Each of the first positions P1 and the second positions P21 and P22 may have a thickness (e.g., a predetermined or selectable thickness) (e.g., depth or height) along the thickness direction. Hereinafter, a thickness of an element may include a depth or a height of the element. Each of the first positions P1 and the second positions P21 and P22 may have a thickness along the thickness direction. The thickness of each of the first positions P1 and the second positions P21 and P22 may be smaller than the thickness of the mother substrate 100'. By adjusting the intensity of the laser, the thicknesses (or depth) of the first positions P1 and the second positions P21 and P22 may be controlled. The depths of the first and second grooves GV1 and GV2 to be formed may vary depending on the thicknesses (or depth) of the first and second positions P1 and P21 and P22.

As described above, as the second lines GL21 and GL22 may be arranged in multiple rows, the second positions P21 and P22 may also be formed in multiple rows. The width of the second grooves GV2 formed by the second positions P21 and P22 in the rows may be smaller than the width of the first grooves GV1 formed by the first positions P1 in a single row.

The etching solution ES may be provided on the first positions P1 and the second positions P21 and P22. The etching solution ES may be provided by spraying or dipping (or dropping), but is not limited thereto. The etching solution ES may partially etch the mother substrate 100' on the first positions P1 and the second positions P21 and P22. For example, the etching solution ES may partially etch the mother substrate 100' adjacent to (e.g., around or surround) the first positions P1 and the second positions P21 and P22.

The etching solution ES may include an alkali solution. For example, the etching solution ES may include a sodium hydroxide (NaOH) solution or a potassium hydroxide (KOH) solution. Since the etching solution ES contains the alkali solution, the grooves GV1 and GV2 may be formed to have a bottom parallel to the upper surface of the mother substrate 100' and side surfaces including at least one rounded surface (or rounded corner). When the etching solution includes an acid solution such as a hydrogen fluoride (HF) solution, a sharp groove (or sharp corner) may be formed toward the lower surface of the mother substrate 100'.

The shape of the grooves may vary depending on etching method or etching amount. As the concentration and temperature of the etching solution ES increase, the etching rate may increase. The amount of etching may increase as the exposure time to the etching solution ES (e.g., the etching time) increases.

In case that the temperature of the etching solution ES increases, the reactivity of the etching solution ES may increase, thereby increasing the etching rate. The temperature of the etching solution ES may be higher than or equal to room temperature. For example, the temperature of the etching solution ES may be in a range of about 100° C. to about 150° C. In case that the temperature of the etching solution ES is lower than about 100° C., the reactivity of the etching solution ES may decrease, and the process time for forming the grooves may be increased. In case that the temperature of the etching solution ES is higher than about 150° C., the mother substrate 100' may be exposure to high temperature and damaged.

Referring to FIG. 12D, the mother substrate 100' (e.g., refer to FIG. 12C) may be exposed to the etching solution ES, and the window 100 in which the grooves GV1 and GV2 are formed on a first segment may be formed.

The grooves GV1 and GV2 may be formed in the window 100 by performing the above-described laser irradiation and etching processes on the mother substrate 100'.

According to an embodiment of the disclosure, the first width W1 of the first groove GV1 may be smaller than the second width W2 of the second groove GV2. In the method of fabricating the window 100 according to the embodiment of the disclosure, the first positions P1 may be formed in a single row and the second positions P21 and P22 (e.g., refer to FIG. 12C) may be formed in the multiple rows by the laser LL (e.g., refer to FIG. 12B) irradiation. Accordingly, the first width W1 of the first grooves GV1 may be smaller than the second width W2 of the second grooves GV2. However, the disclosure is not limited to the embodiment shown in FIGS. 12B to 12D. In a method of fabricating the window 100 according to an embodiment of the disclosure, the number of rows of the laser irradiated onto the positions where grooves are to be formed, the laser irradiation time, the interval between the positions, the intensity of the laser, etc. may be adjusted in order to fabricate the window according to various embodiments shown in FIGS. 23, 24 and 26, etc.

Description of a process of fabricating a window member WM of a display device 1 according to the embodiment of the disclosure is provided below in detail.

FIGS. 13 to 22 are schematic views for illustrating a process of fabricating the window member of FIG. 7.

Figure 13:
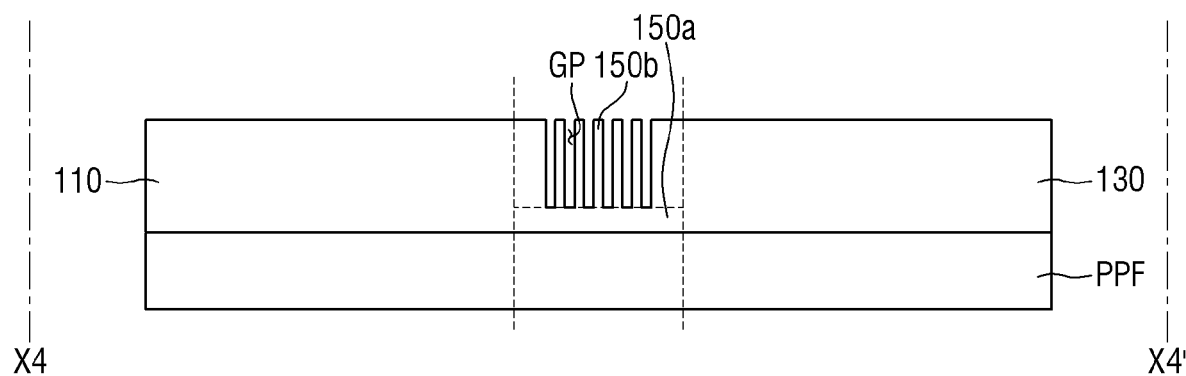
FIGS. 13 to 22 are schematic views for illustrating a process of fabricating the window member of FIG. 7.
Figure 14:
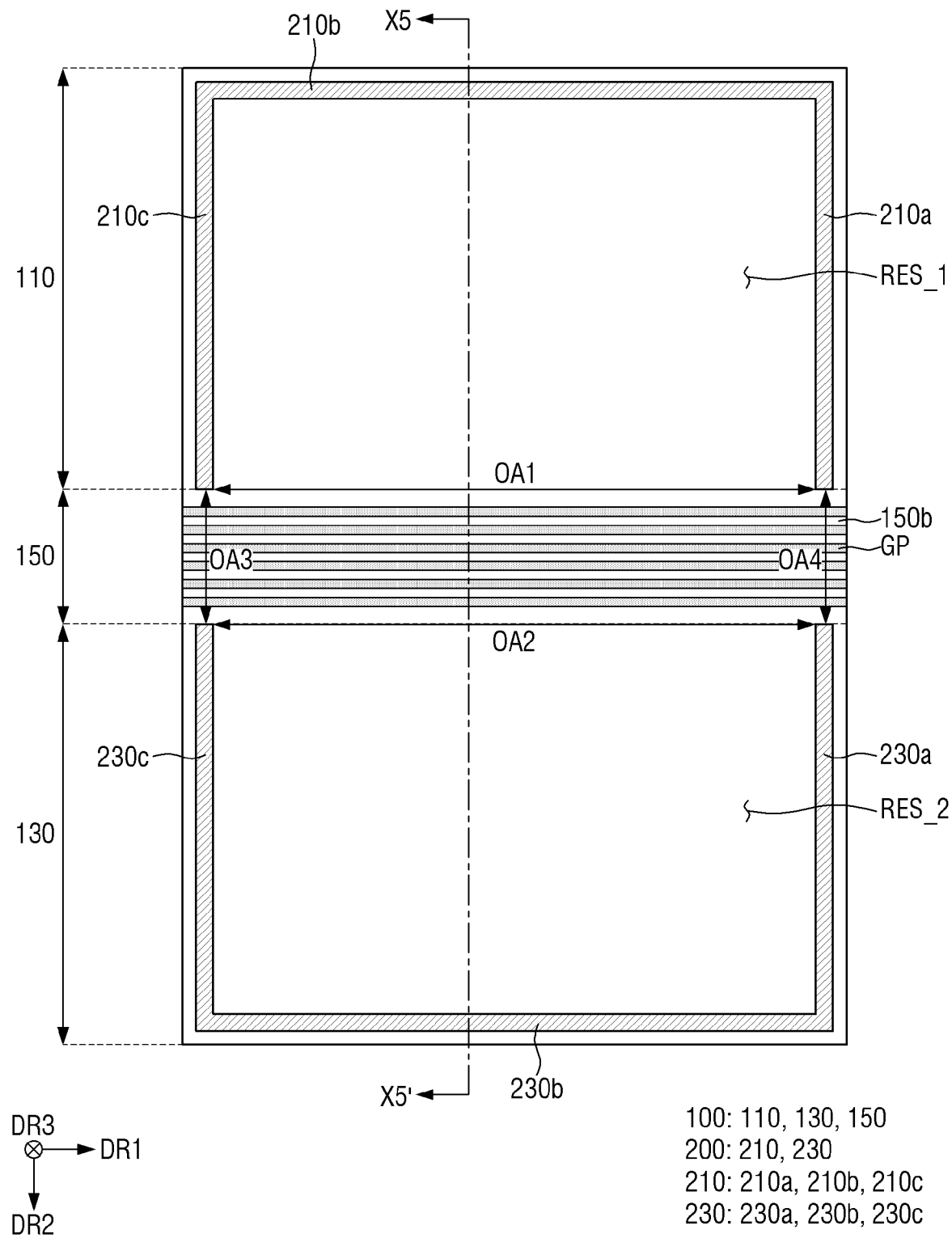
Figure 15:
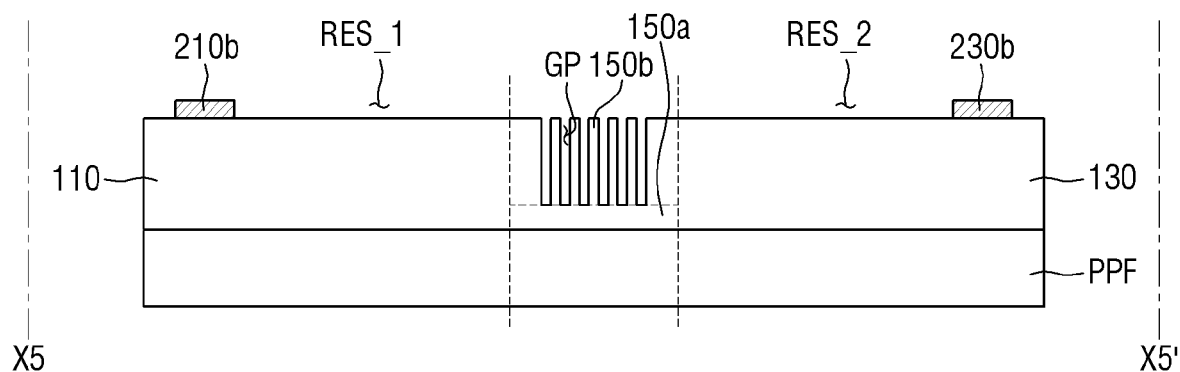
Figure 16:
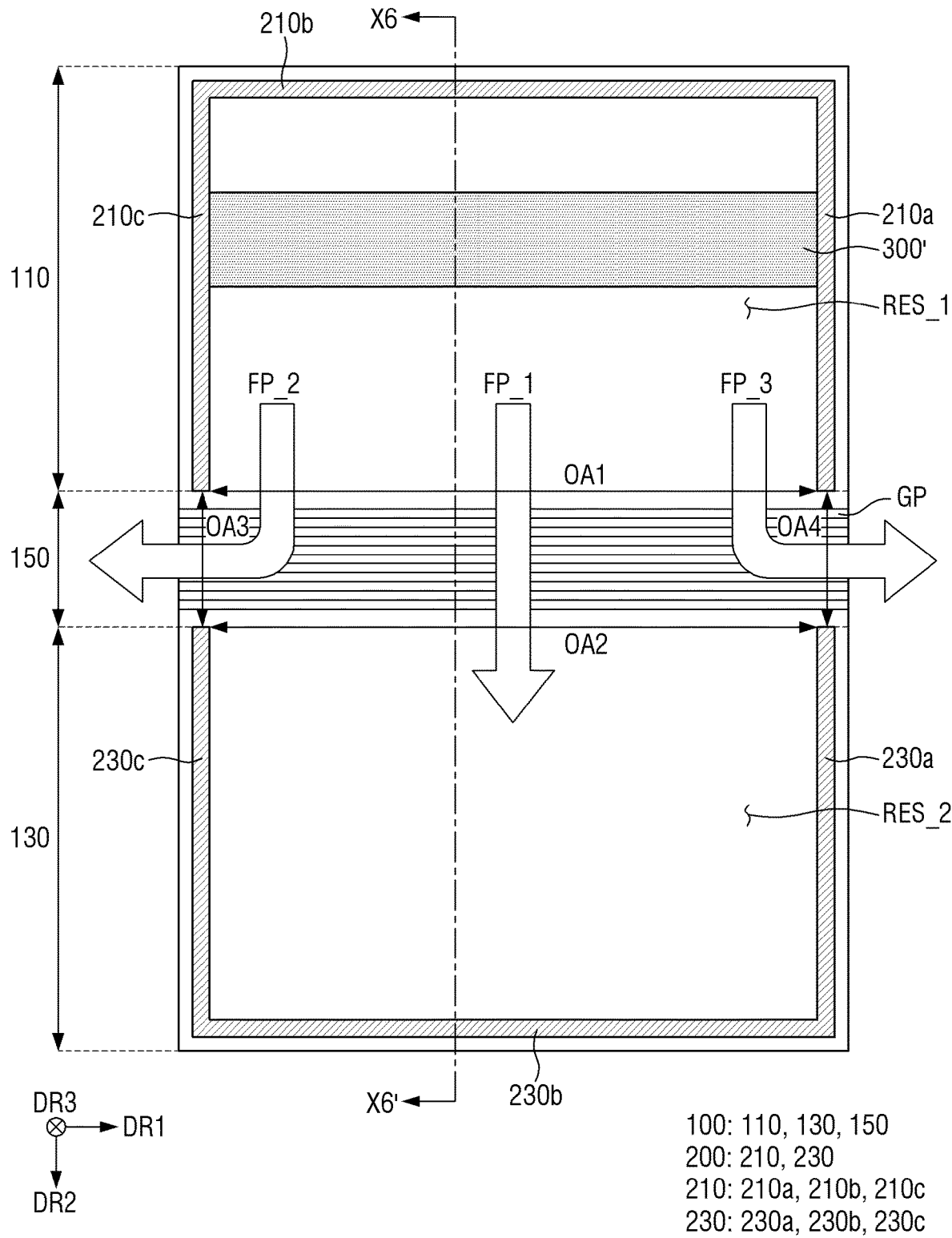
Figure 17:
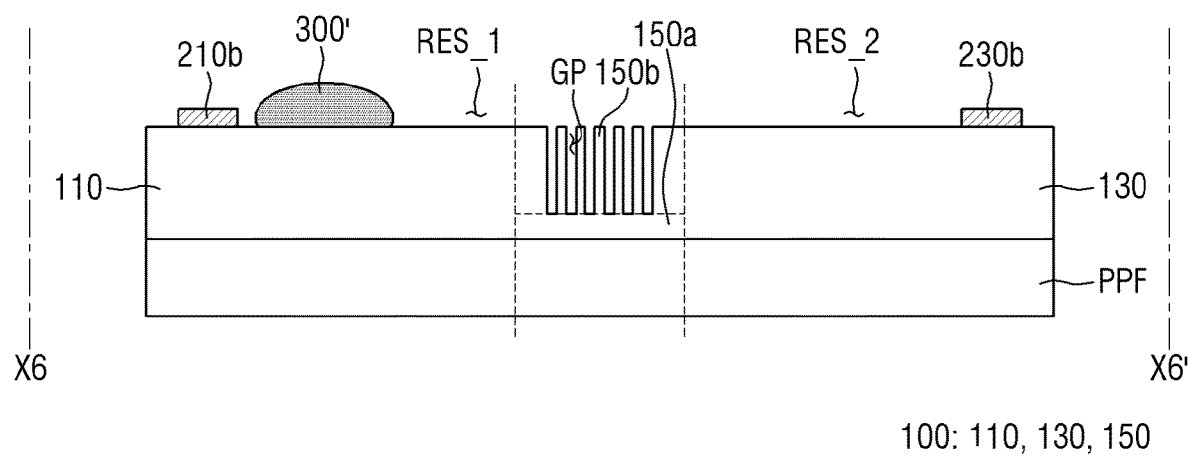
Figure 18:
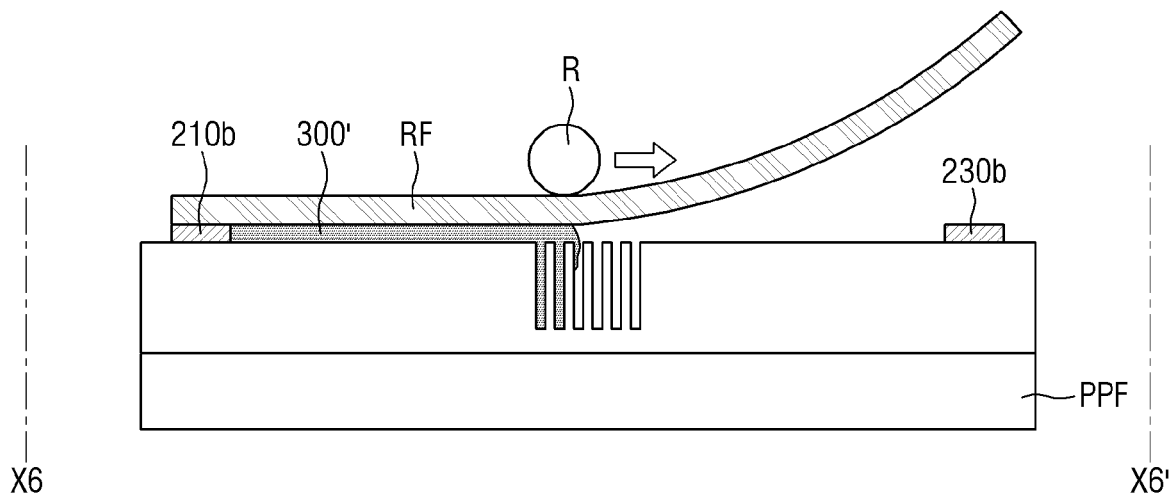
Figure 19:
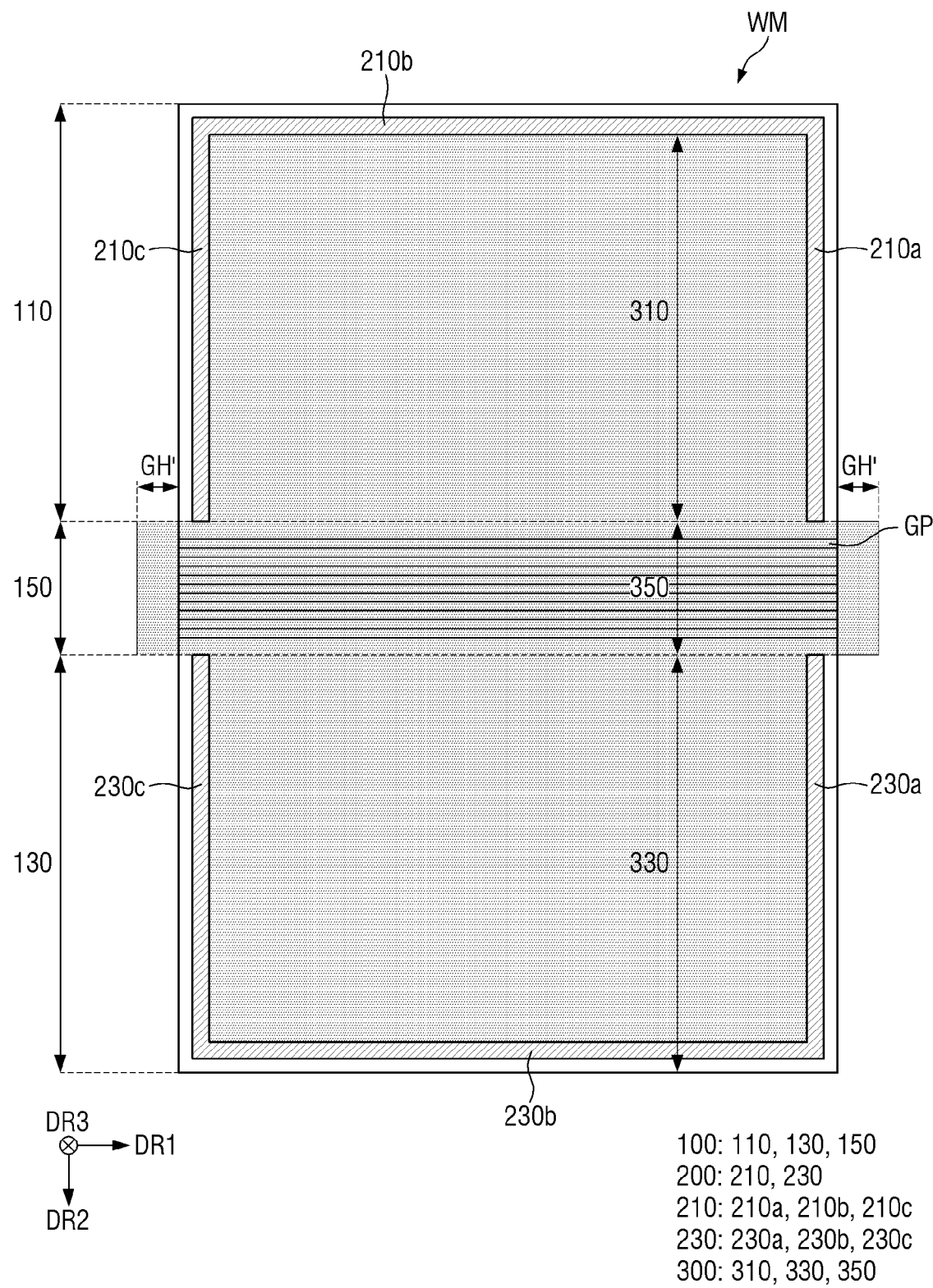
Figure 20:
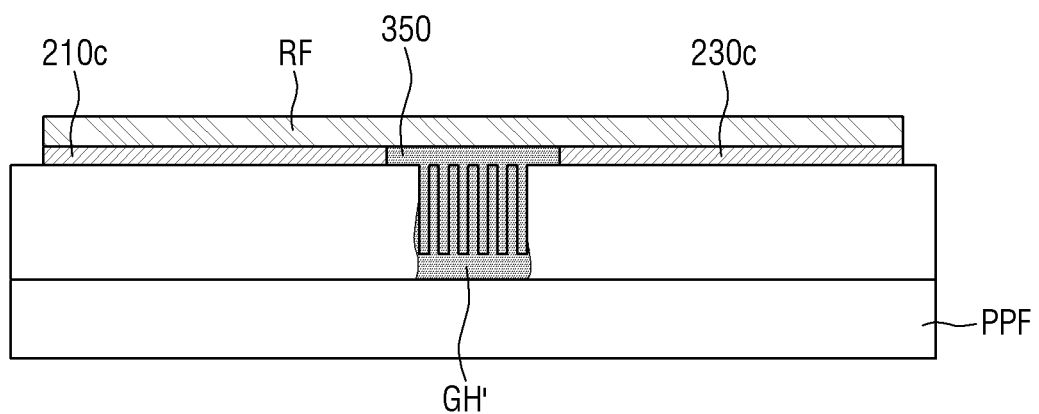
Figure 21:
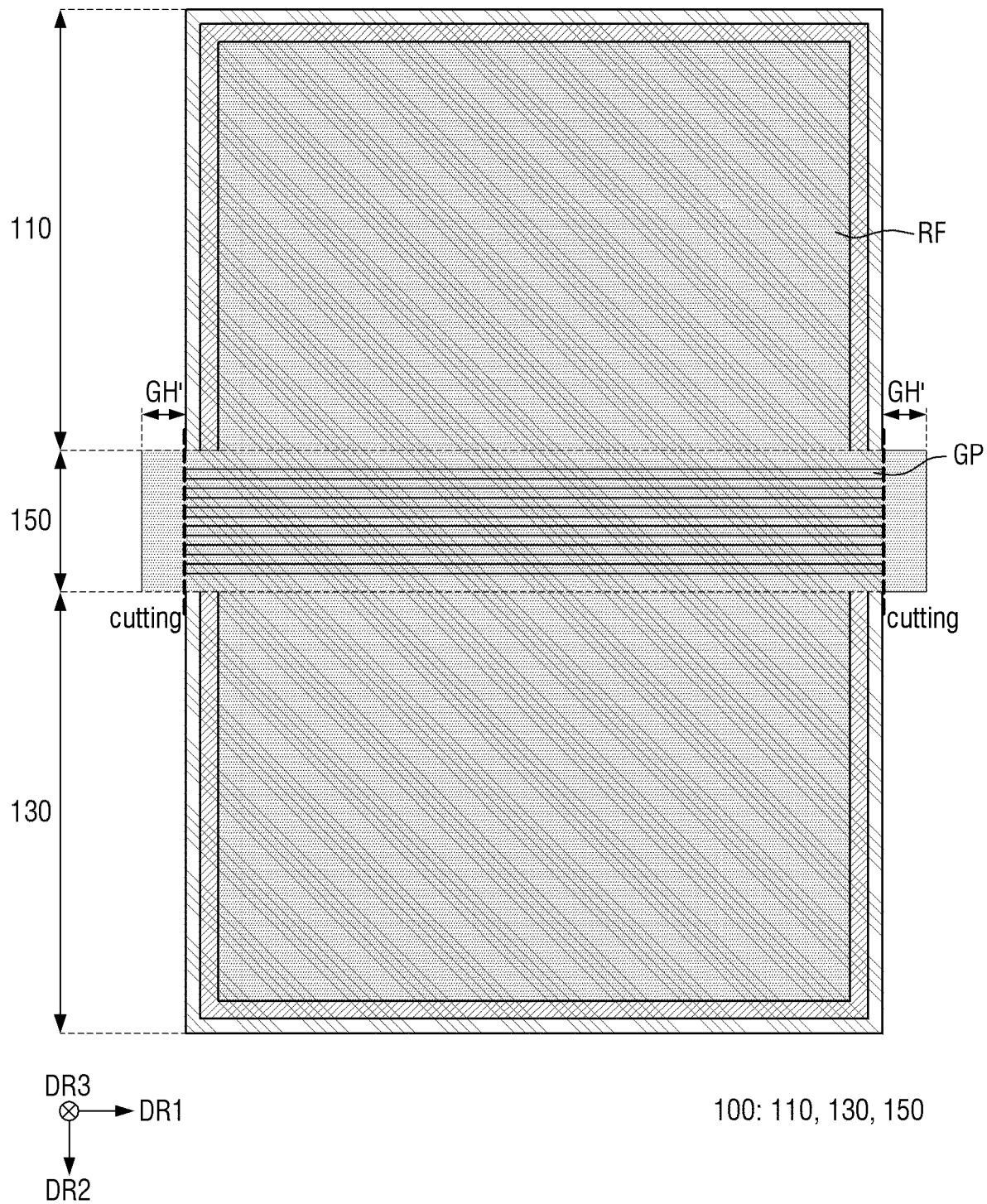
Figure 22:
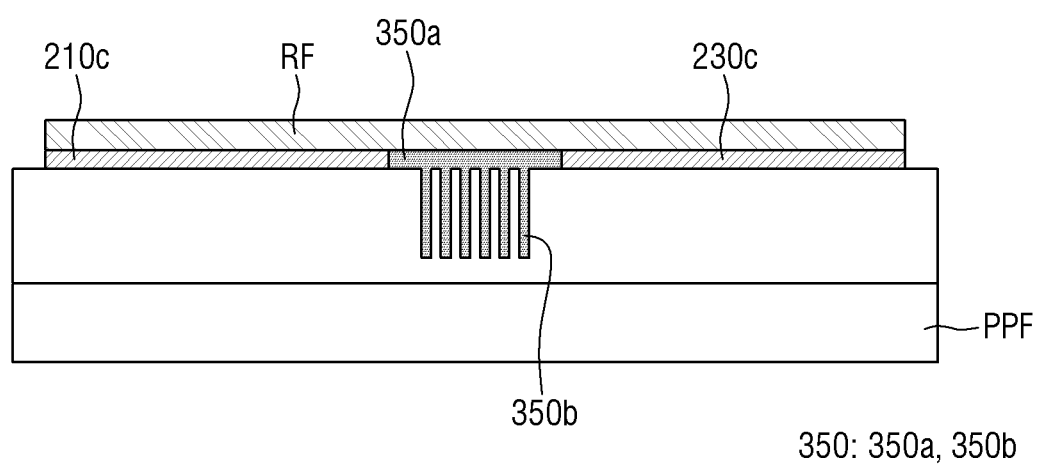

FIG. 13 is a cross-sectional view schematically showing the cross-section taken along line X4-X4' of FIG. 12A. FIG. 14 is a schematic plan view showing the first light-blocking member and the second light-blocking member disposed on the lower surface of the window. FIG. 15 is a cross-sectional view schematically showing the cross-section taken along line X5-X5' of FIG. 14. FIG. 16 is a schematic plan view showing a cured resin disposed in the first accommodation space. FIGS. 17 and 18 are cross-sectional views for illustrating processing steps of roll pressing, taken along line X6-X6' of FIG. 16. FIG. 19 is a schematic plan view showing the window member filled with the cured resin by performing the roll pressing process. FIG. 20 is a schematic side view showing the window member filled with the cured resin by performing the roll pressing process. FIG. 21 is a schematic plan view for illustrating a process of cutting cured-resin leakages of the cured resin in the first pattern part. FIG. 22 is a schematic side view for illustrating the process of cutting cured-resin leakages of the cured resin in the first pattern part.

Referring to FIGS. 13 to 15, the window 100 having the groove pattern GP formed in the first pattern part 150 may be prepared. A process protective film PPF may be disposed on the upper surface of the window 100. A first light-blocking member 210 may be disposed on the first flat part 110, and a second light-blocking member 230 may be disposed on the second flat part 130. For example, the process of disposing the first light-blocking member 210 and the second light-blocking member 230 may be performed via an ink-jet process. For convenience of illustration, the process protective film PPF is not depicted in FIG. 14.

The method of forming the groove pattern GP in the window 100 is identical to that described above with reference to FIGS. 12B to 12D. Thus, detailed description of the same constituent elements is omitted.

The process of forming the first light-blocking member 210 and the second light-blocking member 230 on the lower surface of the window 100 may be performed by turning the window 100 over. In case that the process of forming the window member WM is performed, the lower surface of the window 100 may face a side of the display device 1 in the third direction DR3, and the upper surface of the window 100 may face the opposite side of the display device 1 in the third direction DR3.

The process protective film PPF may be disposed on the upper surface of the window 100 as shown in FIG. 13. The process protective film PPF may support the cured resin 300' (e.g., refer to FIG. 17) which may leak during a process of filling with the cured resin layer 300 (e.g., refer to FIG. 19). Description of the process of filling with the cured resin layer 300 is provided below. Although not shown in the drawings, the area of the process protective film PPF may be larger than the area of the window 100.

The first light-blocking member 210 and the second light-blocking member 230 disposed on the lower surface of the window 100 may form the first accommodation space RES_1 and the second accommodation spaces RES_2 on the lower surface of the window 100 as shown in FIG. 15, respectively. The first accommodation space RES_1 and the second accommodation space RES_2 may be filled with the cured resin layer 300 by using the first light-blocking member 210 and the second light-blocking member 230 as the dams, respectively. As described above, the 1-1-th light-blocking member 210a and the 1-3-th light-blocking member 210c of the first light-blocking member 210 may be spaced apart from each other to form the first open area OA1. The 2-1-th light-blocking member 230a and the 2-3-th light-blocking member 230c of the second light-blocking member 230 may be spaced apart from each other to form the second open area OA2. The 1-3-th light-blocking member 210c and the 2-3-th light-blocking member 230c may be spaced apart from each other to form the third open area OA3. The 1-1-th light-blocking member 210a and the 2-1-th light-blocking member 230a may be spaced apart from each other to form the fourth open area OA4.

Referring to FIGS. 16 to 20, the cured resin 300' may be disposed in the first accommodation space RES_1 formed by the first light-blocking member 210. The first accommodation space RES_1 and the second accommodation space RES_2 and the groove pattern GP may be filled with the cured resin 300' using a roller R and a release film. For example, the process of filling the first accommodation space RES_1, the second accommodation space RES_2, and the groove pattern GP with the cured resin 300' using the roller R and the release film RF may be carried out by roll pressing. For convenience of illustration, the process protective film PPF and the release film RF are not shown in FIGS. 16 and 19.

In some embodiments, the cured resin 300' may be disposed in the first accommodation space RES_1, but the disclosure is not limited thereto. For example, the cured resin 300' may be disposed in the second accommodation space RES_2. In the following description, the cured resin 300' may be disposed in the first accommodation space RES_1 for convenience of illustration.

The roll pressing may be performed by disposing the release film RF on the cured resin 300' and moving the roller R on the release film RF, as shown in FIGS. 17 and 18. For example, the cured resin 300' may be pushed from the first accommodation space RES_1 toward the second accommodation space RES_2 according to the movement of the roller R on the release film RF. As shown in FIG. 16, the cured resin 300' may be pushed along at least one of a first flow path FP_1 from the first open area OA1 toward the second open area OA2, a second flow path FP_2 from the first open area OA1 toward the third open area OA3, and a third flow path FP_3 from the first open area OA1 to the fourth open area OA4.

In case that the cured resin 300' is pushed along the second flow path FP_2 or the third flow path FP_3, the groove pattern GP formed in the first pattern part 150 may be readily filled with the cured resin 300'. For example, in case that the cured resin 300' is pushed along the second flow path FP_2 or the third flow path FP_3, the cured resin 300' may be pushed in the same direction as the direction in which the groove pattern GP is extended. Thus, the groove pattern GP may be filled (e.g., completely filled) with the cured resin 300'. The cured resin 300' may be further pushed beyond the border of the window member WM. As a result, as shown in FIGS. 19 and 20, the cured resin 300' may leak through the third open area OA3 and/or the fourth open area OA4 in the direction in which the groove pattern GP is extended near the first pattern part 150 of the window 100, resulting in cured-resin leakages GH'.

Referring to FIGS. 21 and 22, the cured-resin leakages GH' of the cured resin leaking in the direction in which the groove pattern GP is extended may be cut near the first pattern part 150. For example, the process of cutting the leakages GH' may be performed using a laser. The process protective film PPF is not shown in FIG. 21 for convenience of illustration.

As described above, in case that the first accommodation space RES_1, the second accommodation space RES_1, and the groove pattern GP are filled with the cured resin 300' by the roll pressing, the cured resin 300' may leak through the third open area OA3 and/or the fourth open area OA4 in the direction in which the groove pattern GP is extended near the first pattern part 150 of the window 100. Thus, the cured-resin leakages GH' may be formed. In case that the cured-resin leakages GH' are not removed, the aesthetics (or image display quality) of the display device 1 may be deteriorated. Therefore, the cured-resin leakages GH' may be removed.

Since the first light-blocking member 210 and the second light-blocking member 230 have the above-described shapes, the cured-resin leakages GH' may be formed near the first pattern part 150. Thus, a smaller area is required for the process (e.g., the process for filling the first accommodation space RES_1, the second accommodation space RES_1, and the groove pattern GP). Accordingly, the efficiency of the process may be improved.

The process of removing the cured-resin leakages GH' may be performed after the process of curing the cured resin 300'. For example, after filling with the cured resin 300', the cured resin 300' may be cured to form the cured resin layer 300, and the process of removing the cured-resin leakages GH' may be performed.

In some embodiments, the process of removing the leakages GH' may be performed using a laser, but is not limited thereto. For example, the process of removing the cured-resin leakages GH' may be performed using a knife for releasing.

In case that the cured-resin leakages GH' are removed, the width of the third portion 350 of the cured resin layer 300 may be equal to or greater than the width of the window 100 in the direction in which the groove patterns GP is extended. In case that the width of the third portion 350 of the cured resin layer 300 is greater than the width of the window 100 in the direction in which the groove pattern GP is extended, the cured-resin leakages GH' may be partially removed. Thus, leakages GH (e.g., refer to FIG. 11) may be formed. For example, the leakages GH may refer to residues of the cured-resin leakages GH', which are not completely removed.

The process protective film PPF and the release film RF may be removed, and the window member WM of FIG. 9 may be fabricated.

Description of a display device 1 according to other embodiments of the disclosure is provided below. In the following description, the same or similar elements are denoted by the same or similar reference numerals, and detailed description of the same constituent elements is omitted or briefly described.

Figure 23:
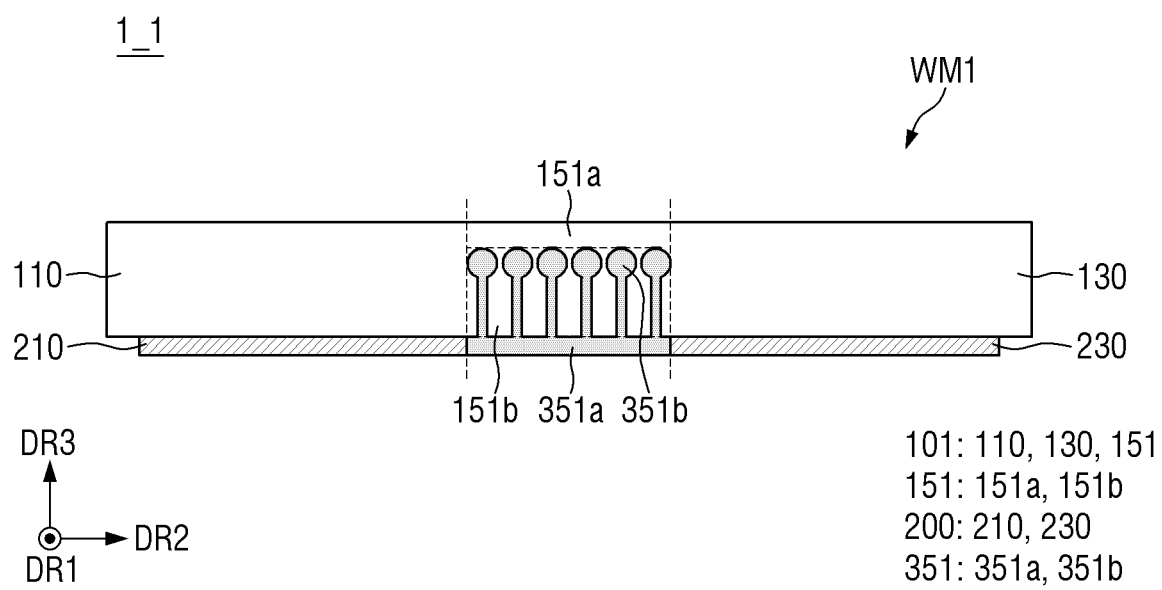
FIG. 23 is a schematic view showing a side surface of a window member according to another embodiment of the disclosure.

FIG. 23 is a schematic view showing a side surface of a window member according to another embodiment of the disclosure.

FIG. 23 shows an example where a groove pattern of a window member of a display device 1_1 according to the embodiment may have a droplet shape. The groove pattern of the window member WM1 according to the embodiment may include stems which have a constant width in the second direction DR2, and droplets which are located on a side of each of the stems in the third direction DR3. The droplets may have a width larger than the width of the stems and be recessed in the window 100.

A window 101 may be bent more smoothly over the droplets, and thus the window member WM1 may be bent more smoothly with the above-described configuration.

Figure 24:
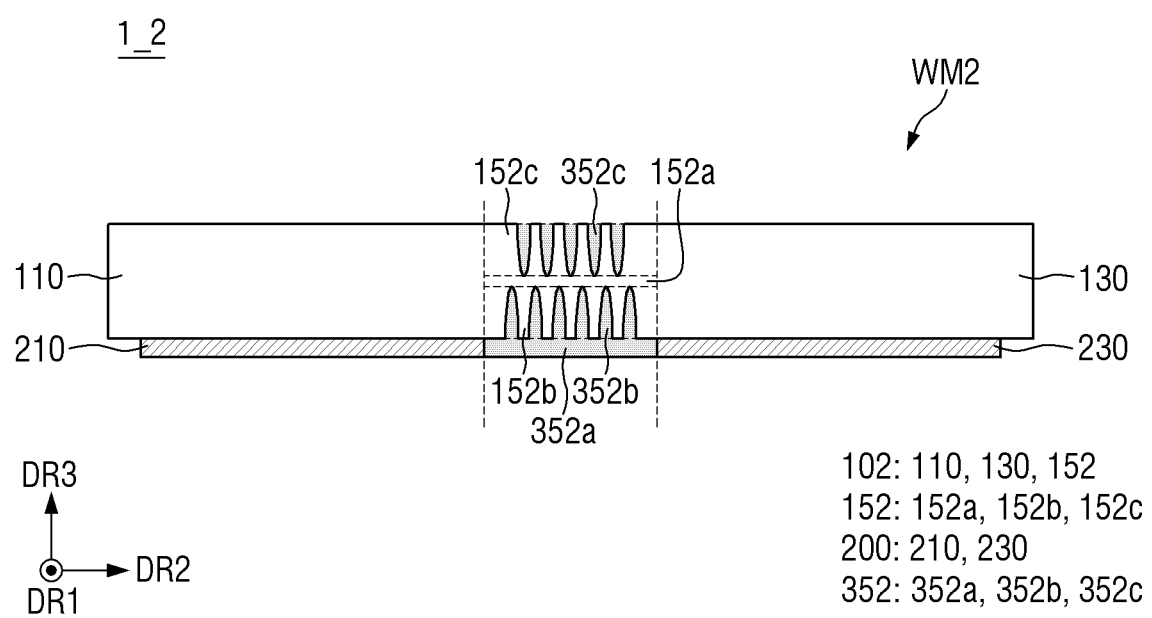
FIG. 24 is a schematic view showing a side surface of a window member according to yet another embodiment of the disclosure.

FIG. 24 is a schematic view showing a side surface of a window member according to yet another embodiment of the disclosure.

FIG. 24 shows an example where a groove pattern of a window member WM2 of a display device 1_2 according to the embodiment may be formed on a lower surface and an upper surface of a window 102. A bridge 152a of a first pattern part 152 of a window 102 may be located at a center of a first flat part 110 and a second flat part 130. The first pattern part 152 of the window 102 may include first protrusions 152b protruding from a lower surface of the bridge 152a toward an opposite side of the display device 1_2 in the third direction DR3, and second protrusions 152c protruding from an upper surface of the bridge 152a toward a side of the display device 1_2 in the third direction DR3.

The first protrusions 152b may be spaced apart from one another in the second direction DR2, and the second protrusions 152c may be spaced apart from one another in the second direction DR2. In some embodiments, the first protrusions 152b and the second protrusions 152c may not overlap each other in the third direction DR3, but the disclosure is not limited thereto. For example, the first protrusions 152b and the second protrusions 152c may overlap each other in the third direction DR3. The first protrusions 152b and the second protrusions 152c may be arranged alternately in the second direction DR2. The groove patterns may include a first groove pattern defined as spaces between the first protrusions 152b, and a second groove pattern defined as spaces between the second protrusions 152c. The first groove pattern and the second groove pattern may be recessed in the third direction DR3 no longer beyond the bridge 152a as the boundary. For example, the first groove pattern and the second groove pattern may be recessed within the bridge 152a. Thus, the first groove pattern and the second groove pattern may not intersect each other in the second direction DR2.

A third portion 352 of a cured resin layer 302 may include a 3-1-th portion 352a on the first groove pattern, a 3-2-th portion 352b used to fill the first groove pattern, and a 3-3-th portion 352c used to fill the second groove patterns.

With the above-described configuration, the window 102 according to the embodiment may be bent more smoothly.

Figure 25:
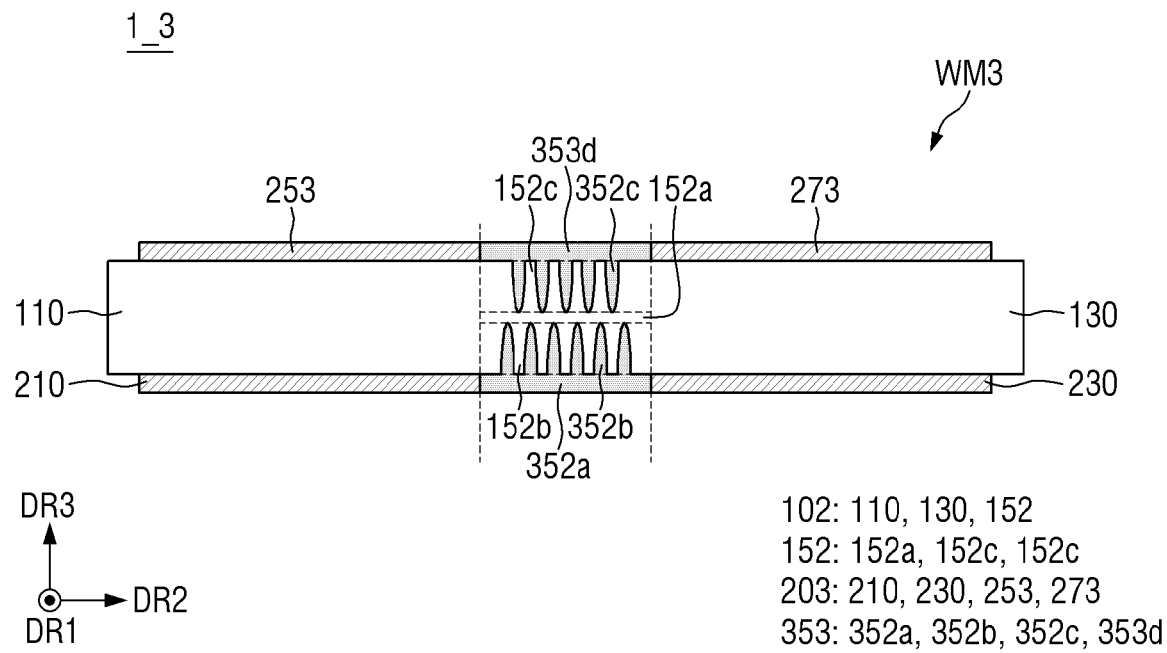
FIG. 25 is a schematic view showing a side surface of a window member according to yet another embodiment of the disclosure.

FIG. 25 is a schematic view showing a side surface of a window member according to yet another embodiment of the disclosure.

A display device 1_3 according to the embodiment of FIG. 25 is different from the display device 1_2 according to the embodiment of FIG. 24 at least in that a light-blocking member 203 is disposed on a lower surface and an upper surface of a window 102 of a window member WM3. Thus, detailed description of the same constituent elements is omitted.

Referring to FIG. 25, the window member WM3 according to the embodiment may further include a third light-blocking member 253 disposed on an upper surface of a first flat part 110 of the window 102, and a fourth light-blocking member 273 disposed on an upper surface of a second flat part 130 of the window 102.

The third light-blocking member 253 and a first light-blocking member 210 may have a same shape. The third light-blocking member 253 and a second light-blocking member 230 may have a same shape. Therefore, detailed description of the sane constituent elements is omitted.

A third portion 353 of a cured resin layer 303 may further include a 3-1-th portion 352a on first groove pattern, a 3-2-th portion 352b used to fill the first groove pattern, a 3-3-th portion 352c used to fill second groove pattern, and a (3_4) portion 353d on the second groove pattern.

With the above-described configuration, the second groove pattern of the window member WM3 according to the embodiment may be filled (e.g., completely filled) to prevent a first pattern part 152 of the window 102 from being recognized by the user.

Figure 26:
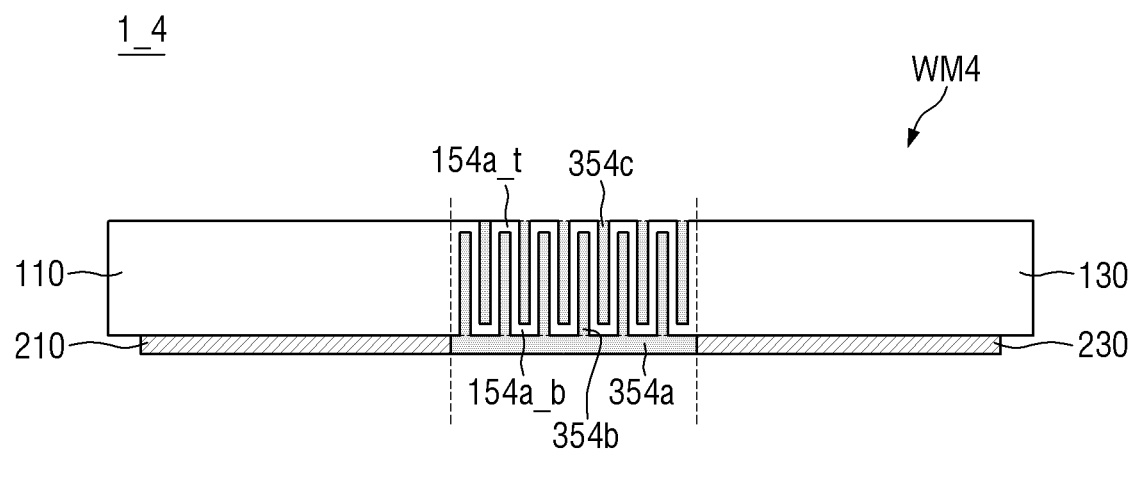
FIG. 26 is a schematic view showing a side surface of a window member according to yet another embodiment of the disclosure.

FIG. 26 is a schematic view showing a side surface of a window member according to yet another embodiment of the disclosure.

Referring to FIG. 26, a bridge 154a of a window member WM4 of a display device 1_4 according to the embodiment may be repeatedly bent toward a side and an opposite side of the display device 1_4 in the third direction DR3 to have a spring-like shape (or serpentine shape). The bridge 154a of the first pattern part 154 of the window 104 according to the embodiment may include first bent portions 154a_t bent toward the side of the display device 1_4 in the third direction DR3, and second bent portions 154a_b bent toward the opposite side of the display device 1_4 in the third direction DR3 arranged repeatedly. Thus, first groove pattern formed on the lower surface of the window 104 and second groove pattern formed on the upper surface of the window 104 may be formed.

The first groove pattern and the second groove pattern may be arranged alternately along the second direction DR2. Accordingly, the first groove pattern and the second groove pattern may have the maximum width in the third direction DR3.

Like the window member WM2 according to the embodiment of FIG. 24, a third portion 354 of a cured resin layer 304 may further include a 3-3-th portion 354c used to fill the second groove pattern.

With the above-described configuration, the window member WM4 may be bent more smoothly.

Figure 27:
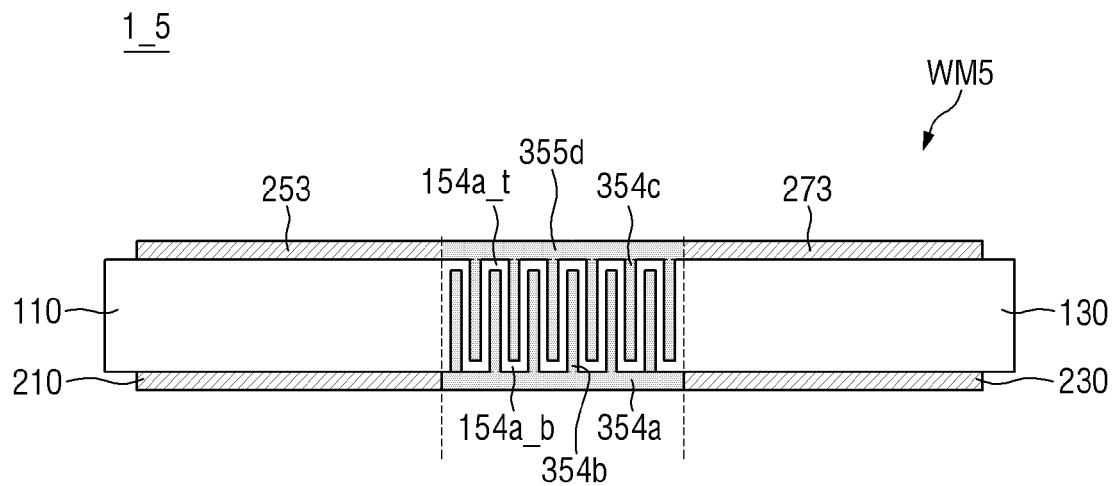
FIG. 27 is a schematic view showing a side surface of a window member according to yet another embodiment of the disclosure.
Figure 27:
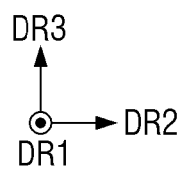

FIG. 27 is a schematic view showing a side surface of a window member according to yet another embodiment of the disclosure.

A display device 1_5 according to the embodiment of FIG. 27 is different from the display device 1_4 according to the embodiment of FIG. 26 at least in that a light-blocking member 203 is disposed on a lower surface and an upper surface of a window 104 of a window member WM5. Thus, detailed description of the same constituent elements is omitted.

Referring to FIG. 27, the window member WM5 according to the embodiment may further include a third light-blocking member 253 disposed on an upper surface of a first flat part 110 of a window 104, and a fourth light-blocking member 273 disposed on an upper surface of a second flat part 130 of the window 104.

The third light-blocking member 253 and a first light-blocking member 210 may have a same shape. The fourth light-blocking member 273 and a second light-blocking member 230 may have a same shape. Therefore, detailed description of the same constituent elements is omitted.

A third portion 355 of a cured resin layer 305 may further include a 3-1-th portion 354a on first groove patterns, a 3-2-th portion 354b used to fill the first groove pattern, a 3-3-th portion 354c used to fill second groove pattern, and a (3_4) portion 355d on the second groove pattern.

With the above-described configuration, the second groove pattern of the window member WM5 according to the embodiment may be filled (e.g., completely filled) to prevent the first pattern part 154 of the window 104 from being recognized by the user.

Figure 28:
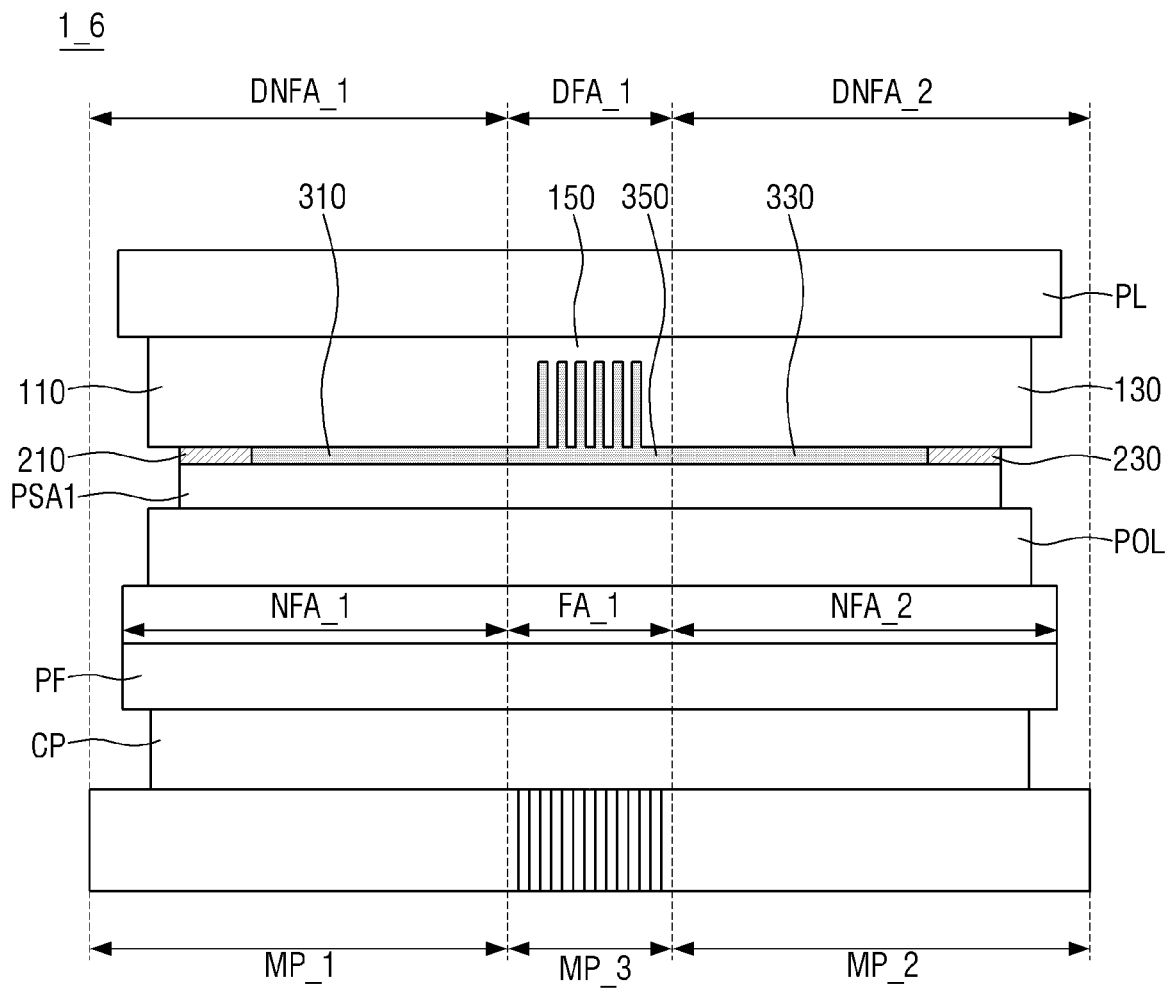
FIG. 28 is a view schematically showing a structure of a display device according to yet another embodiment.

FIG. 28 is a view schematically showing a structure of a display device according to yet another embodiment.

Referring to FIG. 28, a display device 1_6 according to the embodiment may further include an upper protective film PL disposed on a window member WM, and a polarizing member POL disposed between the window member WM and a display panel PNL.

The upper protective film PL may perform at least one function of anti-scattering (e.g., preventing broken pieces from dispersing in case that the window 100 is broken), shock absorption, anti-scratch, anti-fingerprint, and anti-glare. The upper protective film PL may be disposed on a side of the window member WM in a third direction DR3. The upper protective film PL may be attached to the window 100 through an adhesive member such as a pressure-sensitive adhesive.

The polarizing member POL may polarize light emitted from the display panel PNL or polarize light incident on the display panel PNL. The polarizing member POL may be attached to the window member WM by a first adhesive layer PSA1 interposed between the window member WM and the polarizing member POL. The polarizing member POL may be disposed on an upper surface of the display panel PNL.

In some embodiments, the polarizing member POL may be omitted. In case that the polarizing member POL is omitted, the window 100 may be attached on a front surface of the display panel PNL by the first adhesive layer PSA1.

Figure 29:
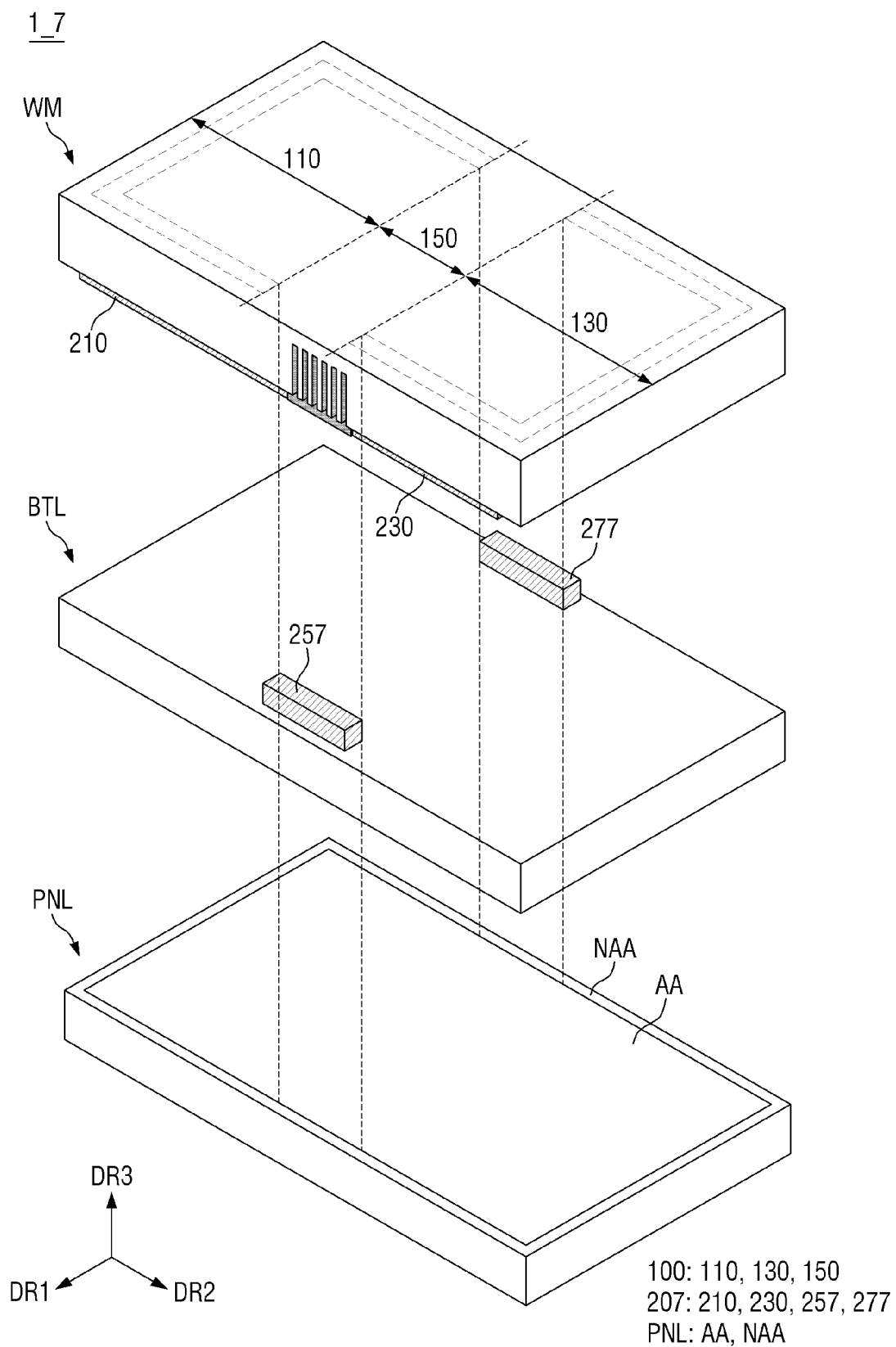
FIG. 29 is a perspective view schematically showing a structure of a display device according to yet another embodiment.

FIG. 29 is a perspective view schematically showing a structure of a display device according to yet another embodiment.

A display device 1_7 according to the embodiment of FIG. 29 is different from the display device 1_6 according to the embodiment of FIG. 28 at least in that a third light-blocking member 257 and a fourth light-blocking member 277 are disposed on a bottom layer BTL disposed between a window member WM and a display panel PNL. Thus, detailed description of the same constituent element is omitted.

Referring to FIG. 29, a first light-blocking member 210 and a second light-blocking member 230 disposed on a lower surface of a window 100 may overlap a non-active area NAA of the display panel PNL in a plan view. The first light-blocking member 210 and the second light-blocking member 230 may be spaced apart from each other with a first pattern part 150 therebetween on the lower surface of the window 100. Therefore, a space between the first light-blocking member 210 and the second light-blocking member 230 may be recognized by a user. Accordingly, a separate light-blocking member 200 may overlap the space between the first light-blocking member 210 and the second light-blocking member 230 in the third direction DR3.

In the display device 1_7 according to the embodiment, a third light-blocking member 257 and a fourth light-blocking member 277 may be disposed on a bottom layer BTL between the window member WM and the display panel PNL, and overlap the space between the first light-blocking member 210 and the second light-blocking member 230 in the third direction DR3. The display device 1_7 may include, on the bottom layer BTL, a third light-blocking member 257 overlapping a space between a 1-1-th light-blocking member 210a and a 2-2-th light-blocking member 230a on a side of the bottom layer BTL in a first direction DR1, and a fourth light-blocking member 257 overlapping a space between a 1-3-th light-blocking member 210c and a 2-3-th light-blocking member 230c on an opposite side of the bottom layer BTL in the first direction DR1 as shown in FIG. 9. For example, the third light-blocking member 257 and the fourth light-blocking member 277 may be disposed at positions of the bottom layer BTL that overlap the non-active area NAA of the display panel PNL and the first pattern part 150 of the window 100 in the third direction DR3.

In some embodiments, the bottom layer BTL may be at least one of a polarizing member POL and a first adhesive layer PSA1, but is not limited thereto. In some embodiments, the third light-blocking member 257 and the fourth light-blocking member 277 may be disposed on a same layer, but is not limited thereto. For example, the third light-blocking member 257 may be disposed on the polarizing member POL, and the fourth light-blocking member 277 may be disposed on the first adhesive layer PSA1.

Figure 30:
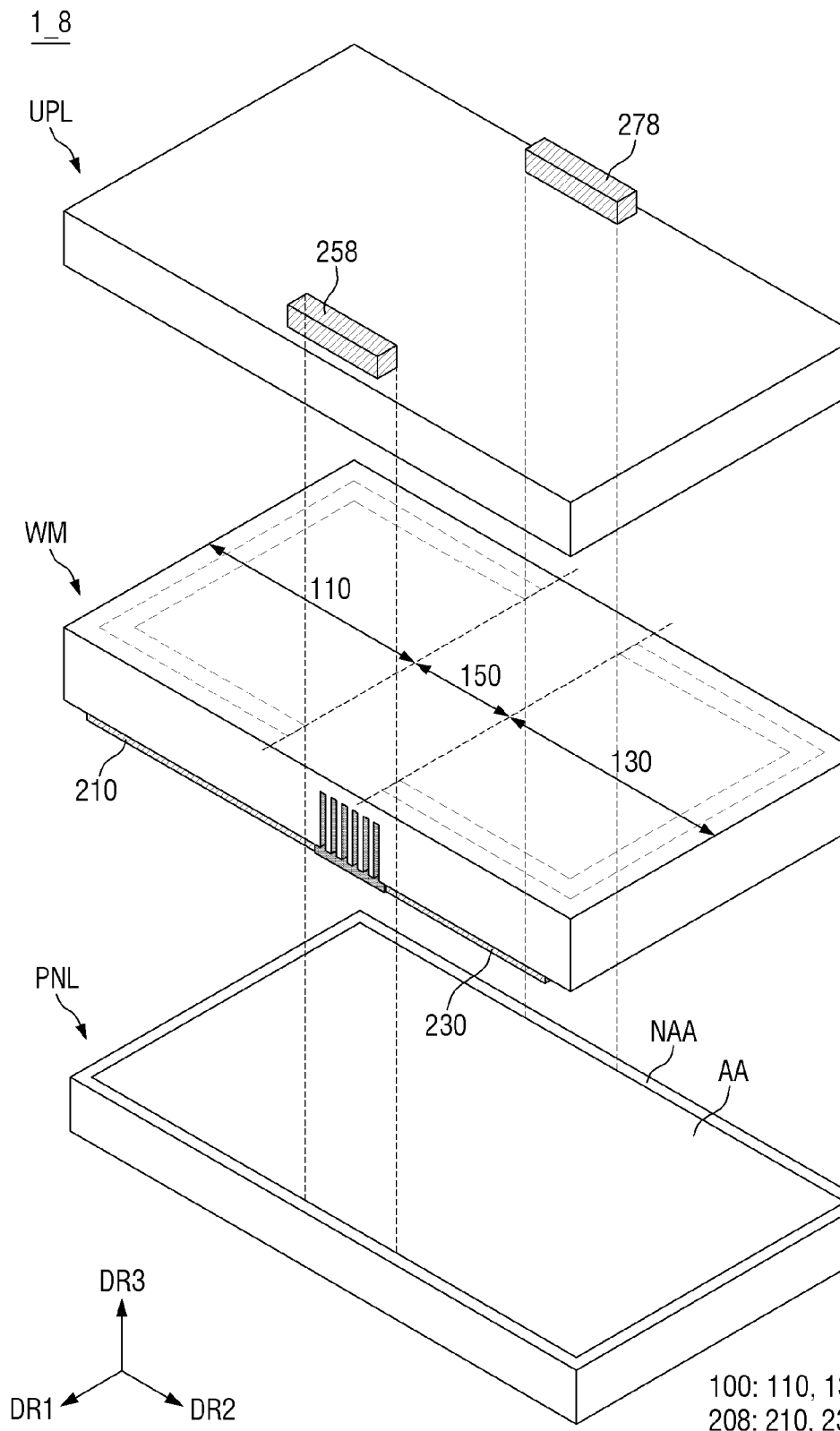
FIG. 30 is a perspective view schematically showing a structure of a display device according to yet another embodiment.

FIG. 30 is a perspective view schematically showing a structure of a display device according to yet another embodiment.

A display device 1_8 according to the embodiment of FIG. 30 is different from the display device 1_6 according to the embodiment of FIG. 28 at least in that a third light-blocking member 258 and a fourth light-blocking member 278 are disposed on an upper layer UPL disposed on an upper side of a window member WM (e.g., a side of the display device 1_8 in the third direction DR3 in FIG. 30). Thus, detailed description of the same constituent elements is omitted.

Referring to FIG. 30, a first light-blocking member 210 and a second light-blocking member 230 disposed on a lower surface of a window 100 may overlap a non-active area NAA of a display panel PNL in a plan view. The first light-blocking member 210 and the second light-blocking member 230 may be spaced apart from each other with a first pattern part 150 therebetween on the lower surface of the window 100. Therefore, a space between the first light-blocking member 210 and the second light-blocking member 230 may be recognized by a user. Accordingly, a separate light-blocking member 208 may overlap the space between the first light-blocking member 210 and the second light-blocking member 230 in the third direction DR3.

In the display device 1_8 according to the embodiment, a third light-blocking member 258 and a fourth light-blocking member 278 may be disposed on an upper layer UPL disposed on an upper side of the window member WM, and overlap the space between the first light-blocking member 210 and the second light-blocking member 230 in the third direction DR3. The display device 1_8 may include, on the upper layer UPL, a third light-blocking member 258 overlapping a space between a 1-1-th light-blocking member 210a and a 2-2-th light-blocking member 230a on a side of the upper layer UPL in a first direction DR1, and a fourth light-blocking member 278 overlapping a space between a 1-3-th light-blocking member 210c and a 2-3-th light-blocking member 230c on an opposite side of the upper layer UPL in the first direction DR1 as shown in FIG. 30. For example, the third light-blocking member 258 and the fourth light-blocking member 278 may be disposed at positions of the upper layer UPL that overlap the non-active area NAA of the display panel PNL and the first pattern part 150 of the window 100 in the third direction DR3.

In some embodiments, the upper layer UPL may be an upper protective film PL, but is not limited thereto. In some embodiments, the third light-blocking member 258 and the fourth light-blocking member 278 may be disposed on a same layer, but is not limited thereto.

Figure 31:
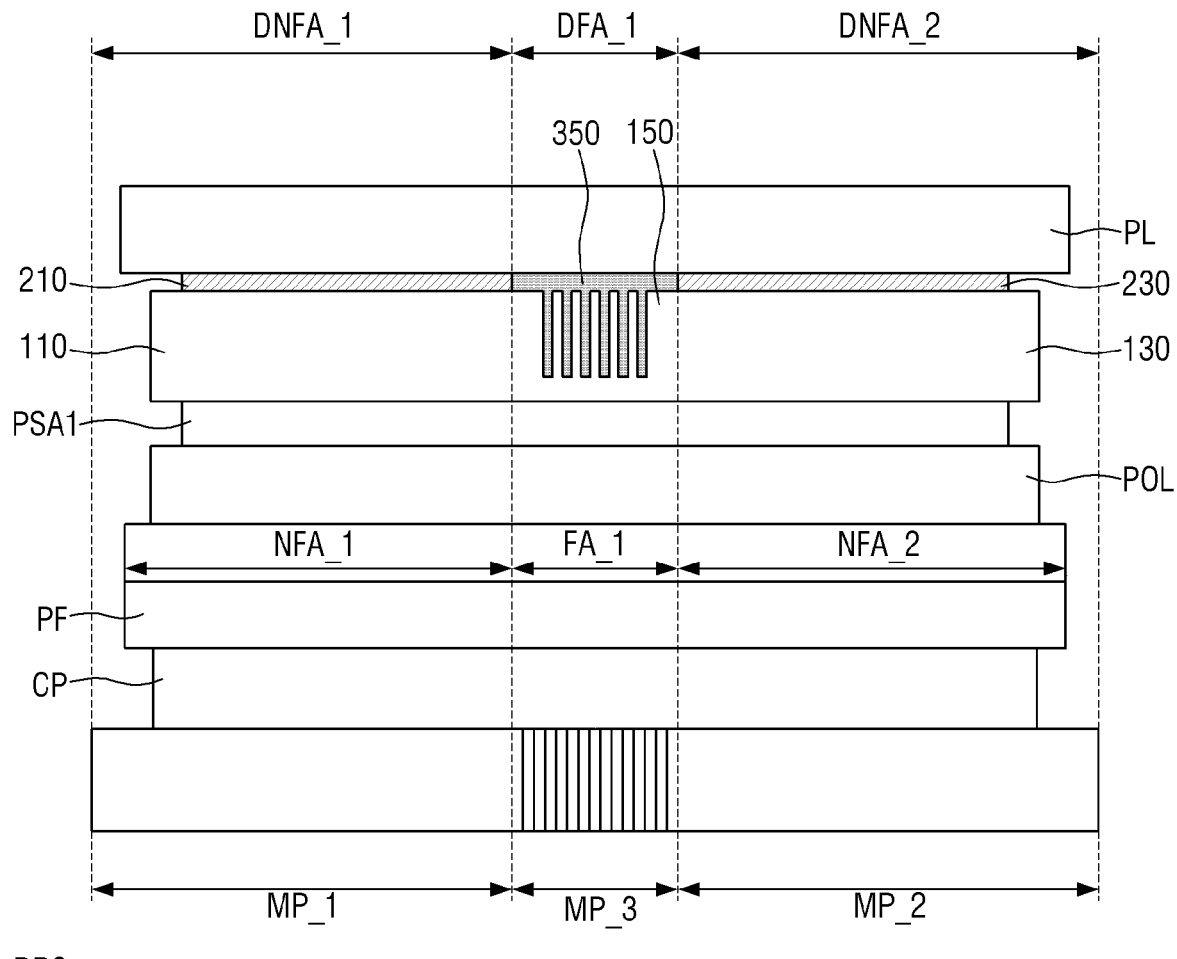
FIG. 31 is a view schematically showing a structure of a display device according to yet another embodiment.

FIG. 31 is a view schematically showing a structure of a display device according to yet another embodiment.

A display device 1_9 according to the embodiment of FIG. 31 is different from the display device 1_6 according to the embodiment of FIG. 28 at least in that a window member WM is turned over. Thus, detailed description of the same constituent elements is omitted.

Referring to FIG. 31, according to the embodiment, a first light-blocking member 210 and a second light-blocking member 230 of the window member WM may be in contact with an upper protective film PL, and an upper surface of a window 100 may be in contact with a first adhesive layer PSA1. With the above-described configuration, an adhesion between the window member WM and the upper protective film PL may be improved.

Figure 32:
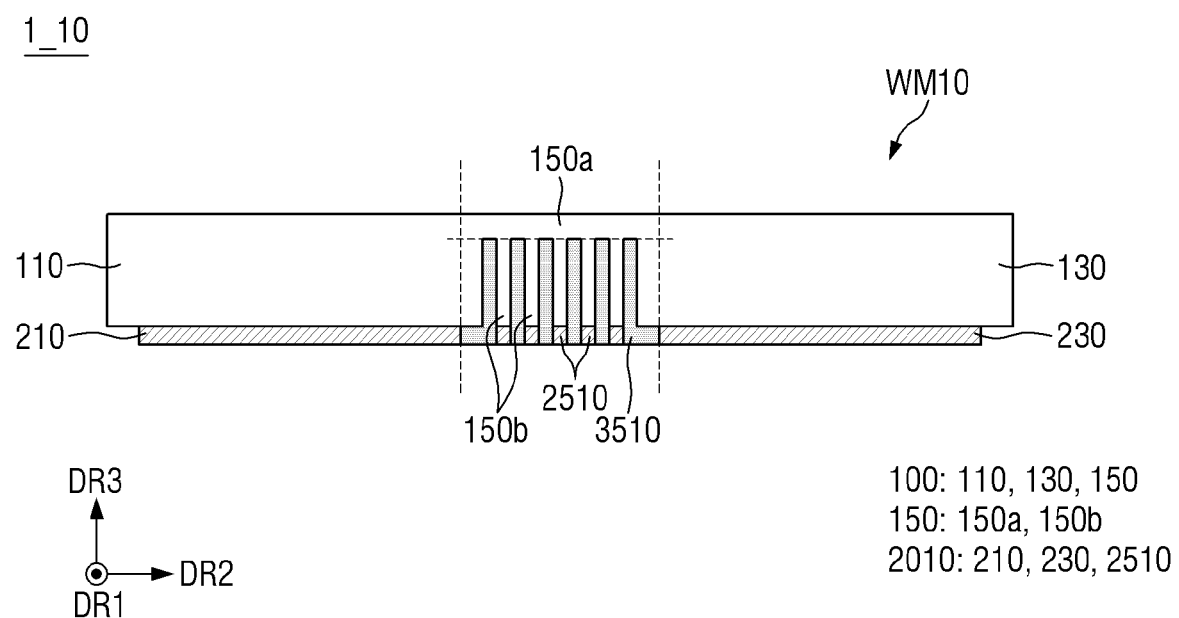
FIG. 32 is a schematic view showing a side surface of a window member according to yet another embodiment of the disclosure.
Figure 33:
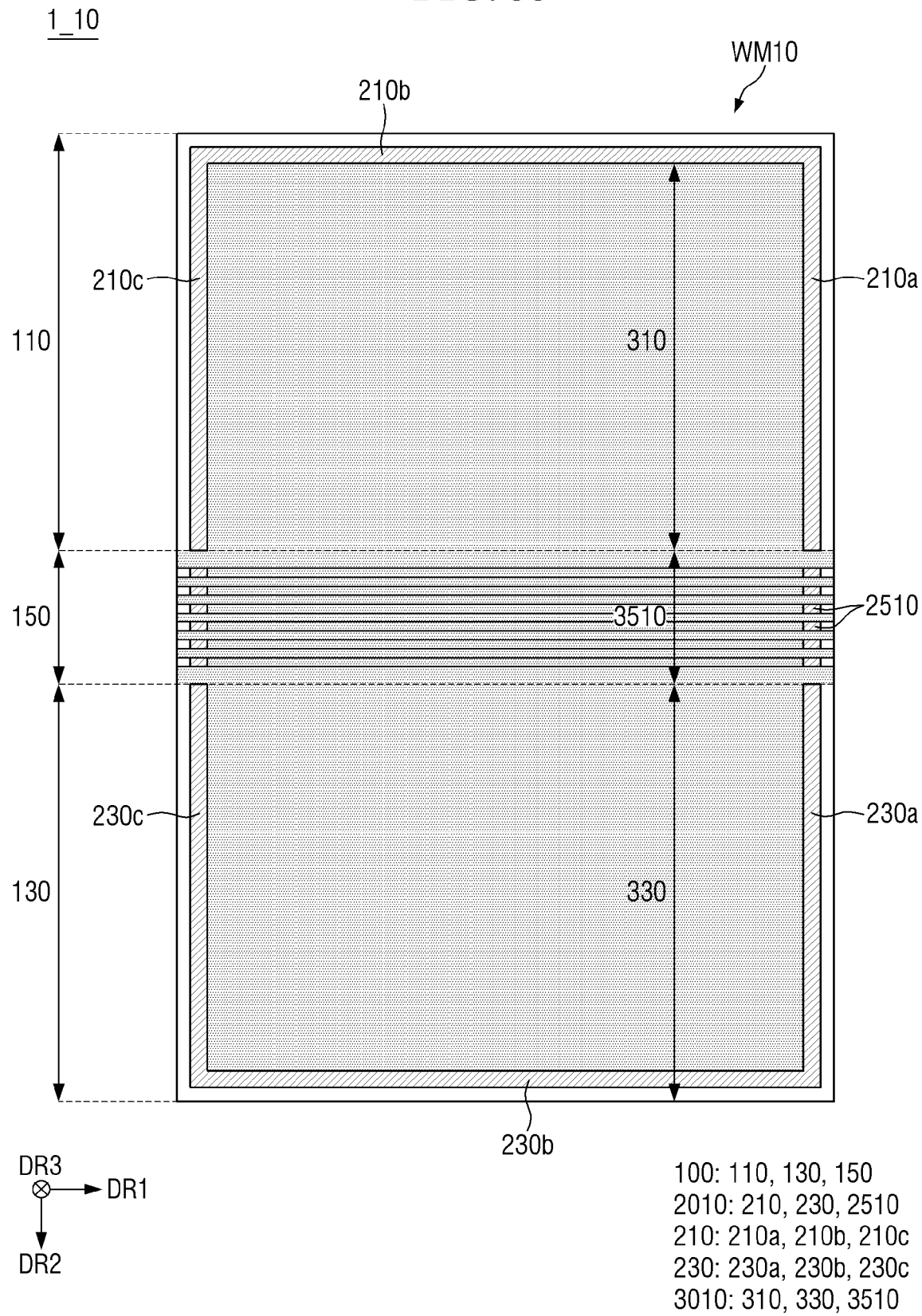
FIG. 33 is a schematic plan view showing the lower surface of the window member according to the embodiment of FIG. 32.
Figure 34:
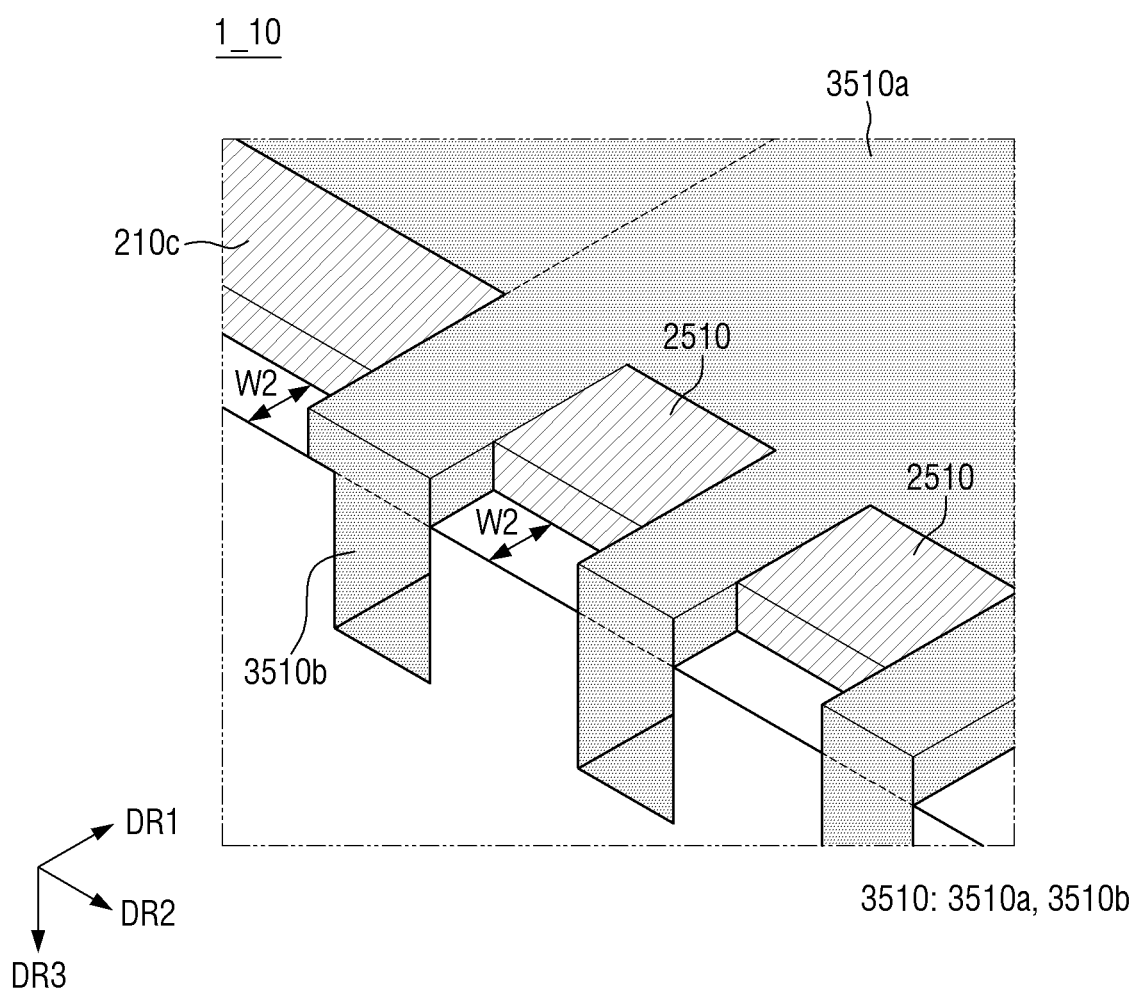
FIG. 34 is a perspective view schematically showing the pattern part of the window member filled with the cured resin layer according to the embodiment of FIG. 32.

FIG. 32 is a schematic view showing a side surface of a window member according to yet another embodiment of the disclosure. FIG. 33 is a schematic plan view showing the lower surface of the window member according to the embodiment of FIG. 32. FIG. 34 is a perspective view schematically showing the pattern part of the window member filled with the cured resin layer according to the embodiment of FIG. 32.

Referring to FIGS. 32 to 34, a third light-blocking member 2510 may be further disposed on protrusions 150b of a first pattern part 150 of a window member WM10 of a display device 1_10 according to the embodiment.

As described above, a first light-blocking member 210 and a second light-blocking member 230 disposed on a lower surface of a window 100 may overlap a non-active area NAA of a display panel PNL in a plan view. The first light-blocking member 210 and the second light-blocking member 230 may be spaced apart from each other with the first pattern part 150 therebetween on the lower surface of the window 100. Therefore, a space between the first light-blocking member 210 and the second light-blocking member 230 may be recognized by a user. Accordingly, a separate light-blocking member 2010 may overlap the space between the first light-blocking member 210 and the second light-blocking member 230 in a third direction DR3. Accordingly, the window member WM according to the embodiment may further include a third light-blocking member 2510 disposed on each of the protrusions 150b.

The third light-blocking member 2510 may prevent the first pattern part 150 of the window 100 from being recognized by the user. Multiple third light-blocking members 2510 may be disposed on the protrusions 150b and associated with the protrusions 150b, respectively. For example, the third light-blocking members 2510 may be spaced apart from one another in a second direction DR2 and disposed in line with the protrusions 150b, respectively. Accordingly, although the first pattern part 150 is bent, the third light-blocking member 2510 may not interfere the bending of the window member WM10. The third light-blocking member 2510 may overlap the non-active area NAA of the display panel PNL disposed under the window member WM10 and may not overlap the active area AA in a plan view.

A width of the third light-blocking member 2510 may be substantially equal to each of the width W1 of the first light-blocking member 210 of FIG. 4 and the width W1 of the second light-blocking member 230 of FIG. 4. The third light-blocking members 2510 may be disposed on the protrusions 150b and spaced apart from edges of the protrusions 150b by a distance W2. The distance W2 between the edges of the protrusions 150b may be substantially equal to the distance W2 between the first light-blocking member 210 and an edge of the first flat part 110 (or the distance W2 between the second light-blocking member 230 and an edge of the second flat part 130). A thickness of the third light-blocking member 2510 may be substantially equal to the thickness H1 of the first light-blocking member 210 of FIG. 9 and the thickness H1 of FIG. 9 of the second light-blocking member 230.

As described above, the third portion 3510 of the cured resin layer 3010 may include 3-2-th portions 3510b used to fill the groove pattern and a 3-1-th portion 3510a disposed on the protrusions 150b. The 3-1-th portion 3510a of the cured resin layer 3010 may not be disposed on an outer side of the third light-blocking member 2510 disposed on each of the protrusions 150b. Since the third light-blocking member 2510 acts as (or configure) a dam during the fabricating process, the 3-1-th portion 3510a may protrude through a space between the third light-blocking members 2510 as shown in FIG. 34. For example, the 3-1-th portion 3510a may protrude on sides (e.g., both sides) in the first direction DR1 through the space between the third light-blocking members 2510 and may not protrude on an outer side of the third light-blocking members 2510.

With the above-described configuration, the window member WM10 of the display device 1_10 according to the embodiment may prevent the first pattern part 150 from being recognized by the user without interfering the bending of the first pattern part 150.

Figure 35:
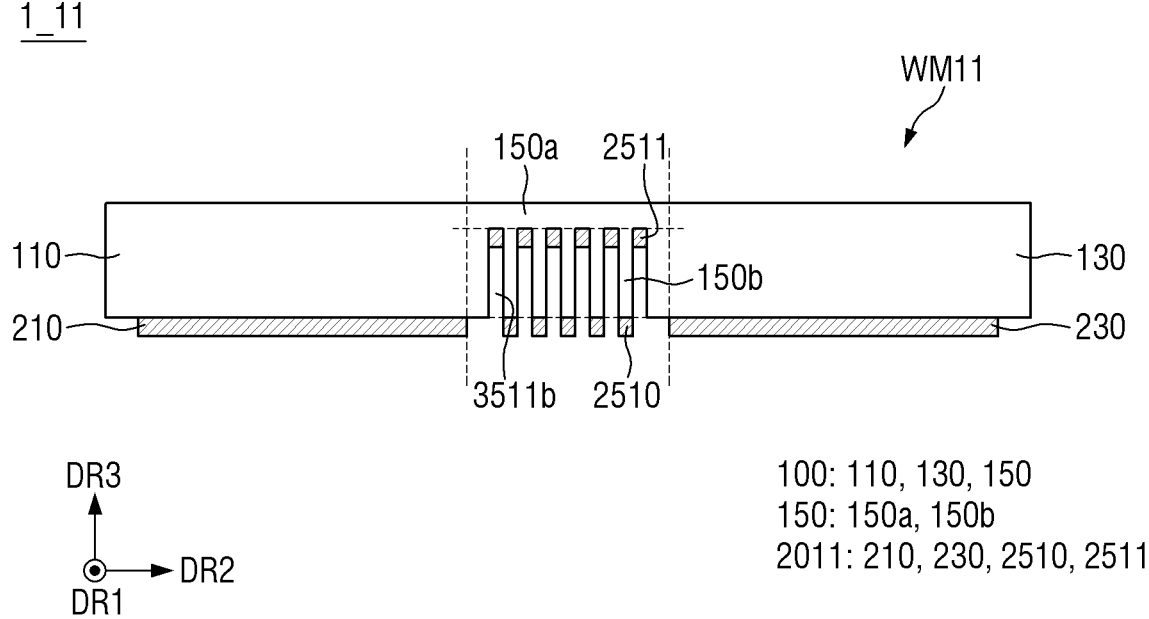
FIG. 35 is a schematic view showing a side surface of a window member according to yet another embodiment of the disclosure.
Figure 36:
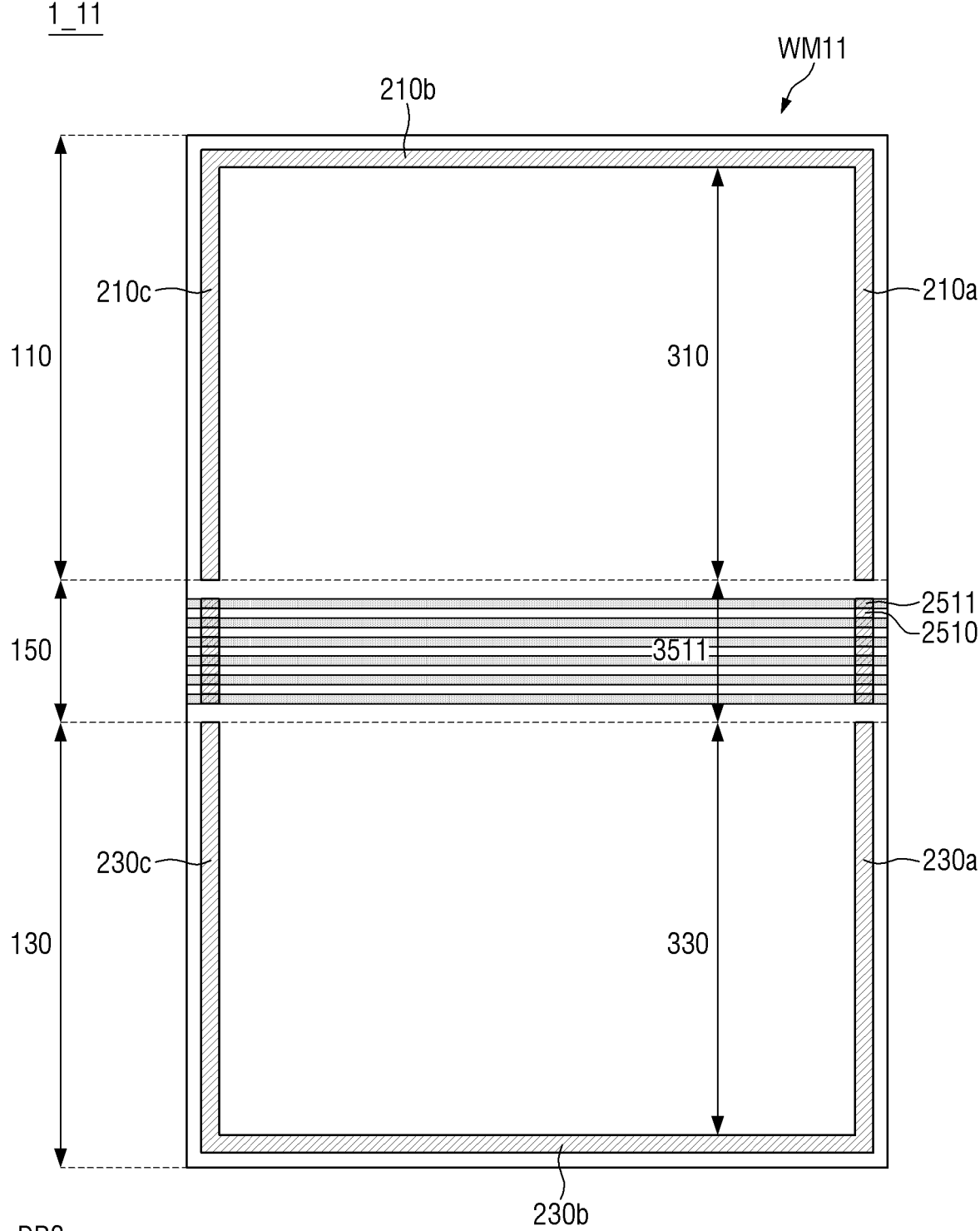
FIG. 36 is a schematic plan view showing the lower surface of the window member according to the embodiment of FIG. 35.
Figure 37:
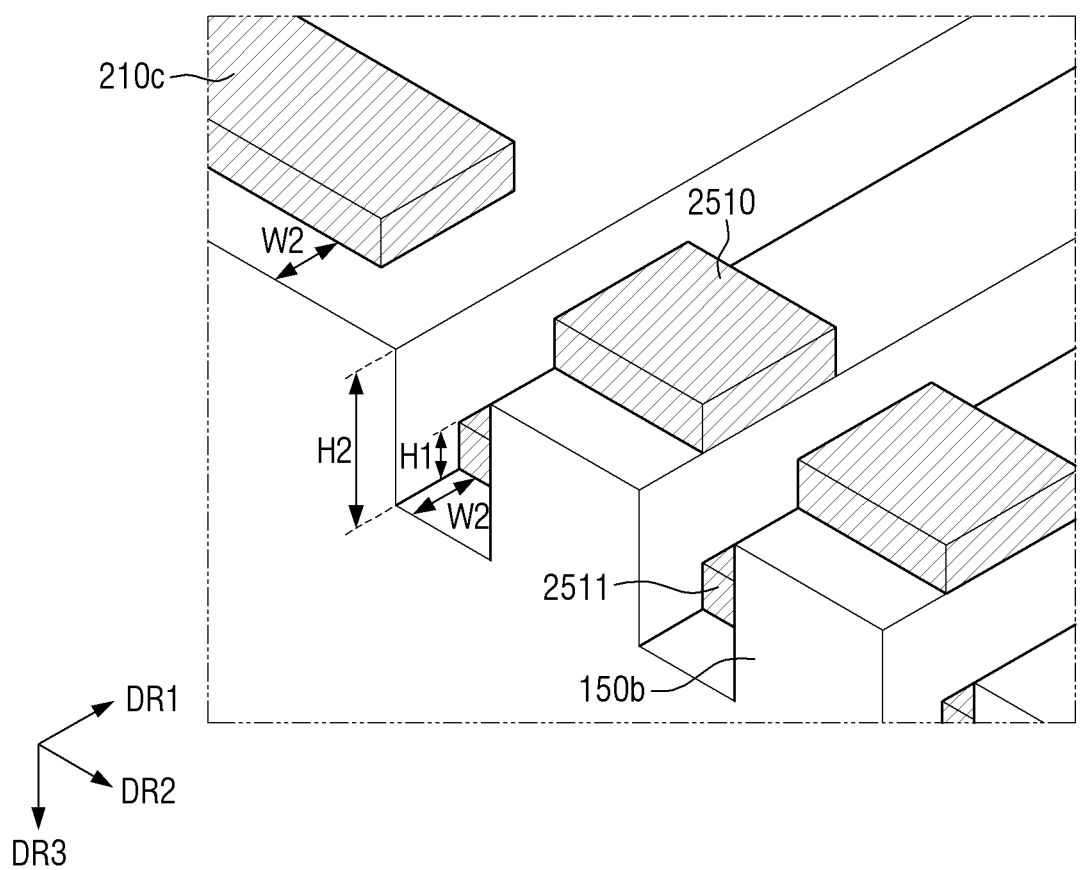
FIG. 37 is a perspective view schematically showing the pattern part of the window member filled with the cured resin layer according to the embodiment of FIG. 35.

FIG. 35 is a schematic view showing a side surface of a window member according to yet another embodiment of the disclosure. FIG. 36 is a schematic plan view showing the lower surface of the window member according to the embodiment of FIG. 35. FIG. 37 is a perspective view schematically showing the pattern part of the window member filled with the cured resin layer according to the embodiment of FIG. 35.

Referring to FIGS. 35 to 37, a window member WM of a display device 1_11 according to the embodiment may further include a fourth light-blocking member 2511 disposed on a lower surface of a bridge 150a exposed by protrusions 150b compared to the window member WM10 of the display device 1_10 according to the embodiment of FIG. 32. The cured resin layer is not depicted in FIGS. 35 to 37 for the sake of clarity.

Fourth light-blocking members 2511 may be disposed on concave portions of groove pattern. For example, the fourth light-blocking members 2511 may be disposed on the lower surface of the bridge 150a exposed by the protrusions 150b. Thus, the fourth light-blocking members 2511 may be spaced apart from one another in a second direction DR2. Accordingly, although the first pattern part 150 is bent, the fourth light-blocking members 2511 may not interfere the bending of the window member WM11. The fourth light-blocking member 2511 may overlap a non-active area NAA of a display panel PNL disposed under the window member WM11 and may not overlap an active area AA in a plan view.

A width of the fourth light-blocking member 2511 may be substantially equal to the width W1 of the first light-blocking member 210 of FIG. 4 and the width W1 of the second light-blocking member 230 of FIG. 4.

The fourth light-blocking members 2511 may be disposed on the protrusions 150b and spaced apart from edges of the protrusions 150b by a distance W2. The distance W2 between the first light-blocking member 210 and an edge of the first flat part 110 may be equal to the distance W2 between the second light-blocking member 230 and an edge of the second flat part 130.

A thickness of the fourth light-blocking members 2511 may be substantially equal to the thickness H1 of the first light-blocking member 210 of FIG. 9 and the thickness H1 of FIG. 9 of the second light-blocking member 230. For example, the thickness H2 of each of the protrusions 150b may be greater than the thickness H1 of the fourth light-blocking member 2511.

With the above-described configuration, the window member WM11 of the display device 1_11 according to the embodiment may prevent the first pattern part 150 from being recognized by the user without interfering the bending of the first pattern part 150.

Figure 38:
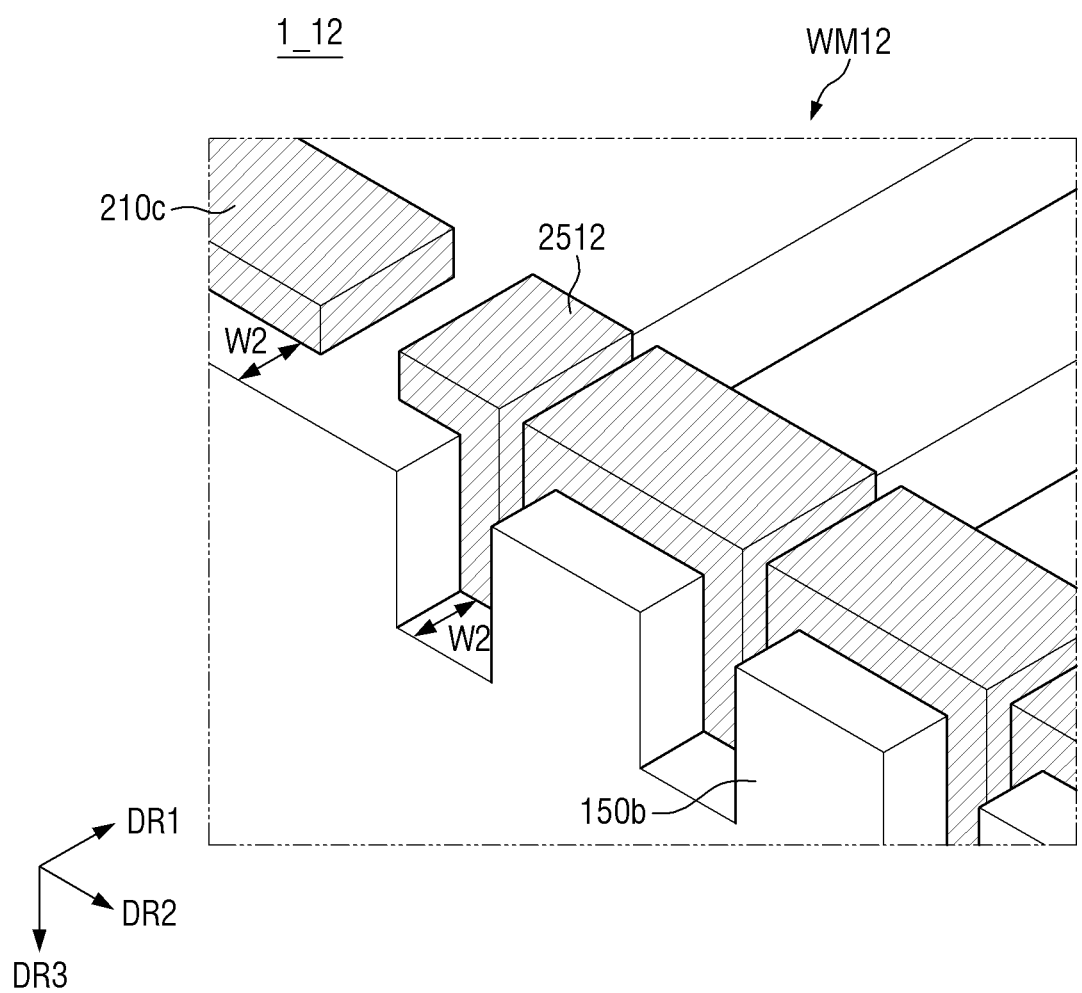
FIG. 38 is a schematic plan view showing a lower surface of a window member according to yet another embodiment of the disclosure.

FIG. 38 is a schematic plan view showing a lower surface of a window member according to yet another embodiment of the disclosure.

Referring to FIG. 38, a third light-blocking member 2512 may be formed as a single piece in (or may be integral with) a window member WM12 of a display device 1_12 according to the embodiment to cover a bridge 150a and protrusions 150b. The third light-blocking member 2512 may be extended along a surface of a first pattern part 150 to cover a surface of the bridge 150a exposed by the protrusions 150b, a surface of the protrusions 150b, and side surfaces of the protrusions 150b.

The third light-blocking member 2512 may be spaced apart from a first light-blocking member 210 and a second light-blocking member 230.

With the above-described configuration, the window member WM12 of the display device 1_12 according to the embodiment may prevent the first pattern part 150 from being recognized by the user without interfering the bending of the first pattern part 150.

Figure 39:
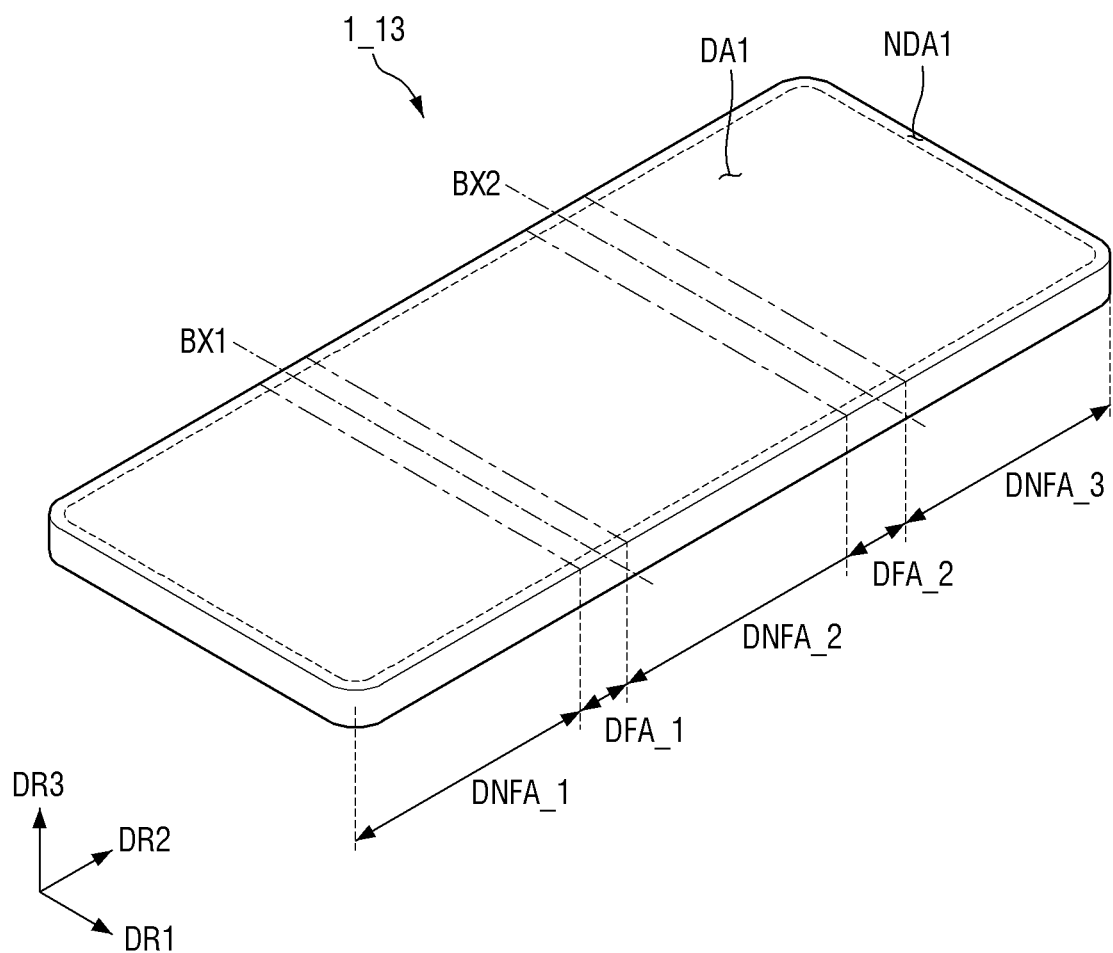
FIG. 39 is a schematic perspective view showing a display device according to yet another embodiment of the disclosure.
Figure 40:
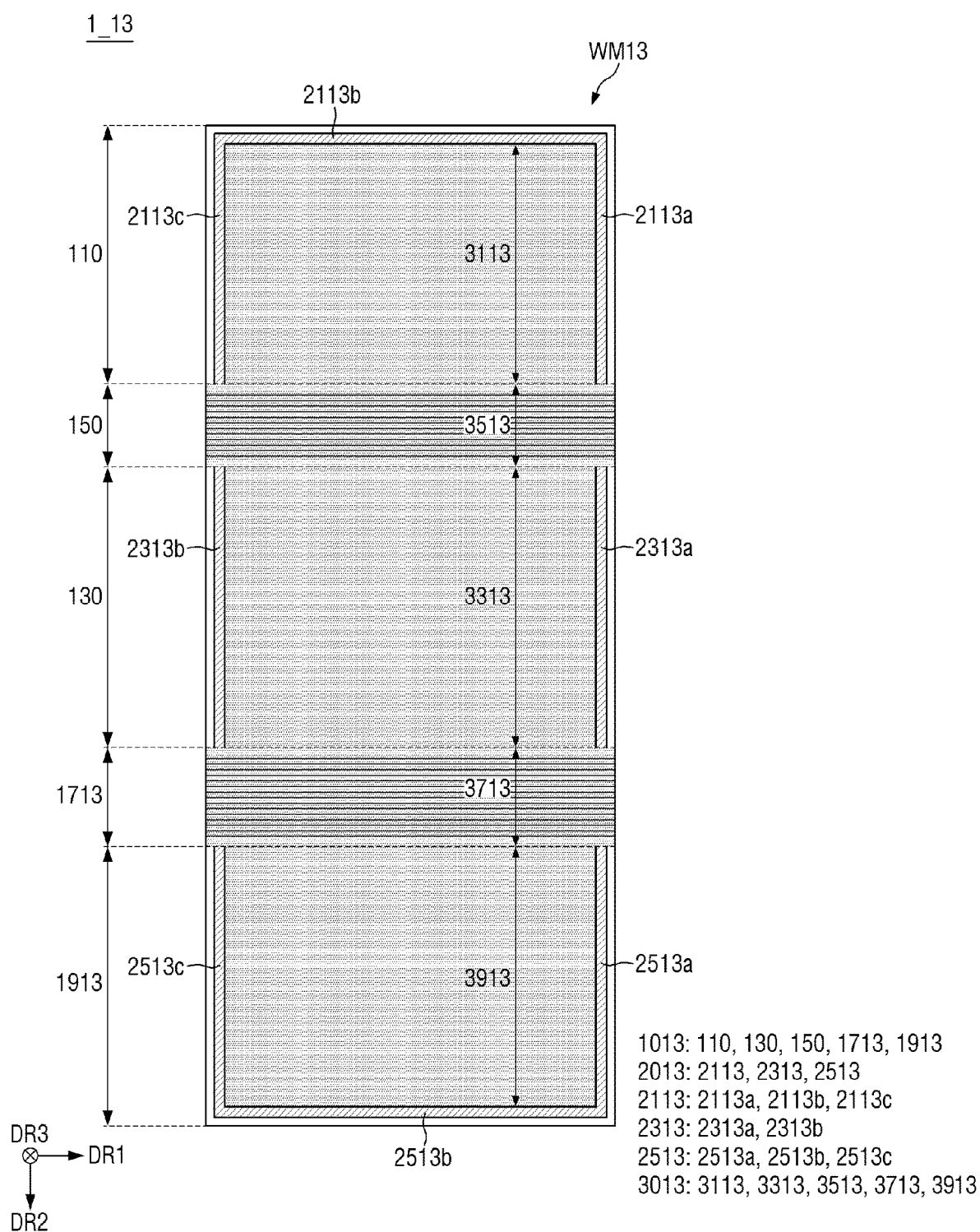
FIG. 40 is a schematic plan view showing the lower surface of the window member according to the embodiment of FIG. 39.

FIG. 39 is a schematic perspective view showing a display device according to yet another embodiment of the disclosure. FIG. 40 is a schematic plan view showing the lower surface of the window member according to the embodiment of FIG. 39.

In FIGS. 39 and 40, a display device 1_13 according to the embodiment may include folding axes BX1 and BX2. The display device 1_13 according to the embodiment may further include a first folding axis BX1 and a second folding axis BX2 spaced apart from the first folding axis BX1 in a second direction DR2.

The display device 1_13 may further include a second folding area DFA_2 and a third non-folding area DNFA_3. The second folding area DFA_2 may be disposed on a side of a second non-folding area DNFA_2 in the second direction DR2, and the third folding area DNFA_3 may be disposed on an opposite side of a second non-folding area DNFA_2 with the second folding area DFA_2 therebetween. For example, the second folding area DFA_2 may be disposed between the second non-folding area DNFA_2 and the third non-folding area DNFA_3. The second non-folding area DNFA_2 may be disposed between a first non-folding area DNFA_1 and the third non-folding area DNFA_3.

In some embodiments, a width of the second folding area DFA_2 in the second direction DR2 may be greater than a width of the first folding area DFA_1 in the second direction DR2, but the disclosure is not limited thereto. For example, the width of the second folding area DFA_2 in the second direction DR2 may be substantially equal to the width of the first folding area DFA_1 in the second direction DR2.

A window 1013 of a window member WM13 may further include a second pattern part 1713 disposed in the second folding area DFA_2, and a third flat part 1913 disposed in the third non-folding area DNFA_3. A groove pattern may be formed in the second pattern part 1713 as in the first pattern part 150.

A second light-blocking member 2313 may be disposed on the lower surface of the second flat part 130 and have the number eleven shape (or '11' shape) that is open toward the first pattern part 150 and the second pattern part 1713. For example, the second light-blocking member 2313 may have the number eleven shape open on sides (e.g., both sides) in the second direction DR2. The second light-blocking member 2313 may include a 2-1-th light-blocking member 2313a extended along an edge of the second flat part 130 in a first direction DR1, and a 2-2-th light-blocking member 2313b extended along an opposite edge in the first direction DR1. The 2-1-th light-blocking member 2313a and the 2-2-th light-blocking member 2313b may be spaced apart from each other in the first direction DR1. Accordingly, the second light-blocking member 2313 may form a second accommodation space on a second flat part that has the second light-blocking member 2313 as the border and is exposed toward the first pattern part 150 and the second pattern part 1713.

A third light-blocking member 2513 may be disposed on the lower surface of the third flat part 1913. The third light-blocking member 2513 may be bent in a C-shape open toward the first pattern part 150 on the lower surface of the second flat part 130. For example, the third light-blocking member 2513 may have the C-shape that is extended along edges of a lower surface of the third flat part 1913 and is open toward a second folding area. The third light-blocking member 2513 may have the C-shape to be adjacent to (e.g., surround) the inside of the third flat part 1913. For example, the third light-blocking member 2513 may be extended concavely toward a side of the third flat part 1913 in the second direction DR2 along the edges of the lower surface of the third flat part 1913 with reference to FIG. 40. Accordingly, the third light-blocking member 2513 may form a third accommodation space having the third light-blocking member 2513 as the border. The third light-blocking member 2513 may be spaced apart from the edges of the lower surface of the third flat part 1913 by a distance (e.g., a predetermined or selectable distance). In FIG. 40, the third light-blocking member 2513 may include a 3-1-th light-blocking member 2513a formed along the edge of the lower surface of the third flat part 1913 on the side in the first direction DR1 (e.g., the edge in the first direction DR1), a 3-2-th light-blocking member 2513b formed along the edge of the lower surface of the third flat part 1913 on the opposite side in the second direction DR2 (e.g., the edge in the second direction DR2), and a 3-3-th light-blocking member 2513c formed along the edge of the lower surface of the third flat part 1913 on the opposite side in the first direction DR1 (e.g., the edge in the opposite direction to the first direction DR1).

A cured resin layer 3013 may include a first portion 3113 used to fill a first accommodation space, a second portion 3313 used to fill the second accommodation space, a third portion 3513 used to fill the groove pattern of the first pattern part 150, a fourth portion 3713 used to fill the groove pattern of the second pattern part 1713, and a fifth portion 3913 used to fill a third accommodation space. The second portion 3313 of the cured resin layer 3013 according to the embodiment may be in contact with the third portion 3513 and the fourth portion 3713.

The fourth portion 3713 may have a shape substantially identical to that of the third portion 350 of the cured resin layer 300 according to the embodiment of FIG. 9. The fifth portion 3913 may have a shape substantially identical to that of the second portion 330 of the cured resin layer 300 according to the embodiment of FIG. 9. Therefore, detailed description of the same constituent elements is omitted.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:
1. A window member comprising:
a window comprising:
a first flat part;
a first pattern part disposed on a side of the first flat part in a first direction and having a groove pattern; and
a second flat part disposed on an opposite side of the first flat part, the first pattern part being disposed between the first flat part and the second flat part; and
a first light-blocking member disposed on a surface of the first flat part and not overlapping the first pattern part or the second flat part in a plan view;
a second light-blocking member disposed on a surface of the second flat part and not overlapping the first pattern part in a plan view; and
a cured resin layer disposed on the first flat part, the first pattern part, and the second flat part, wherein
the first light-blocking member comprises:
a 1-1-th light-blocking member;
a 1-2-th light-blocking member intersecting the 1-1-th light-blocking member; and
a 1-3-th light-blocking member intersecting the 1-2-th light-blocking member and facing the 1-1-th light-blocking member,
the 1-1-th light-blocking member, the 1-2-th light-blocking member, and the 1-3-th light-blocking member define a first accommodation space,
the 1-3-th light-blocking member is spaced apart from the 1-1-th light-blocking member to define a first open area, and
the first accommodation space is exposed toward the first pattern part by the first open area,
wherein
the second light-blocking member comprises:
a 2-1-th light-blocking member;
a 2-2-th light-blocking member intersecting the 2-1-th light-blocking member; and
a 2-3-th light-blocking member intersecting the 2-2-th light-blocking member and facing the 2-1-th light-blocking member,
the 2-1-th light-blocking member, the 2-2-th light-blocking member, and the 2-3-th light-blocking member define a second accommodation space,
the 2-3-th light-blocking member is spaced apart from the 2-1-th light-blocking member to define a second open area, and
the second accommodation space is exposed toward the first pattern part by the second open area,
the cured resin layer comprises:
a first portion disposed in the first accommodation space;
a second portion disposed in the second accommodation space; and
a third portion disposed between the first portion and the second portion to cover the groove pattern,
the first portion, the second portion, and the third portion of the cured resin layer are integral with one another, and
a width of the third portion in a second direction intersecting the first direction is greater than each of a width of the first portion in the second direction and a width of the second portion in the second direction.
2. The window member of claim 1, wherein
respective end surfaces of the 1-1-th light-blocking member of the first light-blocking member and the 2-1-th light-blocking member of the second light-blocking member face each other and are spaced apart from each other to define a third open area, and
respective end surfaces of the 1-3-th light-blocking member of the first light-blocking member and the 2-3-th light-blocking member of the second light-blocking member face each other and are spaced apart from each other to define a fourth open area.

3. The window member of claim 2, wherein the first pattern part comprises:
a bridge connecting the first flat part with the second flat part; and
a plurality of protrusions protruding from a surface of the bridge in a third direction that is a thickness direction of the window and spaced apart from one another, and
each of the groove pattern is defined as a space between every two of the plurality of protrusions.

4. The window member of claim 3, wherein
each of the plurality of protrusions is extended in the second direction, and
a width of each of the plurality of protrusions in the second direction is greater than each of a width of the first accommodation space in the second direction and a width of the second accommodation space in the second direction.

5. The window member of claim 4, wherein
the first accommodation space, the second accommodation space, and the groove pattern are filled with the cured resin layer.

6. The window member of claim 5, wherein the groove pattern is completely filled with the third portion.

7. The window member of claim 3, further comprising:
a third light-blocking member disposed on the plurality of protrusions.

8. The window member of claim 7, further comprising:
a fourth light-blocking member disposed on a surface of the bridge exposed from the plurality of protrusions,
wherein a thickness of each of the plurality of protrusions is greater than a thickness of the fourth light-blocking member.

9. The window member of claim 1, wherein a thickness of the first light-blocking member is in a range of about 30 μm to about 50 μm.

10. The window member of claim 9, wherein a width of the first light-blocking member is in a range of about 50 μm to about 500 μm.

11. The window member of claim 1, wherein the window further comprises:
a second pattern part disposed on a side of the second flat part and having a groove pattern;
a third flat part disposed on an opposite side of the second flat part, the second pattern part being disposed between the second flat part and the third flat part,
the window member further comprises:
a second light-blocking member disposed on a surface of the second flat part; and
a third light-blocking member disposed on a surface of the third flat part,
the second flat part is disposed between the first flat part and the third flat part,
the second light-blocking member is disposed in a number eleven shape open toward the first pattern part and the second pattern part to define a second accommodation space,
the third light-blocking member comprises:
a 3-1-th light-blocking member;
a 3-2-th light-blocking member intersecting the 3-1-th light-blocking member; and
a 3-3-th light-blocking member intersecting the 3-2-th light-blocking member and facing the 3-1-th light-blocking member,
the 3-1-th light-blocking member, the 3-2-th light-blocking member, and the 3-3-th light-blocking member define a third accommodation space, and
the third accommodation space is exposed toward the second pattern part.

12. A display device comprising:
the window member of claim 1; and
a display panel disposed under the window member to display images.

13. The display device of claim 12, wherein the display panel comprises:
a first non-folding area overlapping the first flat part;
a second non-folding area overlapping the second flat part; and
a folding area overlapping the first pattern part in a plan view, and
the first light-blocking member overlaps the first non-folding area and does not overlap the folding area in a plan view.

14. The display device of claim 13, wherein the display panel comprises:
an active area comprising a plurality of pixels; and
a non-active area adjacent to the active area, and
the first light-blocking member overlaps the non-active area, and does not overlap the active area in a plan view.

15. The display device of claim 14, further comprising:
a protective film disposed on the window member,
wherein a second light-blocking member is disposed on a part of the protective film that overlaps the first pattern part of the window member and the non-active area of the display panel in a plan view.

16. The display device of claim 14, further comprising:
a polarizing member disposed between the window member and the display panel,
wherein a second light-blocking member is disposed on a part of the polarizing member that overlaps the first pattern part of the window member and the non-active area of the display panel in a plan view.

* * * * *